United States Patent
Fujikami et al.

(10) Patent No.: US 10,111,164 B2
(45) Date of Patent: Oct. 23, 2018

(54) WIRELESS COMMUNICATION SYSTEM AND WIRELESS COMMUNICATION METHOD

(71) Applicant: MITSUBISHI ELECTRIC CORPORATION, Tokyo (JP)

(72) Inventors: Shintaro Fujikami, Tokyo (JP); Yukimasa Nagai, Tokyo (JP); Takenori Sumi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 67 days.

(21) Appl. No.: 15/305,070

(22) PCT Filed: Jul. 14, 2014

(86) PCT No.: PCT/JP2014/068723
§ 371 (c)(1),
(2) Date: Oct. 18, 2016

(87) PCT Pub. No.: WO2016/009481
PCT Pub. Date: Jan. 21, 2016

(65) Prior Publication Data
US 2017/0188296 A1   Jun. 29, 2017

(51) Int. Cl.
*H04W 48/18*   (2009.01)
*H04W 76/14*   (2018.01)
(Continued)

(52) U.S. Cl.
CPC ............ *H04W 48/18* (2013.01); *H04W 4/80* (2018.02); *H04W 8/005* (2013.01); *H04W 76/14* (2018.02);
(Continued)

(58) Field of Classification Search
CPC ....... H04W 48/18; H04W 4/80; H04W 4/008; H04W 80/00; H04W 84/12; H04W 84/18; H04W 88/06; H04W 76/14; H04W 8/005
See application file for complete search history.

(56) References Cited

U.S. PATENT DOCUMENTS

2009/0221283 A1 * 9/2009 Soliman ................ H04W 48/14
                                                        455/426.1
2012/0218918 A1   8/2012 Takae et al.
(Continued)

FOREIGN PATENT DOCUMENTS

JP   2008-35372 A    2/2008
JP   2012-175614 A   9/2012
(Continued)

OTHER PUBLICATIONS

"Part 11: Wireless LAN Medium Access Control (MAC) and Physical Layer (PHY) Specifications", IEEE Computer Society, IEEE Std 802. Nov. 2012 (Revision of IEEE Std 802. Nov. 2007), Mar. 29, 2012.
(Continued)

Primary Examiner — Walli Butt
(74) Attorney, Agent, or Firm — Birch, Stewart, Kolasch & Birch, LLP

(57) ABSTRACT

Each of wireless communication devices 2A, 2B and 2C is configured in such a way as to transmit information about either a service or an application which the wireless communication device can provide, in accordance with a protocol which makes it possible to perform wireless communications with a wireless communication device 1 regardless of the setting of a communication mode to the wireless communication device 1, and the wireless communication device 1 is configured in such a way as to collect information about an application which is transmitted from each of the wireless communication devices 2A, 2B and 2C. As a result,
(Continued)

the wireless communication device 1 can acquire the information about the providable application from each of the wireless communication devices 2A, 2B and 2C existing in the surroundings thereof regardless of the setting of a communication mode.

18 Claims, 36 Drawing Sheets

(51) Int. Cl.
*H04W 80/00* (2009.01)
*H04W 8/00* (2009.01)
*H04W 4/80* (2018.01)
*H04W 84/12* (2009.01)
*H04W 84/18* (2009.01)
*H04W 88/06* (2009.01)

(52) U.S. Cl.
CPC ............ *H04W 80/00* (2013.01); *H04W 84/12* (2013.01); *H04W 84/18* (2013.01); *H04W 88/06* (2013.01)

(56) References Cited

U.S. PATENT DOCUMENTS

| | | |
|---|---|---|
| 2014/0009786 A1 | 1/2014 | Sako |
| 2014/0080426 A1 | 3/2014 | Hamada |
| 2015/0071147 A1 | 3/2015 | Yamaura |
| 2015/0085847 A1* | 3/2015 | Yamaura ............ H04M 1/7253 370/338 |
| 2015/0264729 A1* | 9/2015 | Kim ................... H04W 76/023 455/41.1 |
| 2015/0351022 A1* | 12/2015 | Sakoda ................ H04W 48/18 370/329 |

FOREIGN PATENT DOCUMENTS

| | | |
|---|---|---|
| JP | 5268550 B2 | 8/2013 |
| JP | 2014-12350 A | 1/2014 |
| WO | WO 2013/153887 A1 | 10/2013 |
| WO | WO 2014/103456 A1 | 7/2014 |

OTHER PUBLICATIONS

"Wi-Fi Peer-to-Peer (P2P) Technical Specification", Version 1.2, 2010 Wi-Fi Alliance.

* cited by examiner

FIG.8

| Subtype | Value |
|---|---|
| Service Request | 0 |
| Service Response | 1 |
| Application Service Request | 2 |
| Application Service Response | 3 |
| Service Notification Request | 4 |
| Service Notification Response | 5 |
| Mode Change Request | 6 |
| Mode Change Response | 7 |
| Mode Change Confirm | 8 |

FIG.11

| Service Connecting Level | Registered Terminal (MAC Address) | Device Type | Registered Service | Registered Application |
|---|---|---|---|---|
| Forcible Connection | 11:22:33:44:55:66 | — | Moving Image | — |
| Automatic Connection | 22:33:44:55:66:77 | — | Internet | — |
| User Notification | — | Tablet | Music | Music Playback Application |
| Neglect | — | — | Photo | — |

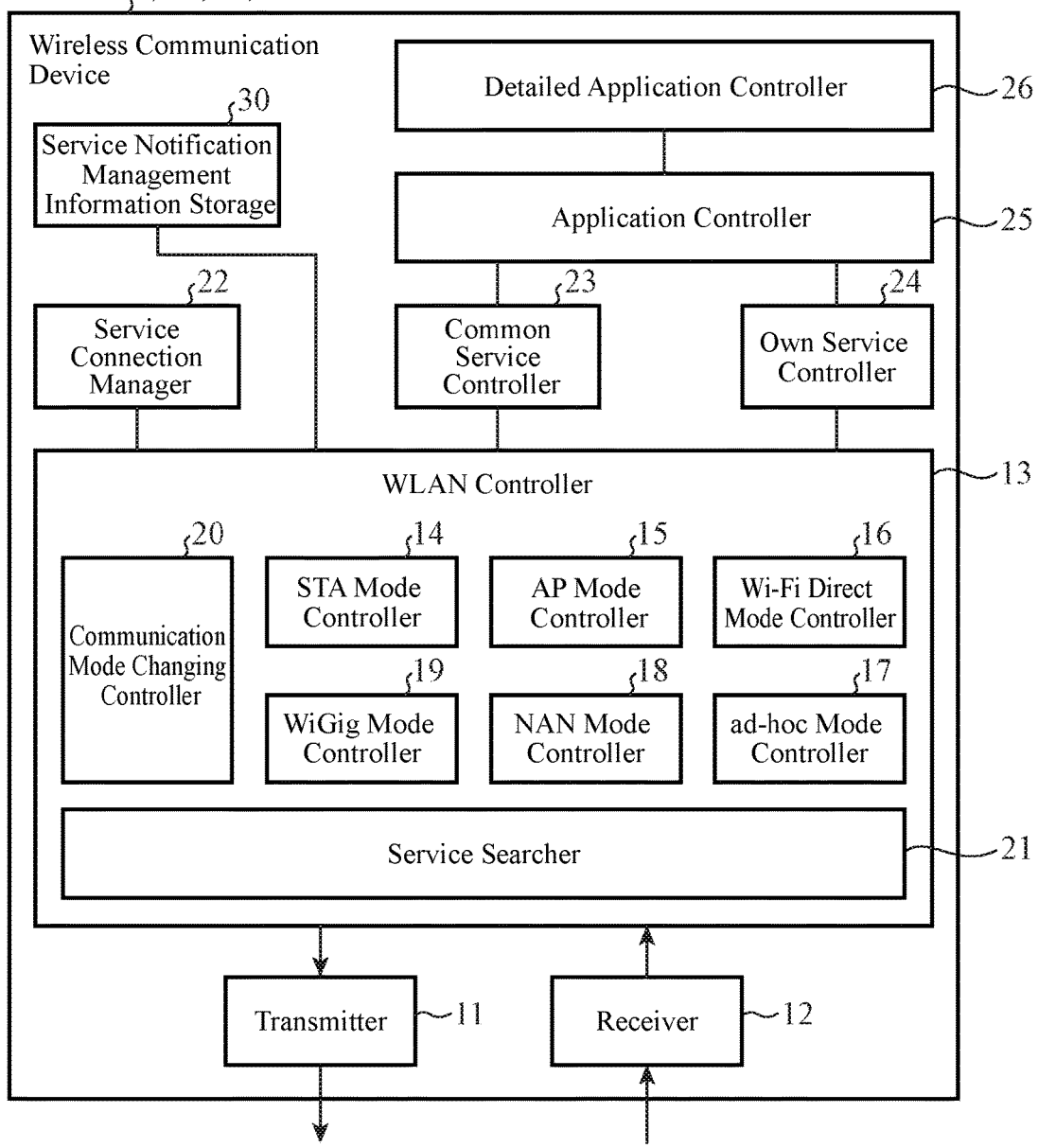

WIRELESS COMMUNICATION SYSTEM AND WIRELESS COMMUNICATION METHOD

TECHNICAL FIELD

The present invention relates to a wireless communication system in which a plurality of wireless communication devices perform wireless communications with one another, and a wireless communication method.

BACKGROUND ART

In recent years, communication modes in a wireless LAN (Local Area Network) (IEEE (The Institute of Electric and Electronics Engineers) 802.11a/b/g/n/ac) have been diversified. For example, the following communication modes are provided:
  ad-hoc mode,
  STA mode (infrastructure mode),
  AP mode (infrastructure mode),
  Wi-Fi direct mode,
  WiGig (Wireless Gigabit) mode, and
  NAN (Neighborhood Area Network) mode.

For example, a device, such as a PC or a smart phone, equipped with a wireless communication device having a wireless communication function for wireless LAN supports a plurality of communication modes.

Therefore, by selecting a communication mode corresponding to a service which the user desires the device to perform from among the plurality of communication modes and setting the selected communication mode to the wireless communication device, and causing the wireless communication device to perform wireless communications with another wireless communication device in this communication mode, the device, such as a PC or a smart phone, executes an application which provides the above-mentioned service.

Here, a method of searching for a service provided by a communication partner in an infrastructure mode for wireless LAN is defined by 802.11u which is a specification about connection with another network, and a mechanism for, when an STA terminal which is a user's wireless communication device connects with an access point, automatically detecting and selecting an appropriate network by using information about the service provider to which the user has subscribed is defined in 802.11u.

In the following nonpatent literature 1, SDP (Service Discovery Protocol) which is a protocol for searching for what type of service another wireless communication device which is a communication partner supports is defined as an optional specification about the Wi-Fi direct mode.

By executing the SDP, a wireless communication device can know whether another wireless communication device which is a communication partner supports Bonjour, UPnP, Wi-Fi Display or the like which is a protocol in an upper layer, before connecting with the other wireless communication device which is a communication partner.

In the following patent literature 1, a method of searching for services provided by wireless communication devices to notify search results to the user, thereby simplifying the user's operation of selecting a desired service and causing a wireless communication device to start wireless communications is disclosed.

In the following patent literature 2, a method of, when an information processing terminal detects services provided by an image processing device and selects a service (e.g., printing or FAX) which the user desires, causing the information processing terminal to connect with the image processing device in a state in which the flag of this service is set, and enabling the service on the image processing device even if this service is disabled is disclosed.

In the following patent literature 3, a method of allowing a wireless communication device to acquire information about services provided by other wireless communication devices existing in the surroundings in the Wi-Fi direct mode and notifying the information about the services to the user is disclosed.

In patent literatures 1 to 3, no method of searching for services among wireless communication devices placed in different communication modes is disclosed.

CITATION LIST

Patent Literature

Patent Literature 1: Japanese Unexamined Patent Application Publication No. 2012-175614
Patent Literature 2: Japanese Unexamined Patent Application Publication No. 2014-12350
Patent Literature 3: WO2013/153887

Non Patent Literature

Non Patent Literature 1: Wi-Fi Peer-to-Peer (P2P) Technical Specification Version 1.2

SUMMARY OF INVENTION

Technical Problem

Because the conventional wireless communication systems are configured as above, when detecting other wireless communication devices existing in the surroundings, a wireless communication device having an existing wireless LAN function can simply detect only other wireless communication devices which are operating in a communication mode corresponding to the communication mode in which the wireless communication device itself is placed, and detectable wireless communication devices are limited (for example, a wireless communication device which is operating in STA of infrastructure modes can simply detect only other wireless communication devices which are operating in AP or in Group Owner of the Wi-Fi Direct). A further problem is that even if having succeeded in detecting other wireless communication device existing in the surroundings, information about providable services (including information about applications corresponding to these services) is not necessarily acquired from all of the detected wireless communication devices, and wireless communication devices from which information about services can be acquired are limited.

For example, a wireless communication device operating in STA conforming to 802.11u can only acquire information about services only from other wireless communication devices operating in AP conforming to 802.11u. Further, a wireless communication device operating in the Wi-Fi direct mode conforming to SDP can only acquire information about services only from other wireless communication devices similarly operating in the Wi-Fi direct mode conforming to SDP.

The present invention is made in order to solve the above-mentioned problems, and it is therefore an object of the present invention to provide a wireless communication system and a wireless communication method capable of acquiring information about providable services or applications from wireless communication devices existing in the surroundings, regardless of the setting of a communication mode.

Solution to Problem

According to the present invention, there is provided a wireless communication system in which a second wireless communication device, which exists in the surroundings of a first wireless communication device supporting a plurality of communication modes, includes an information transmitter to transmit information about either a service or an application which the second wireless communication device can provide, in accordance with a protocol which makes it possible to perform wireless communications with the first wireless communication device regardless of the setting of a communication mode to the first wireless communication device, and the first wireless communication device includes an information collector to collect the information about either the service or the application, the information being transmitted from the information transmitter of the second wireless communication device.

Advantageous Effects of Invention

According to the present invention, the second wireless communication device includes the information transmitter to transmit information about either the service or the application which the second wireless communication device can provide, in accordance with the protocol which makes it possible to perform wireless communications with the first wireless communication device regardless of the setting of a communication mode to the first wireless communication device, and the first wireless communication device includes the information collector to collect the information about either the service or the application, the information being transmitted from the information transmitter of the second wireless communication device, so that there is an advantage in that the information about the providable service or application from the wireless communication device existing in the surroundings can be acquired, regardless of the setting of a communication mode.

BRIEF DESCRIPTION OF DRAWINGS

FIG. 5 is a flow chart showing the details of processing performed by the wireless communication device 1 at the time of collecting information about applications, or the like;

FIG. 6 is a flow chart showing the details of processing performed by each of the wireless communication devices 2A, 2B and 2C at the time of transmitting the information about applications, or the like;

FIG. 8 is an explanatory drawing showing a list of subtypes of action frames;

FIG. 11 is an explanatory drawing showing an example of a service connection management table;

FIG. 20 is a flow chart showing the details of processing performed by a wireless communication device 1 at the time of collecting information about services, or the like;

FIG. 21 is a flow chart showing the details of processing performed by each of wireless communication devices 2A, 2B and 2C at the time of transmitting information about services, or the like;

FIG. 25 is a flow chart showing the details of processing performed by a wireless communication device 1 at the time of collecting information about services, or the like;

FIG. 27 is an explanatory drawing showing the format of a service notification IE superposed onto a beacon frame or the like;

FIG. 28 is block diagram showing the internal configuration of each of wireless communication devices 1, 2A, 2B and 2C which construct a wireless communication system according to Embodiment 4 of the present invention;

FIG. 29 is an explanatory drawing showing an example of a service notification level management table recorded in a service notification management information storage 30;

FIG. 31 is a flow chart showing the details of processing performed by the wireless communication device 1 at the time of collecting information about applications or services, or the like;

FIG. 32 is an explanatory drawing showing the format of a service notification flag IE superposed onto a beacon frame or the like;

FIG. 35 is a flow chart showing the details of processing performed by each of the wireless communication devices 2A, 2B and 2C at the time of transmitting information about applications or services, or the like;

DESCRIPTION OF EMBODIMENTS

Hereafter, the preferred embodiments of the present invention will be explained in detail with reference to the drawings.

Embodiment 1

Figure 1:
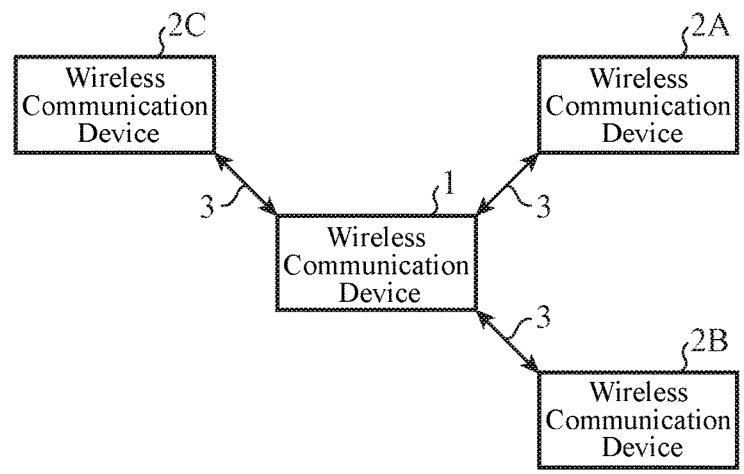
FIG. 1 is a block diagram showing a wireless communication system according to Embodiment 1 of the present invention.

FIG. 1 is a block diagram showing a wireless communication system according to Embodiment 1 of the present invention.

Referring to FIG. 1, a wireless communication device 1 which is a first wireless communication device supports a plurality of communication modes, and wireless communication devices 2A, 2B and 2C, each of which is a second wireless communication device, exist in the surroundings of the wireless communication device 1.

The wireless communication device 1 is connected to the wireless communication devices 2A, 2B and 2C via wireless links 3.

Each of the wireless links 3 can use one of frequency bands usually used for wireless LAN devices, such as a 2.4 GHz band, a 5 GHz band, a 60 GHz band and a 900 MHz band, and can use channels in any one of these frequency bands. As an alternative, each of the wireless links can use channels in a plurality of frequency bands.

When acquiring information about providable applications from each of the wireless communication devices 2A, 2B and 2C, the wireless communication device 1 broadcasts an action (application service request) frame to the wireless communication devices 2A, 2B and 2C by using all frequency channels usable in a wireless LAN while changing a frequency channel to be used, the action (application service request) frame conforming to a protocol which makes it possible to perform wireless communications with the wireless communication devices 2A, 2B and 2C regardless of the setting of a communication mode to each of the wireless communication devices 2A, 2B and 2C.

When receiving the action (application service request) frame, each of the wireless communication devices 2A, 2B and 2C transmits an action (application service response) frame to the wireless communication device 1, the action (application service response) frame conforming to a protocol which makes it possible to perform wireless communications with the wireless communication device 1 regardless of the setting of a communication mode to the wireless communication device 1. This action (application service response) frame includes information about applications which can be provided by the corresponding wireless communication device (e.g., IDs (pieces of identification information) of the applications).

In this Embodiment 1, because the ID of an application selected by the user is included in the action (application service request) frame broadcasted from the wireless communication device 1, each of the wireless communication devices 2A, 2B and 2C transmits an action (application service response) frame to the wireless communication device 1, as a response to the action (application service request) frame, only when the wireless communication device can provide the application shown by the abovementioned ID.

Figure 2:
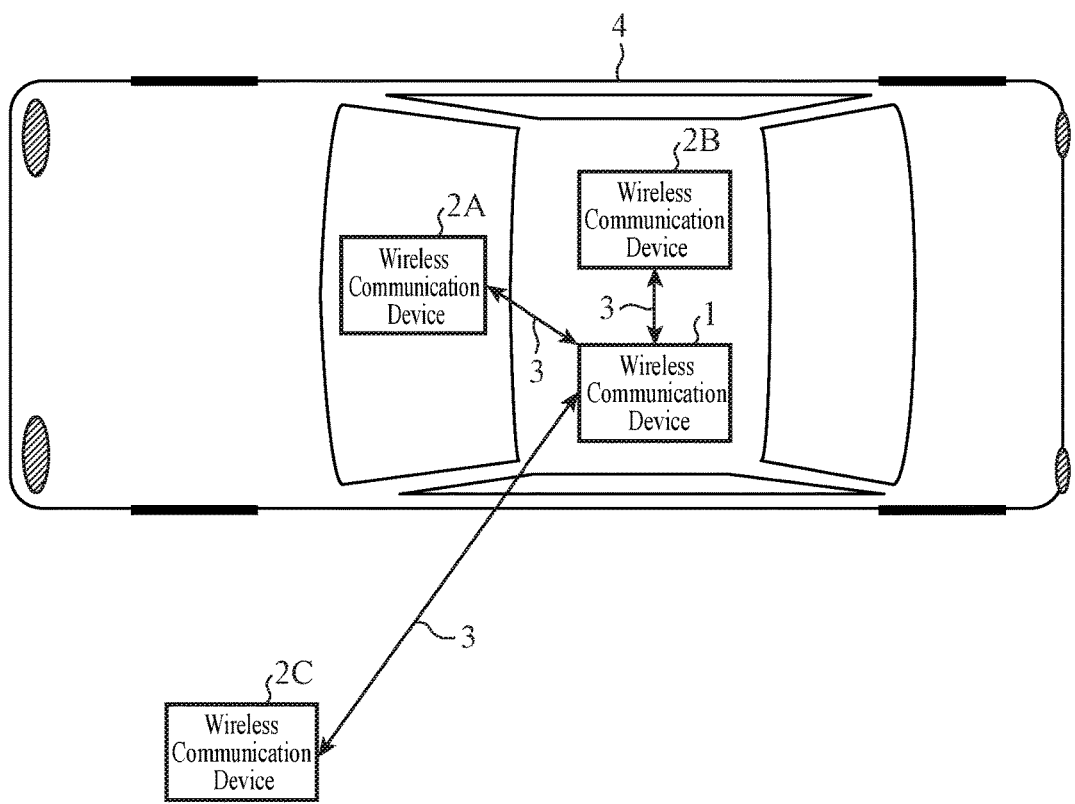
FIG. 2 is an explanatory drawing showing an example in which wireless communication devices which construct the wireless communication system shown in FIG. 1 are used as pieces of vehicle-mounted equipment.

FIG. 2 is an explanatory drawing showing an example in which wireless communication devices which construct the wireless communication system shown in FIG. 1 are used as pieces of vehicle-mounted equipment.

In the example shown in FIG. 2, the wireless communication device 2A is assumed to be vehicle-mounted equipment mounted in a car 4 (a vehicle), such as a head unit, a car navigation device, an audio device or a rear seat monitoring device.

Further, each of the wireless communication devices 1 and 2B is assumed to be equipment carried into the car 4, such as a tablet, a smart phone, a portable game machine, a music player or a personal computer.

The wireless communication device 2C disposed outside the car is assumed to be a wireless LAN system placed in a house, a public wireless LAN system (e.g., a hot spot or a repeater station), or the like.

Although the example in which the wireless communication device 2A is used as vehicle-mounted equipment is shown in FIG. 2, the wireless communication devices 1 and 2B can be alternatively used as pieces of vehicle-mounted equipment or the wireless communication devices 2A, 1 and 2B can be alternatively used as pieces of vehicle-mounted equipment, for example.

Figure 3:
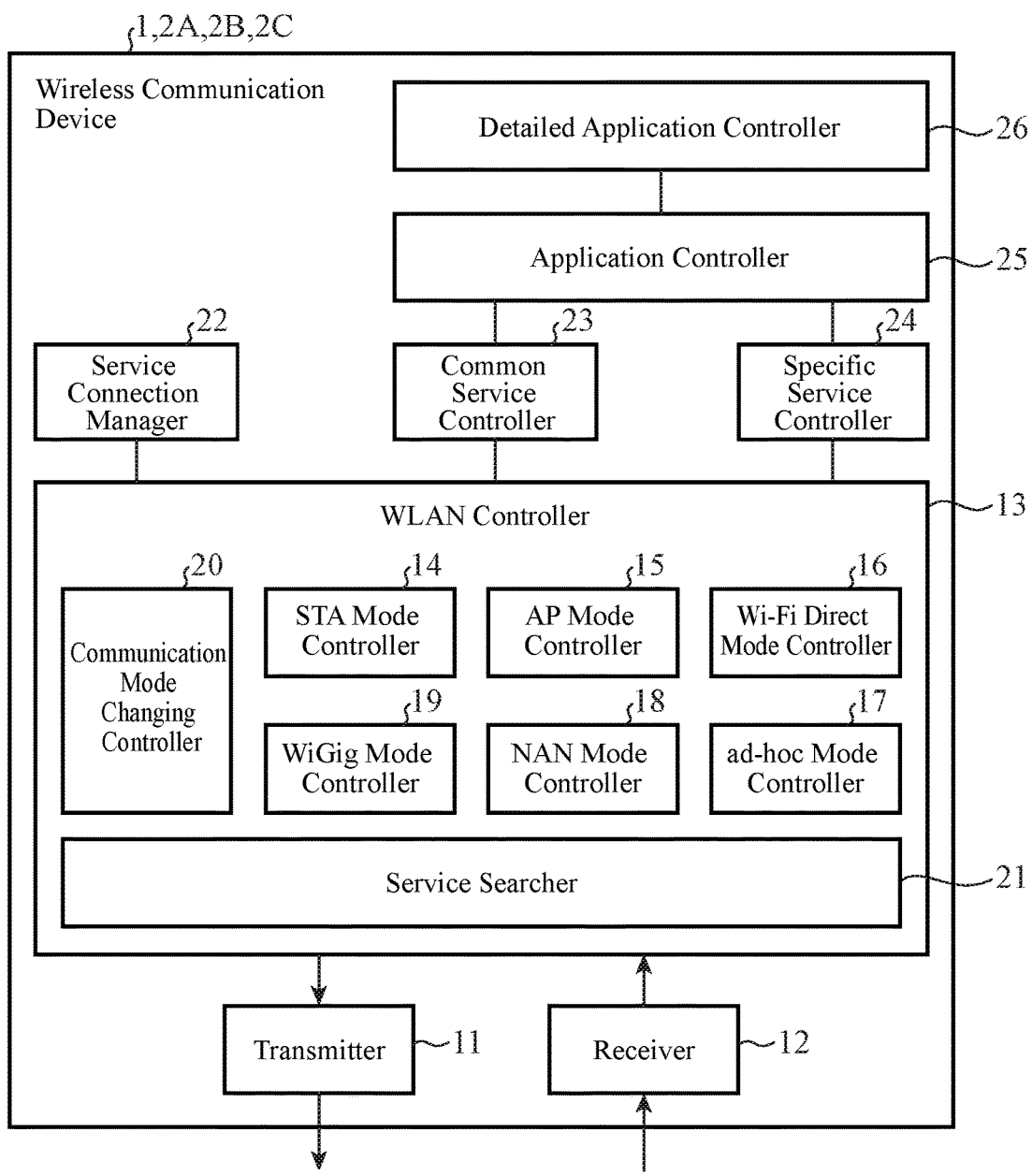
FIG. 3 is a block diagram showing the internal configuration of each of wireless communication devices 1, 2A, 2B and 2C which construct the wireless communication system shown in FIG. 1.

FIG. 3 is a block diagram showing the internal configuration of each of the wireless communication devices 1, 2A, 2B and 2C which construct the wireless communication system shown in FIG. 1.

Referring to FIG. 3, a transmitter 11 is a wireless communication circuit having a transmission function conforming to, for example, IEEE802.11, and transmits a wireless LAN frame to a wireless communication device, which is a communication partner connected thereto via a wireless link 3, under control by a WLAN controller 13. The transmitter also performs a carrier sense determining process based on carrier sense multiple access (CSMA) or collision avoidance (CA).

Because the carrier sense multiple access and the collision avoidance are known techniques, a detailed explanation of these techniques will be omitted hereafter.

A receiver 12 is a wireless communication circuit having a reception function conforming to, for example, IEEE802.11, and receives a wireless LAN frame transmitted from a wireless communication device which is a communication partner connected thereto via a wireless link 3. The receiver also performs a process of determining whether or not to transmit an ACK (acknowledgment) frame for a wireless LAN frame whose address is a unicast one.

The WLAN controller 13 includes an STA mode controller 14, an AP mode controller 15, a Wi-Fi direct mode controller 16, an ad-hoc mode controller 17, an NAN mode controller 18, a WiGig mode controller 19 and a communication mode changing controller 20, in order to support the plurality of communication modes.

The WLAN controller 13 also includes a service searcher 21 in order to search for a service and an application which the corresponding wireless communication device can provide.

When the communication mode is set to an STA mode in infrastructure modes, the STA mode controller 14 controls the wireless communications with the wireless communication device which is the communication partner in such a way that the wireless communications are performed in the STA mode.

When the communication mode is set to an AP mode in the infrastructure modes, the AP mode controller 15 controls the wireless communications with the wireless communication device which is the communication partner in such a way that the wireless communications are performed in the AP mode.

When the communication mode is set to a Wi-Fi direct mode, the Wi-Fi direct mode controller 16 controls the wireless communications with the wireless communication device which is the communication partner in such a way that the wireless communications are performed in the Wi-Fi direct mode.

When the communication mode is set to an ad-hoc mode, the ad-hoc mode controller 17 controls the wireless communications with the wireless communication device which is the communication partner in such a way that the wireless communications are performed in the ad-hoc mode.

When the communication mode is set to an NAN mode, the NAN mode controller 18 controls the wireless communications with the wireless communication device, which is the communication partner, in such a way that the wireless communications are performed in the NAN mode.

When the communication mode is set to a WiGig mode, the WiGig mode controller 19 controls the wireless communications with the wireless communication device, which is the communication partner, in such a way that the wireless communications are performed in the WiGig mode.

Although the example in which the WLAN controller 13 includes the STA mode controller 14, the AP mode controller 15, the Wi-Fi direct mode controller 16, the ad-hoc mode controller 17, the NAN mode controller 18 and the WiGig mode controller 19 is shown in FIG. 3, the WLAN controller 13 can alternatively include one or more of the STA mode controller 14, the AP mode controller 15, the Wi-Fi direct mode controller 16, the ad-hoc mode controller 17, the NAN mode controller 18 and the WiGig mode controller 19 because each wireless communication device has only to support at least one communication mode.

The communication mode changing controller 20 performs a process of changing a communication mode.

More specifically, the communication mode changing controller 20 of the wireless communication device 1 collects pieces of communication mode information showing the communication modes supported by the wireless communication devices 2A, 2B and 2C, the pieces of communication mode information being respectively included in the action (application service response) frames collected by the service searcher 21, which will be described later, and received from the wireless communication devices 2A, 2B and 2C.

Further, when establishing a wireless connection with the wireless communication device 2A (or 2B or 2C), the communication mode changing controller 20 of the wireless communication device 1 selects the communication mode corresponding to the communication mode of the wireless communication device 1 from among the communication modes shown by the collected communication mode information, and outputs an action (mode change request) frame to the transmitter 11, the action (mode change request) frame conforming to a protocol which makes it possible to perform wireless communications with the wireless communication device 2A (or 2B or 2C) regardless of the setting of a communication mode to the wireless communication device 2A (or 2B or 2C), thereby transmitting the action (mode change request) frame to the wireless communication device 2A (or 2B or 2C). This action (mode change request) frame corresponds to a request to change to the selected communication mode.

The communication mode changing controller 20 and the receiver 12 of the wireless communication device 1 construct a communication mode information collector, and the communication mode changing controller 20 and the transmitter of the wireless communication device 1 construct a communication mode change requester.

When the receiver 12 receives the action (mode change request) frame from the wireless communication device 1, the communication mode changing controller 20 of each of the wireless communication devices 2A, 2B and 2C changes the communication mode in accordance with the action (mode change request) frame. The communication mode changing controller 20 and the receiver 12 of each of the wireless communication devices 2A, 2B and 2C construct a communication mode changer.

Although the example in which the communication mode changing controller 20 of the wireless communication device 1 provides a request to change the communication mode to the wireless communication device 2A (or 2B or 2C) is shown above, the communication mode of the wireless communication device 1 can be alternatively changed instead of changing the communication mode of the wireless communication device 2A (or 2B or 2C).

As an alternative, the communication modes of both the wireless communication device 1 and the wireless communication device 2A (or 2B or 2C) can be changed.

The service searcher 21 performs a process of searching for services (providable services) managed by a common service controller 23 and those managed by a specific service controller 24, and applications corresponding to these services, and displaying pieces of information about these applications (e.g., their names and the overviews of the applications) on the display of the corresponding wireless communication device.

Particularly, the service searcher 21 of the wireless communication device 1 includes a selection receiver (e.g., a user interface such as a touch panel) for allowing the user to select a desired application, and an information transmission request sender that, when the selection receiver receives a selection of an application, broadcasts an action (application service request) frame including the ID of the selected application, via the transmitter 11, to the wireless communication devices 2A, 2B and 2C by using all the frequency channels usable in the wireless LAN while changing the frequency channel to be used.

The service searcher 21 of the wireless communication device 1 also includes an information receiver that, when the receiver 12 receives an action (application service response) frame from one of the wireless communication devices 2A, 2B and 2C as a response to the action (application service request) frame, collects various pieces of information (e.g., information about providable services, the ID of the application selected by the user, and information about the supported communication modes) included in the action (application service response) frame.

The service searcher 21, the transmitter 11 and the receiver 12 of the wireless communication device 1 construct an information collector.

The service searcher 21 of each of the wireless communication devices 2A, 2B and 2C includes an information transmission request receiver that, when the receiver 12 receives the action (application service request) frame from the wireless communication device 1, acquires the ID of the application from the action (application service request) frame, a determinator that determines whether the corresponding wireless communication device can provide the application (determines whether an application controller 25 manages the application), and an information responder that, when the corresponding wireless communication device can provide the application, transmits, as a response to the action (application service request) frame, an action (application service response) frame including various pieces of information (e.g., the information about providable services, the ID of the application selected by the wireless communication device 1, and the information about the supported communication modes) to the wireless communication device 1 via the transmitter 11.

The service searcher 21, the transmitter 11 and the receiver 12 of the wireless communication device 1 construct an information transmitter.

A service connection manager 22 records a service connection management table showing a correspondence between services corresponding to applications and connecting levels of wireless connection.

Further, the service connection manager 22 includes a user interface (e.g., a keyboard, a mouse or a touch panel) that receives an edit of the correspondence recorded in the service connection management table, and performs a process of editing the correspondence recorded in the service connection management table in accordance with either the user's operation received by the user interface or a history of wireless connections. The service connection manager 22 constructs an editor.

By the way, when establishing a wireless connection with the wireless communication device 2A (or 2B or 2C), the communication mode changing controller 20 of the wireless communication device 1 refers to the service connection management table to determine the connecting level of the wireless connection in accordance with the service or the like corresponding to the application provided by the wireless communication device 2A (or 2B or 2C), and transmits an action (mode change request) frame which is a change request including the connecting level to the wireless communication device 2A (or 2B or 2C).

When the receiver 12 receives the action (mode change request) frame, the communication mode changing controller 20 of the wireless communication device 2A (or 2B or 2C) recognizes the connecting level of the wireless connection included in the action (mode change request) frame, and controls the mode of changing the communication mode in accordance with the connecting level.

More specifically, when the connecting level of the wireless connection is "forcible connection", the communication mode changing controller 20 of the wireless communication device 2A (or 2B or 2C) forcedly changes to the communication mode regardless of the presence or absence of a communication mode currently set. When the connecting level of the wireless connection is "automatic connection" and no communication mode is currently set, the communication mode changing controller changes to the communication mode. Further, when the connecting level of the wireless connection is "automatic connection" and a communication mode is currently set, or when the connecting level of the wireless connection is "user notification", the communication mode changing controller performs a process of displaying information showing that the communication mode changing controller will change the communication mode on the display or the like, and, when receiving the user's operation of issuing a command to change the communication mode, changing the communication mode.

The common service controller 23 manages pieces of information about services common among all the wireless communication devices which construct the wireless communication system (e.g., music, image, printing and moving image).

The specific service controller 24 manages pieces of information about specific services provided by the corresponding wireless communication device.

The application controller 25 manages the applications corresponding to the services managed by the common service controller 23 and the applications corresponding to the services managed by the specific service controller 24.

A detailed application controller 26 manages pieces of detailed information about the applications managed by the application controller 25.

In the example shown in FIG. 3, it is assumed that the transmitter 11, the receiver 12, the WLAN controller 13, the service connection manager 22, the common service controller 23, the specific service controller 24, the application controller 25 and the detailed application controller 26, which are the components of each of the wireless communication devices 1, 2A, 2B and 2C, are composed of pieces of hardware for exclusive use (e.g., semiconductor integrated circuits each equipped with a CPU (Central Processing Unit), or one chip microcomputers). As an alternative, each of the wireless communication devices 1, 2A, 2B and 2C may be composed of a computer.

In the case in which each of the wireless communication devices 1, 2A, 2B and 2C is composed of a computer, a program in which the details of processing performed by the transmitter 11, the receiver 12, the WLAN controller 13, the service connection manager 22, the common service controller 23, the specific service controller 24, the application controller 25 and the detailed application controller 26 are described can be stored in a memory of the computer, and a CPU of this computer can be made to execute the program stored in the memory.

Figure 4:
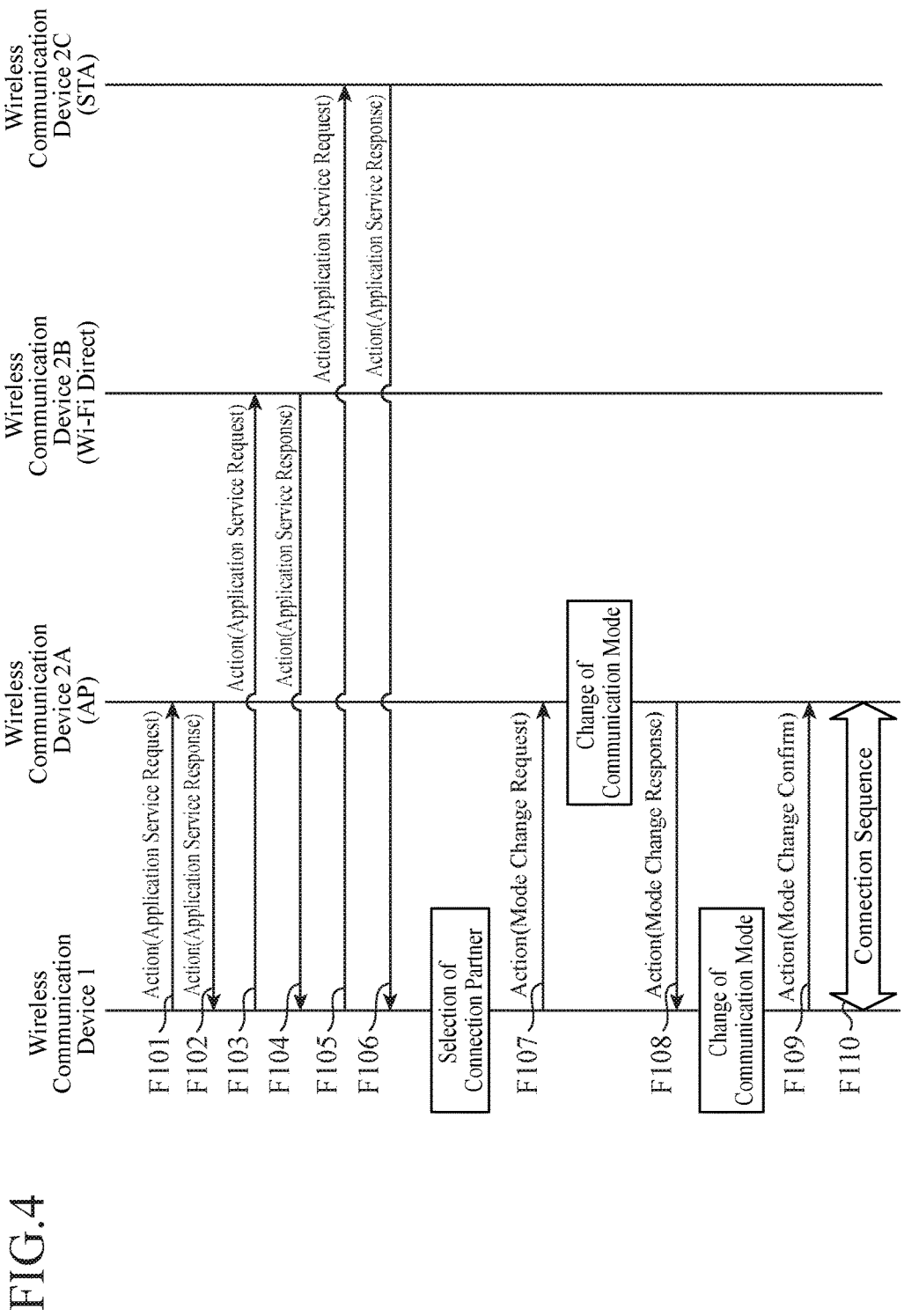
FIG. 4 is a sequence diagram showing a procedure for processing performed among the wireless communication devices which construct the wireless communication system according to Embodiment 1 of the present invention.

FIG. 4 is a sequence diagram showing a procedure for processing performed among the wireless communication devices which construct the wireless communication system according to Embodiment 1 of the present invention.

Next, operations will be explained.

First, the details of processing at the time when the wireless communication device 1 collects information about applications, or the like from each of the wireless communication devices 1, 2A, 2B and 2C will be explained.

Figure 5:
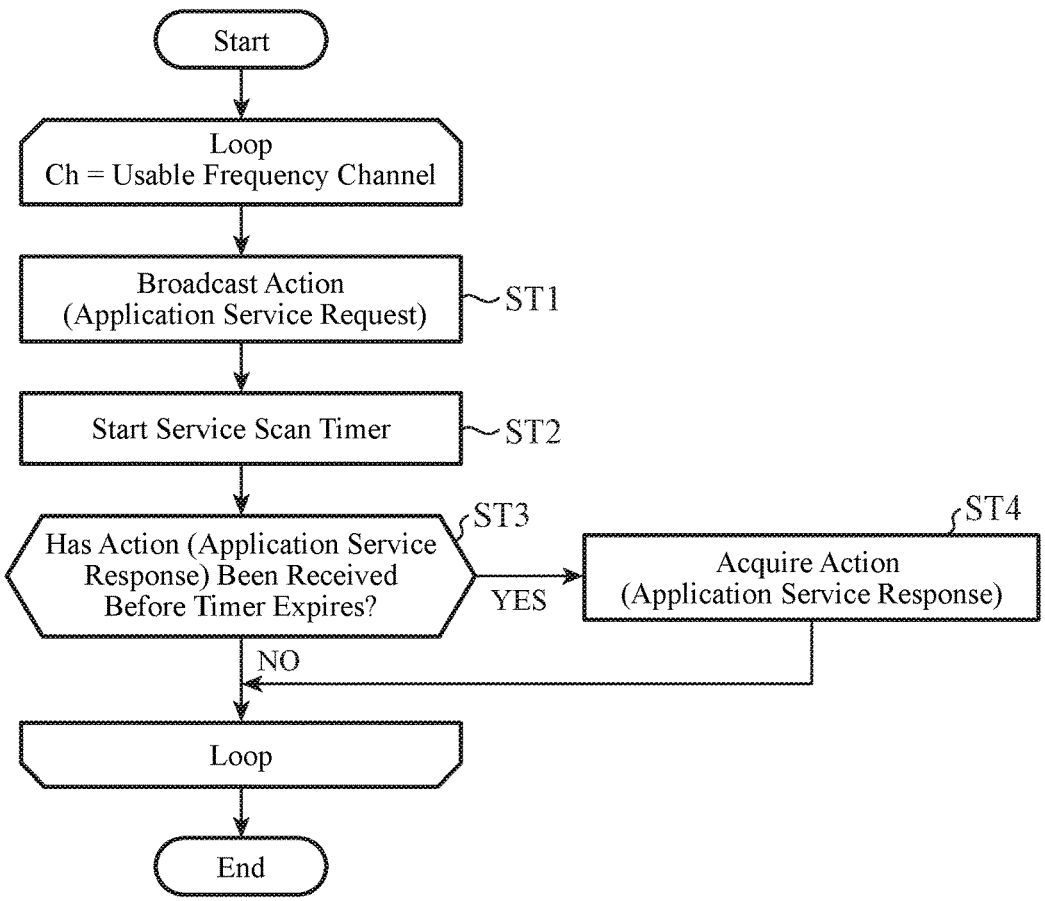
Figure 6:
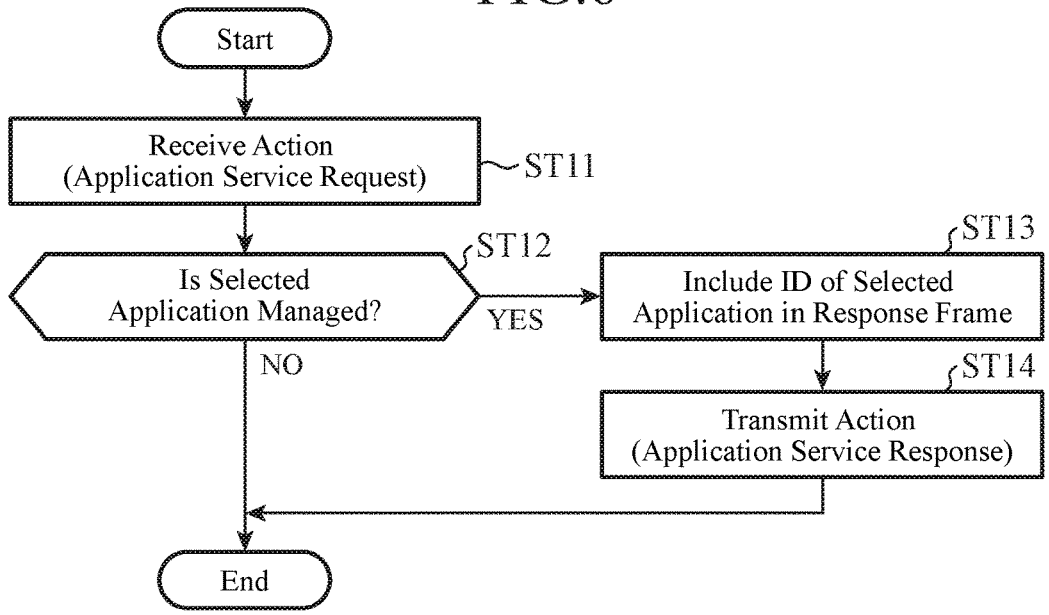

FIG. 5 is a flow chart showing the details of processing performed by the wireless communication device 1 at the time of collecting information about applications, or the like, and FIG. 6 is a flow chart showing the details of processing performed by each of the wireless communication devices 2A, 2B and 2C at the time of transmitting information about applications, or the like.

First, when the user operates the wireless communication device 1 to input a command to display providable applications, the service searcher 21 of the wireless communication device 1 searches for services (providable services) managed by the common service controller 23 and those managed by the specific service controller 24.

After finding providable services, the service searcher of the wireless communication device 1 searches for applications corresponding to these services from the application controller 25, to retrieve pieces of information about these applications (e.g., their names and overviews) from the detailed application controller 26.

The service searcher 21 of the wireless communication device 1 displays the pieces of information about the applications which the service searcher has retrieved (e.g., their names and overviews) on a display not illustrated.

When the user operates the wireless communication device 1 to select a desired application from the plurality of applications displayed on the display or the like, the service searcher 21 of the wireless communication device 1 outputs an action (application service request) frame including the ID of the selected application to the transmitter 11, thereby broadcasting the action (application service request) frame to the wireless communication devices 2A, 2B and 2C (F101, F103 and F105 of FIG. 4).

More specifically, because the wireless communication device 1 does not know which frequency channel Ch is used by each of the wireless communication devices 2A, 2B and 2C existing in the surroundings, the wireless communication device 1 broadcasts the action (application service request) frame by using all the frequency channels usable in the wireless LAN while changing the frequency channel Ch to be used. First of all, the wireless communication device 1 sets one frequency channel Ch as the frequency channel to be used from among the plurality of usable frequency channels, and broadcasts the action (application service request) frame to the wireless communication devices 2A, 2B and 2C by using the frequency channel Ch (in step ST1 of FIG. 5).

When broadcasting the action (application service request) frame, the service searcher 21 of the wireless communication device 1 also starts a timer (a service scan timer) (in step ST2 of FIG. 5).

Figure 7:
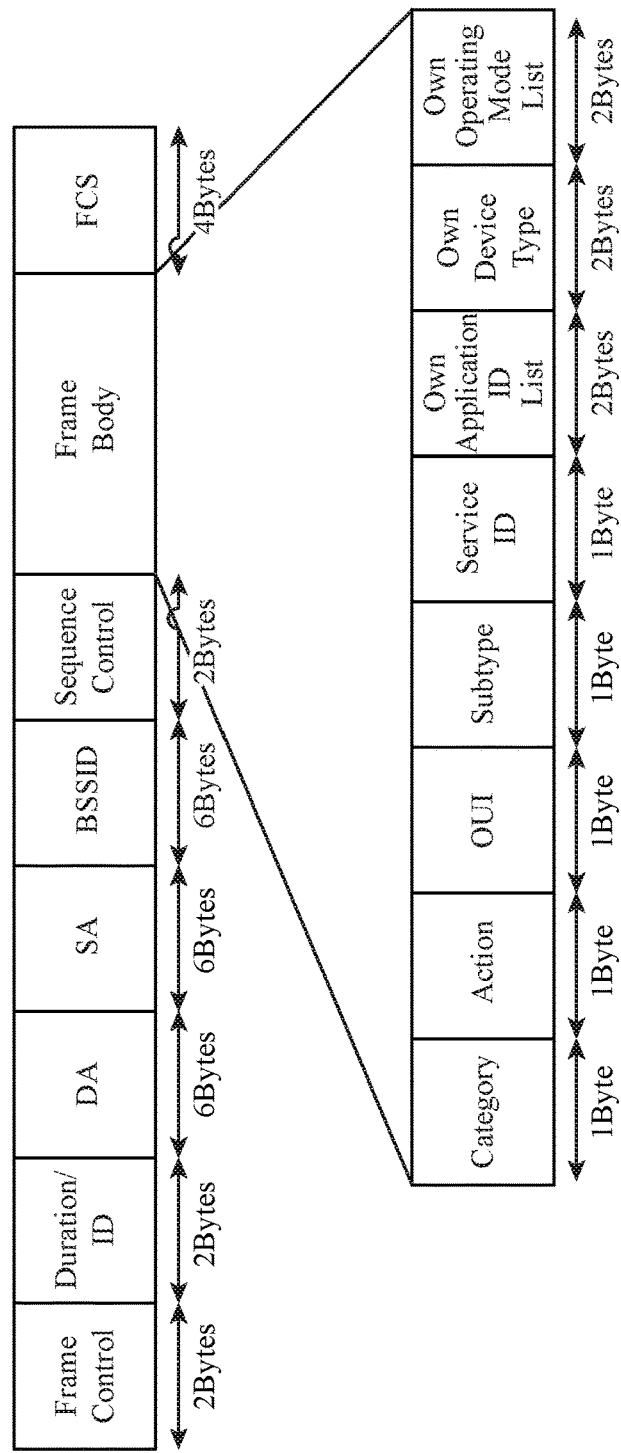
FIG. 7 is an explanatory drawing showing the format of an action (application service request) frame.

Here, the action (application service request) frame conforms to the protocol which makes it possible to perform wireless communications with the wireless communication devices 2A, 2B and 2C regardless of the setting of a communication mode to each of the wireless communication devices 2A, 2B and 2C. FIG. 7 is an explanatory drawing showing the format of the action (application service request) frame.

The ID (identification information) of the application selected by the user is set to a service ID field of the action (application service request) frame, and a list of the IDs of applications which can be provided by the wireless communication device 1 is set to an own application ID list field.

Further, the terminal type (e.g., PC, printer, router or the like) of the wireless communication device 1 is set to an own device type field, and a list of the communication modes supported by the wireless communication device 1 is set to an own operating mode list field.

For example, 0x002692 is set to OUI of the action (application service request) frame, and a value of "2" shown in FIG. 8 is set to subtype. Their values are not limited to these values.

When the receiver 12 receives the action (application service request) frame from the wireless communication device 1 (in step ST11 of FIG. 6), the service searcher 21 of each of the wireless communication devices 2A, 2B and 2C acquires the ID of the application included in the action (application service request) frame (the ID of the application selected by the wireless communication device 1).

After acquiring the ID of the application, the service searcher 21 of each of the wireless communication devices 2A, 2B and 2C checks whether the application controller 25 manages the application shown by the ID (in step ST12 of FIG. 6), and, when the application controller 25 manages this application (when YES in step ST12), determines that the application selected by the wireless communication device 1 is one which can be provided by the corresponding wireless communication device 2.

When determining that the application selected by the wireless communication device 1 is a providable one, the service searcher 21 of each of the wireless communication devices 2A, 2B and 2C includes the ID of the application selected by the wireless communication device 1 in an action (application service response) frame which is a response frame to the action (application service request) frame (in step ST13 of FIG. 6), and outputs the action (application service response) frame to the transmitter 11, thereby transmitting the action (application service response) frame to the wireless communication device 1 (F102, F104 and F106 of FIG. 4, in step ST14 of FIG. 6).

In contrast, when determining that the application selected by the wireless communication device 1 is not one which can be provided by the corresponding wireless communication device 2, the service searcher 21 of each of the wireless communication devices 2A, 2B and 2C does not transmit an action (application service response) frame to the wireless communication device 1.

Figure 9:
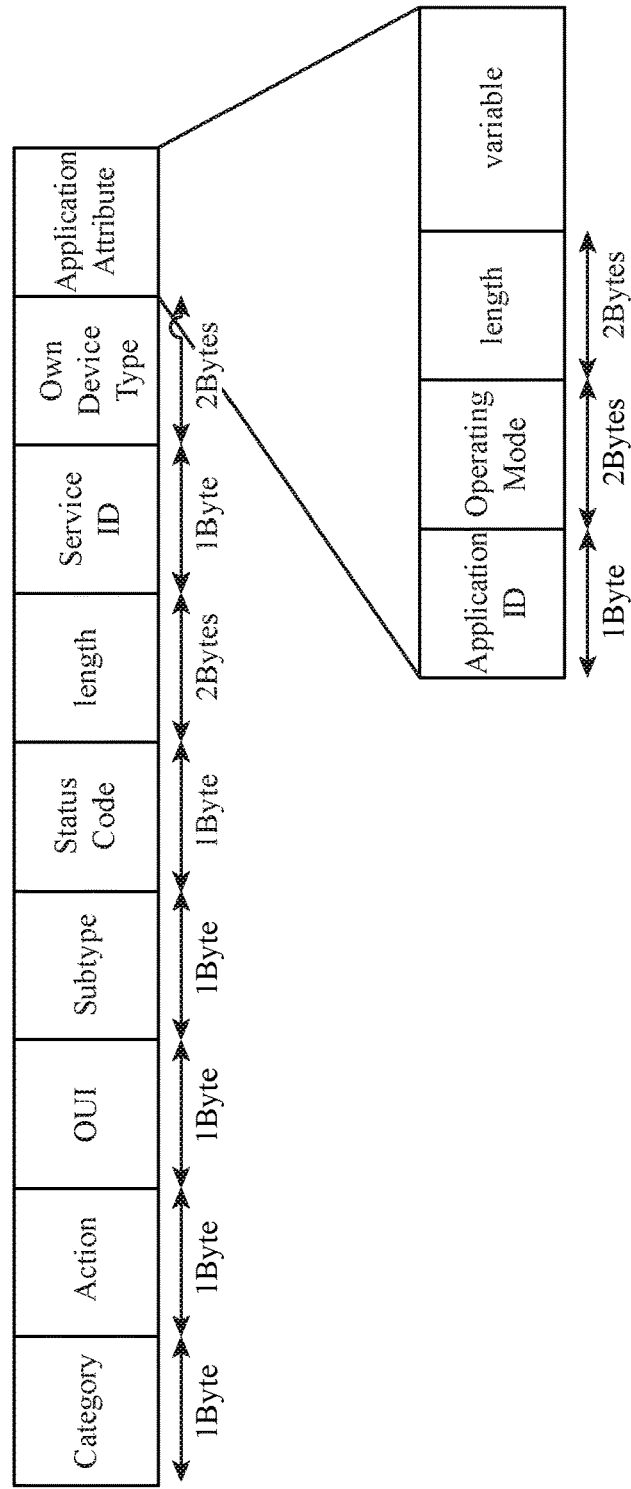
FIG. 9 is an explanatory drawing showing the format of an action (application service response) frame.

Here, the action (application service response) frame conforms to the protocol which makes it possible to perform wireless communications with the wireless communication device 1 regardless of the setting of a communication mode to the wireless communication device 1. FIG. 9 is an explanatory drawing showing the format of the action (application service response) frame.

The ID of the application selected by the wireless communication device 1 is set to an application ID field in an application attribute field of the action (application service response) frame, and a list of the communication modes supported by the corresponding wireless communication device 2 is set to an operating mode field.

Further, the length of the entire application attribute field is set to a length field, and setting information, such as a transmission rate and an encryption scheme which are supported by the wireless communication device 2, is set to a variable field.

Further, the terminal type of the wireless communication device 2 (e.g., PC, printer, router or the like) is set to an own device type field.

For example, 0x002692 is set to OUI of the action (application service response) frame, and a value of "3" shown in FIG. 8 is set to subtype. Their values are not limited to these values.

The service searcher 21 of the wireless communication device 1 determines whether the receiver 12 has received an action (application service response) frame before a fixed period of time elapses (before the started timer expires) (in step ST3 of FIG. 5) after having broadcasted the action (application service request) frame, and, when the receiver 12 receives an action (application service response) frame (when YES in step ST3 of FIG. 5), acquires the action (application service response) frame (in step ST4 of FIG. 5).

When acquiring an action (application service response) frame or when the timer has expired before the receiver 12 receives an action (application service response) frame, the service searcher 21 of the wireless communication device 1 changes the frequency channel Ch to be used and repeatedly carries out the processes of steps ST1 to ST4.

The service searcher 21 of the wireless communication device 1 outputs the action (application service response) frame acquired thereby to the communication mode changing controller 20.

Next, the details of processing at the time when the wireless communication device 1 determines a wireless communication device 2, which is a connection object, from among the wireless communication devices 2A, 2B and 2C will be explained.

Figure 10:
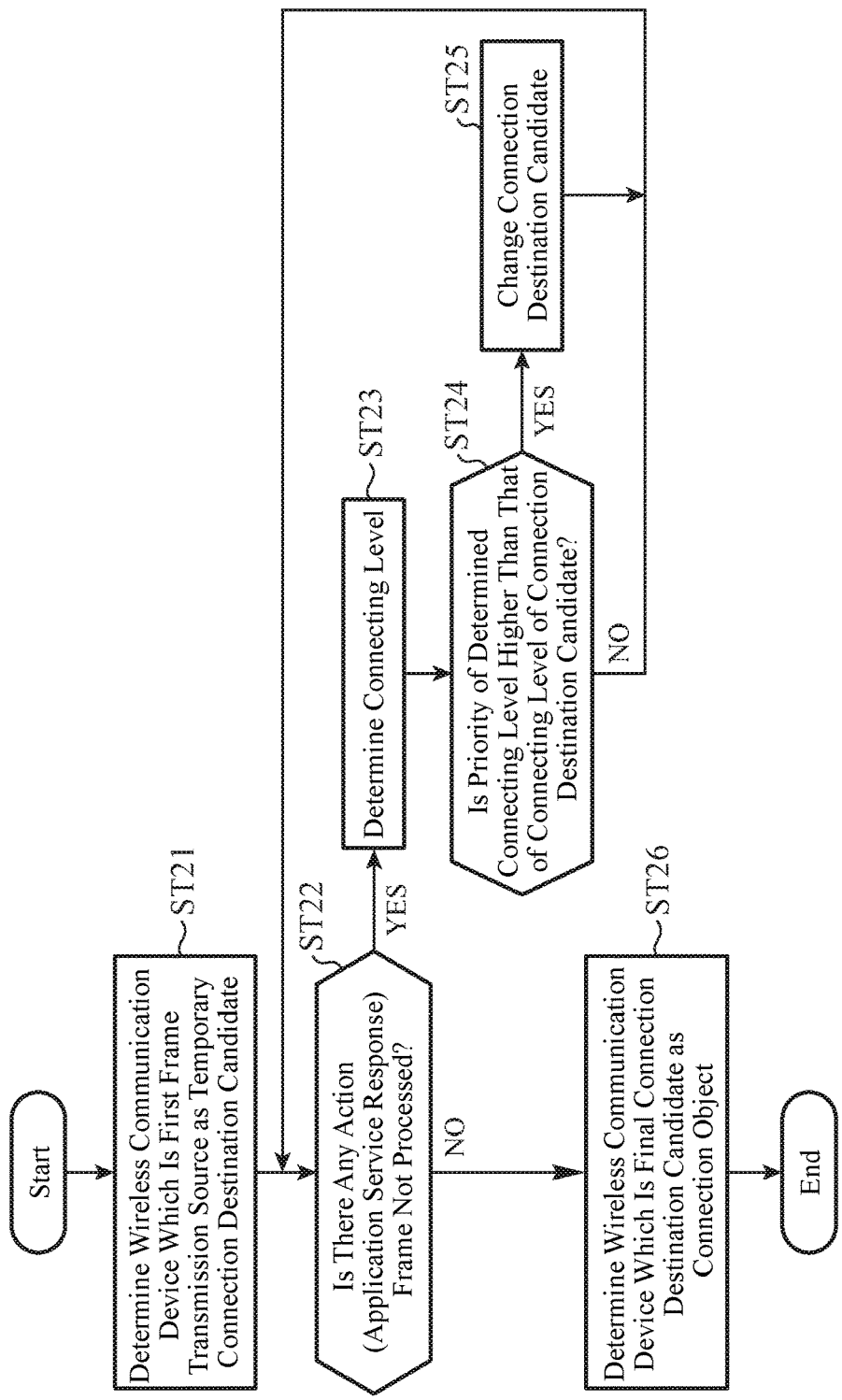
FIG. 10 is a flow chart showing the details of processing performed by the wireless communication device 1 at the time of determining a wireless communication device 2 which is a connection object.

FIG. 10 is a flowchart showing the details of processing performed by the wireless communication device 1 at the time of determining a wireless communication device 2 which is a connection object.

When receiving an action (application service response) frame transmitted from one or more wireless communication devices 2 among the wireless communication device 2A, 2B and 2C, the communication mode changing controller 20 of the wireless communication device 1 determines, as a temporary connection destination candidate, the wireless communication device 2 which is the transmission source of an action (application service response) frame which the service searcher 21 has acquired for the first time (in step ST21 of FIG. 10).

The communication mode changing controller 20 of the wireless communication device 1 also recognizes the information (e.g., the MAC address, providable applications or services, and the terminal type) about the wireless communication device 2 which is the transmission source of the action (application service response) frame which the service searcher has acquired for the first time. The communication mode changing controller can recognize the information about the wireless communication device 2 by referring to the action (application service response) frame. Although no information about providable services is included in the action (application service response) frame, the communication mode changing controller can specify providable services from the information about providable applications. The information about providable services can be included in the action (application service response) frame.

After recognizing the information about the wireless communication device 2 which is the first frame transmission source, the communication mode changing controller 20 of the wireless communication device 1 compares the information about the wireless communication device 2 which is the first frame transmission source with the service connection management table recorded in the service connection manager 22, thereby determining the connecting level of a wireless connection with the wireless communication device 2 which is the first frame transmission source.

FIG. 11 is an explanatory drawing showing an example of the service connection management table.

In the example shown in FIG. 11, because "11:22:33:44:55:66" is recorded as the MAC address corresponding to "forcible connection" among the connecting levels of wireless connection, and the service corresponding to "forcible connection" is "moving image", the communication mode changing controller determines the connecting level of the wireless communication device 2, which is the first frame transmission source, as "forcible connection" when the MAC address of the wireless communication device 2 which is the first frame transmission source is "11:22:33:44:55:66" and the providable service is "moving image."

Further, in the example shown in FIG. 11, because "22:33:44:55:66:77" is recorded as the MAC address corresponding to "automatic connection" among the connecting levels of wireless connection, and the service corresponding to "automatic connection" is "Internet", the communication mode changing controller determines the connecting level of the wireless communication device 2, which is the first frame transmission source, as "automatic connection" when the MAC address of the wireless communication device 2 which is the first frame transmission source is "22:33:44:55:66:77" and the providable service is "Internet."

In addition, in the example shown in FIG. 11, because the device type (terminal type) corresponding to "user notification" among the connecting levels of wireless connection is "tablet", the service corresponding to "user notification" is "music", and the application corresponding to "user notification" is "music playback application", the communication mode changing controller determines the connecting level of the wireless communication device 2, which is the first frame transmission source, as "user notification" when the terminal type of the wireless communication device 2 which is the first frame transmission source is tablet, the providable service is "music", and the providable application is "music playback application."

Further, in the example shown in FIG. 11, because the service corresponding to "neglect" among the connecting levels of wireless connection is "photo", the communication mode changing controller determines the connecting level of the wireless communication device 2, which is the first frame transmission source, as "neglect" when the service which can be provided by the wireless communication device 2, which is the first frame transmission source, is "photo."

In this Embodiment 1, it is assumed that there is a necessity for a plurality of conditions (the conditions on the MAC address and the service) to be satisfied simultaneously in order to determine the connecting level as "forcible connection" or "automatic connection", and the connecting level is determined as "user notification" when some of the conditions are not satisfied. However, this determining method is only an example, and the connecting level can be determined as "forcible connection" or "automatic connection" as long as some of the conditions are satisfied.

Next, when there is an action (application service response) frame which the wireless communication device 1 has acquired for a second time (when YES in step ST22 of FIG. 10), the communication mode changing controller 20 of the wireless communication device 1 recognizes the information (e.g., the MAC address, providable applications or services, and the terminal type) about the wireless communication device 2 which is the transmission source of the action (application service response) frame.

After recognizing the information about the wireless communication device 2 which is the second frame transmission source, the communication mode changing controller 20 of the wireless communication device 1 compares the information about the wireless communication device 2 which is the second frame transmission source with the service connection management table recorded in the service connection manager 22, like in the case of comparing the information about the wireless communication device 2 which is the first frame transmission source with the service connection management table, thereby determining the connecting level of a wireless connection with the wireless communication device 2 which is the second frame transmission source (in step ST23 of FIG. 10).

After determining the connecting level of a wireless connection with the wireless communication device 2 which is the second frame transmission source, the communication mode changing controller 20 of the wireless communication device 1 compares the priority of the connecting level of the wireless connection with that of the connecting level of the wireless connection with the wireless communication device 2 which has been determined as the connection destination candidate until this time (in step ST24 of FIG. 10), and, when the priority of the connecting level of the wireless connection with the wireless communication device 2 which is the second frame transmission source is higher than that of the connecting level of the wireless connection with the wireless communication device 2 which has been determined as the connection destination candidate until this time (when YES in step ST24), changes the connection destination candidate to the wireless communication device 2 which is the second frame transmission source (in step ST25 of FIG. 10). In contrast, when the priority of the connecting level of the wireless connection with the wireless communication device 2 which has been determined as the connection destination candidate until this time is higher than that of the connecting level of the wireless connection with the wireless communication device 2 which is the second frame transmission source (when No in step ST24), the communication mode changing controller does not change the connection destination candidate.

In the example shown in FIG. 11, because the priorities of the connecting levels of wireless connections are defined as follows: the priority of "forcible connection">the priority of "automatic connection">the priority of "user notification">the priority of "neglect", the communication mode changing controller changes the connection destination candidate to the wireless communication device 2 which is the second frame transmission source when, for example, the connecting level of the wireless connection with the wireless communication device 2 which is the first frame transmission source is "automatic connection" and the connecting level of the wireless connection with the wireless communication device 2 which is the second frame transmission source is "forcible connection."

In contrast, when the connecting level of the wireless connection with the wireless communication device 2 which is the second frame transmission source is "user notification", the communication mode changing controller holds the connection destination candidate be the wireless communication device 2 which is the first frame transmission source, instead of changing the connection destination candidate.

In this Embodiment 1, when the connecting level of the wireless connection with the wireless communication device 2 which is the second frame transmission source is the same as that of the wireless connection with the wireless communication device 2 which is the first frame transmission source, the communication mode changing controller does not change the connection destination candidate. However, this embodiment is limited to this example.

Next, when there is an action (application service response) frame which the wireless communication device 1 has acquired for an n-th (n=3, 4, . . . ) time (when YES in step ST22 of FIG. 10), the communication mode changing controller 20 of the wireless communication device 1 performs the same processes as those on the action (application service response) frame which the wireless communication device has acquired for the second time (in steps ST23 to ST25 of FIG. 10).

After the service searcher 21 performs the same processes on all the action (application service response) frames which the wireless communication devices has acquired (when No in step ST22 of FIG. 10), the communication mode changing controller 20 of the wireless communication device 1 determines a wireless communication device 2 which is a final connection destination candidate as the connection object (in step ST26 of FIG. 10).

Because the service connection manager 22 includes a user interface (e.g., a keyboard, a mouse or a touch panel) that receives an edit of the correspondence recorded in the service connection management table, the user can appropriately edit (e.g., add, change or delete a condition to, in or from) the correspondence recorded in the service connection management table by operating the user interface.

The service connection manager 22 can have a function of automatically editing the correspondence recorded in the service connection management table in accordance with a history of wireless connections. There can be an example in which the service connection manager adds the MAC address of the wireless communication device with which a wireless connection has been established in the past, the service provided by the wireless communication device, etc. and the connecting level to the service connection management table.

Next, the details of processing in a stage preceding processing for, in the wireless communication device 1, making a request of the wireless communication device 2 which is the connection object to change the communication mode will be explained.

Figure 12:
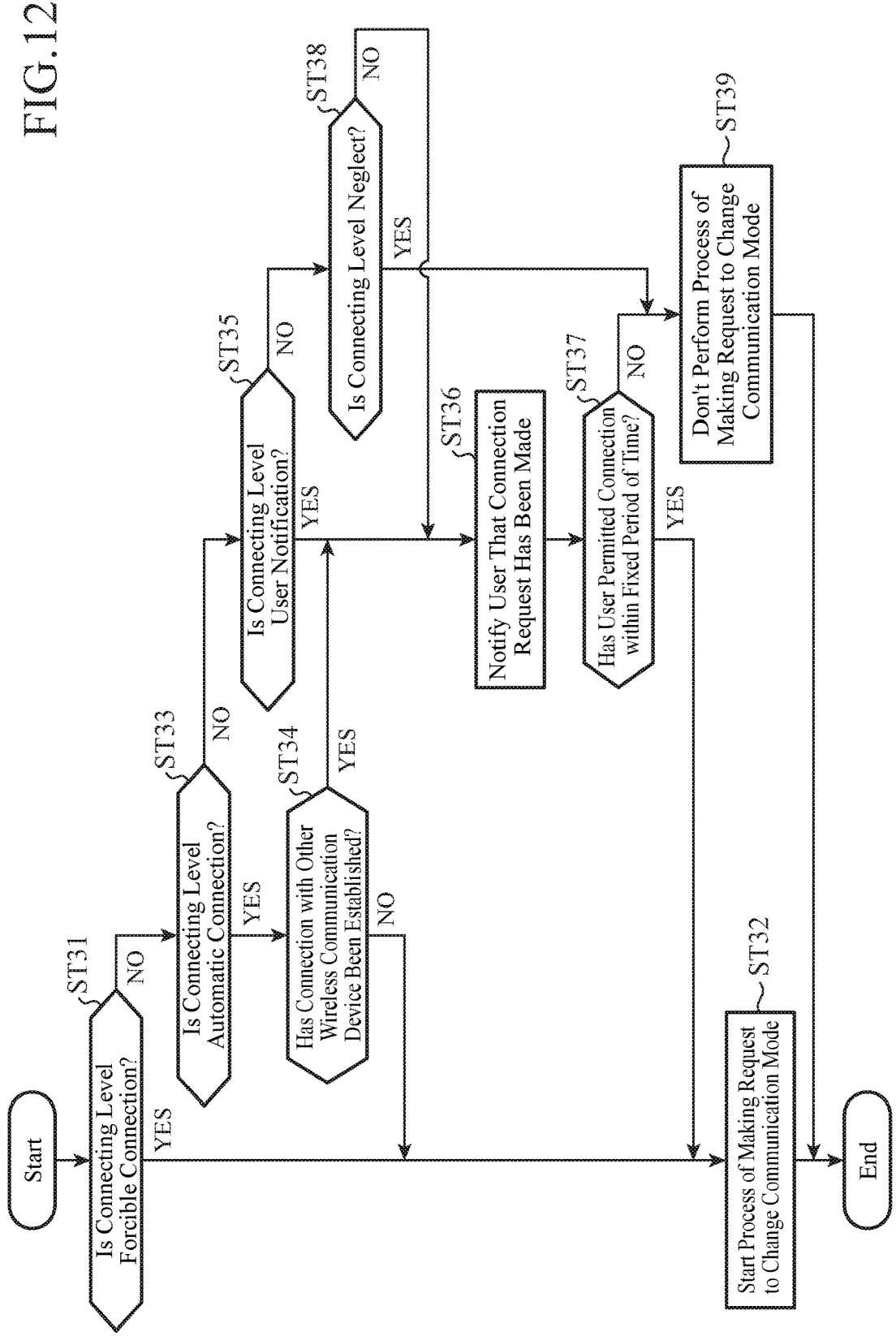
FIG. 12 is a flow chart showing the details of processing performed by the wireless communication device 1 in steps preceding a step of making a request to change a communication mode.

FIG. 12 is a flow chart showing the details of the processing, which is performed by the wireless communication device 1, in the stage preceding the processing for making a request to change the communication mode.

After determining the wireless communication device 2 which is the connection object, when the connecting level of the wireless communication device 2 which is the connection object is "forcible connection" (when YES in step ST31 of FIG. 12), the communication mode changing controller 20 of the wireless communication device 1 starts the processing for making a request to change the communication mode, which will be described later (in step ST32 of FIG. 12).

When the connecting level of the wireless communication device 2 which is the connection object is not "forcible connection" (when No in step ST31 of FIG. 12), but the connecting level of the wireless communication device 2 which is the connection object is "automatic connection" (when YES in step ST33 of FIG. 12), the communication mode changing controller 20 of the wireless communication device 1 checks whether or not a wireless connection of the wireless communication device 2, which is the connection object, with another wireless communication device has been established (in step ST34 of FIG. 12).

When no wireless connection of the wireless communication device 2 which is the connection object has been established with another wireless communication device (when No in step ST34 of FIG. 12), the communication mode changing controller 20 of the wireless communication device 1 starts the processing for making a request to change the communication mode, which will be described later (in step ST32 of FIG. 12).

When the connecting level of the wireless communication device 2 which is the connection object is not "automatic connection" (when No in step ST33 of FIG. 12), but the connecting level of the wireless communication device 2 which is the connection object is "user notification" (when Yes in step ST35 of FIG. 12), or when the connecting level of the wireless communication device 2 of the connection object is "automatic connection", but a wireless connection of the wireless communication device 2 which is the connection object has been established with another wireless communication device (when Yes in step ST34 of FIG. 12), the communication mode changing controller 20 of the wireless communication device 1 notifies the user that a request to establish a wireless connection with the wireless communication device 2 which is the connection object has been made, and notifies a message to urge the user to decide whether or not to permit the wireless connection to the user (in step ST36 of FIG. 12). The communication mode changing controller can make these notifications by, for example, displaying the messages on the display or the like of the wireless communication device 1, or producing sound outputs.

When the user performs an operation of permitting the wireless connection within a fixed period of time (when Yes in step ST37 of FIG. 12), the communication mode changing controller 20 of the wireless communication device 1 starts the processing for making a request to change the communication mode, which will be described later (in step ST32 of FIG. 12).

When the user does not perform an operation of permitting the wireless connection within the fixed period of time (when No in step ST37 of FIG. 12), or when the connecting level of the wireless communication device 2 which is the connection object is "neglect" (when Yes in step ST38 of FIG. 12), the communication mode changing controller 20 of the wireless communication device 1 does not perform the processing for making a request to change the communication mode (in step ST39 of FIG. 12).

Next, the details of the processing at the time when the wireless communication device 1 makes a request of the wireless communication device 2, which is the connection object, to change the communication mode, and the details of the processing at the time when the wireless communication device 2 which is the connection object changes the communication mode will be explained.

Figure 13:
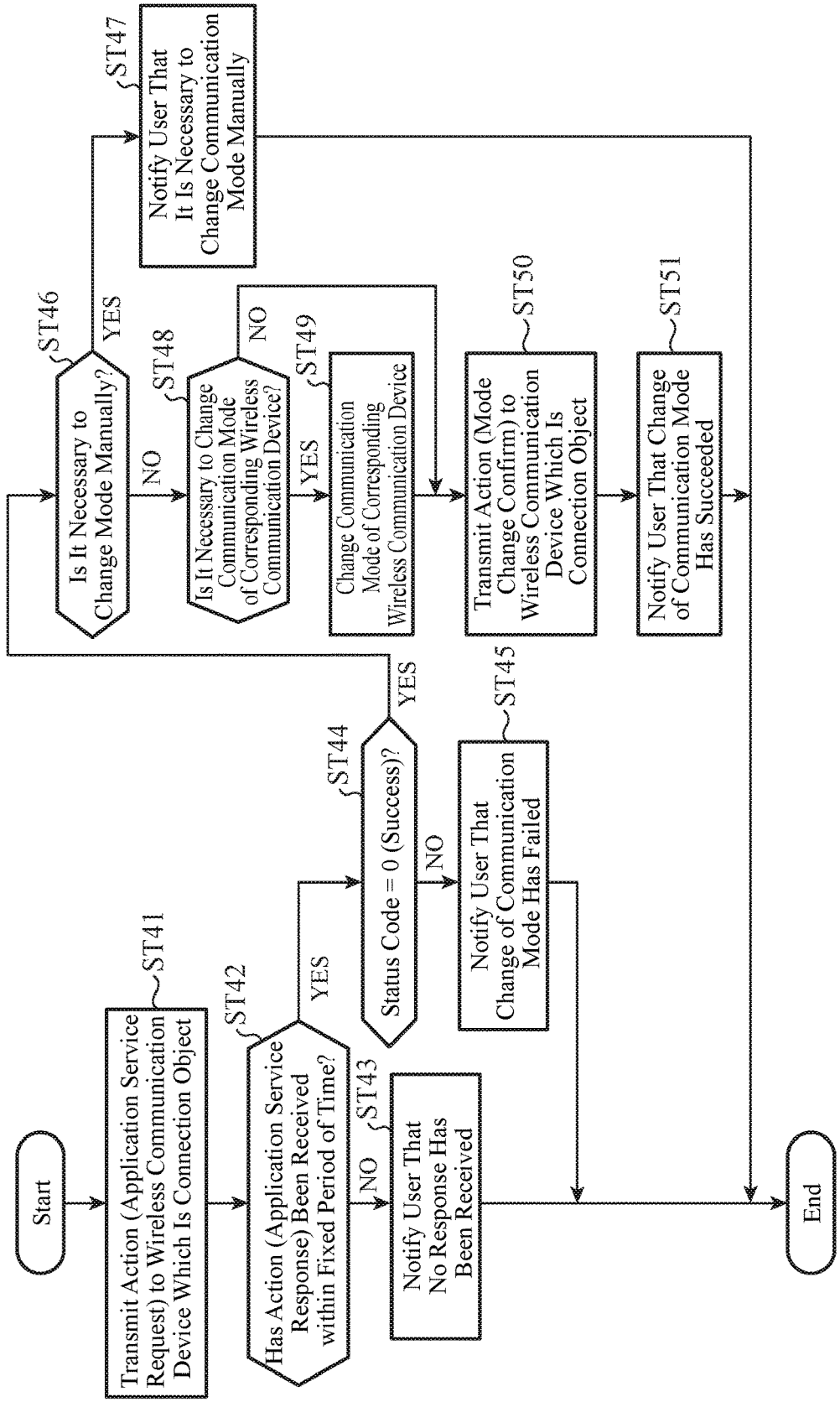
FIG. 13 is a flow chart showing the details of processing performed by the wireless communication device 1 at the time of making a request to change the communication mode.
Figure 14:
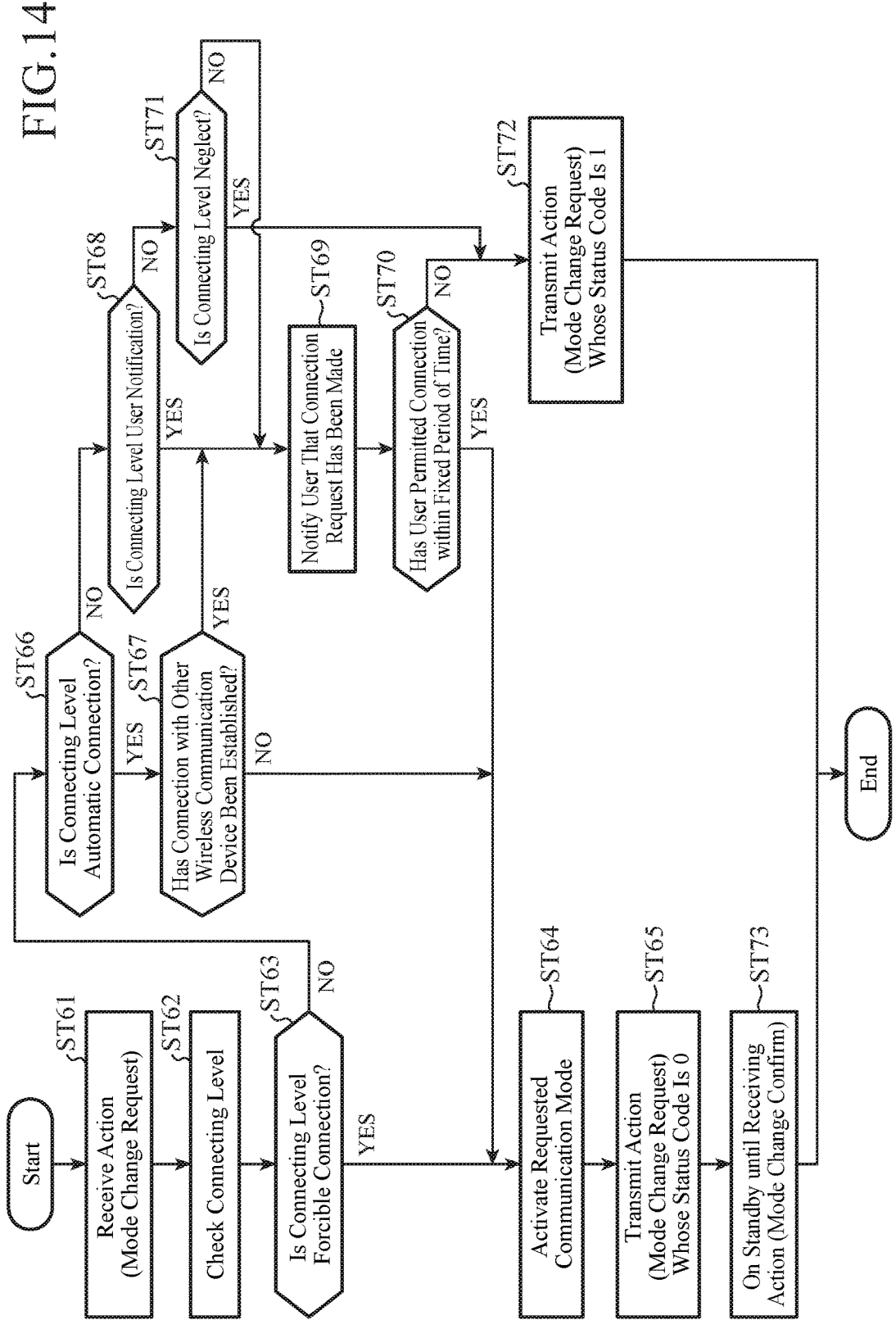
FIG. 14 is a flow chart showing the details of processing performed by each of the wireless communication devices 2A, 2B and 2C, which is a connection object, at the time of changing the communication mode.

FIG. 13 is a flow chart showing the details of the processing performed by the wireless communication device 1 at the time of making a request to change the communication mode, and FIG. 14 is a flowchart showing the details of the processing performed by the wireless communication device 2, which is the connection object, at the time of changing the communication mode.

The communication mode changing controller 20 of the wireless communication device 1 outputs an action (mode change request) frame for making a request to change the communication mode to the transmitter 11, thereby transmitting the action (mode change request) frame to the wireless communication device 2 which is the connection object (F107 of FIG. 4, in step ST41 of FIG. 13).

In this Embodiment 1, for convenience of explanation, the following explanation will be made by assuming that the wireless communication device 2 which is the connection object is the wireless communication device 2A.

Figure 15:
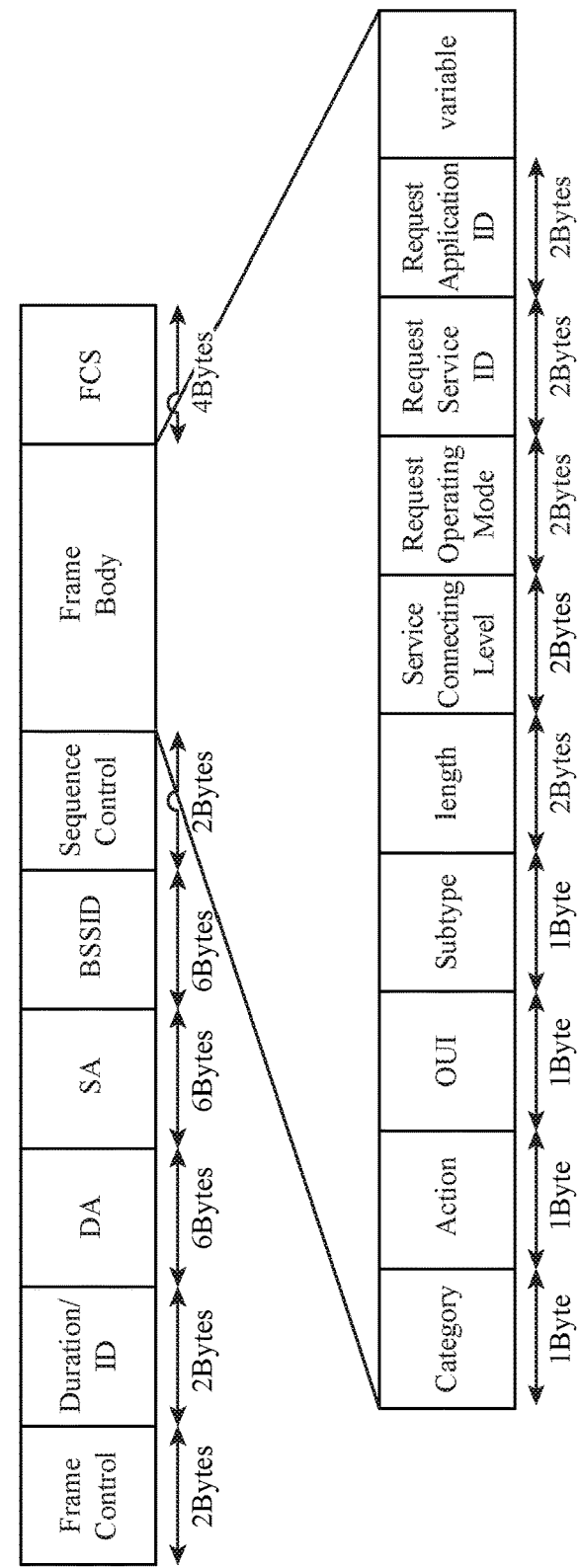
FIG. 15 is an explanatory drawing showing the format of an action (mode change request) frame.

Here, the action (mode change request) frame conforms to the protocol which makes it possible to perform wireless communications with the wireless communication device 2A, which is the connection object, regardless of the setting of a communication mode to the wireless communication device 2A. FIG. 15 is an explanatory drawing showing the format of the action (mode change request) frame.

The connecting level determined by the wireless communication device 1 (the connecting level of the wireless connection which is requested of the wireless communication device 2A which is the connection object) is set to a service connecting level field of the action (mode change request) frame, and a communication mode which is requested of the wireless communication device 2A which is the connection object (a communication mode which is supported by the wireless communication device 1 and in which wireless communications can be performed) is set to a request operating mode.

Further, the ID of the service which is requested of the wireless communication device 2A which is the connection object is set to a request service ID field, and the ID of the application which is requested of the wireless communication device 2A which is the connection object (the ID of the application selected by the user) is set to a request application ID field.

For example, 0x002692 is set to OUI of the action (mode change request) frame, and a value of "6" shown in FIG. 8 is set to subtype. Their values are not limited to these values. Further, the length of the entire frame is set to a length field.

When the receiver 12 receives the action (mode change request) frame from the wireless communication device 1, the communication mode changing controller 20 of the wireless communication device 2A which is the connection object acquires the action (mode change request) frame (in step ST61 of FIG. 14).

The communication mode changing controller 20 of the wireless communication device 2A, which is the connection object, recognizes the connecting level of the wireless connection, the connecting level being set to the service connecting level field of the action (mode change request) frame (in step ST62 of FIG. 14).

When the connecting level of the wireless connection is "forcible connection" (when Yes in step ST63 of FIG. 14), the communication mode changing controller 20 of the wireless communication device 2A, which is the connection object, ends the communication mode currently being activated, and, after that, activates the communication mode set to the request operating mode of the action (mode change request) frame (in step ST64 of FIG. 14).

After activating the communication mode which is requested by the wireless communication device 1, the communication mode changing controller 20 of the wireless communication device 2A, which is the connection object, sets "0", which shows that the communication mode changing controller has succeeded in changing the communication mode, to a status code as a response to the action (mode change request) frame, and outputs an action (mode change response) frame including the status code to the transmitter 11, thereby transmitting the action (mode change response) frame to the wireless communication device 1 (F108 of FIG. 4, in step ST65 of FIG. 14).

Figure 16:
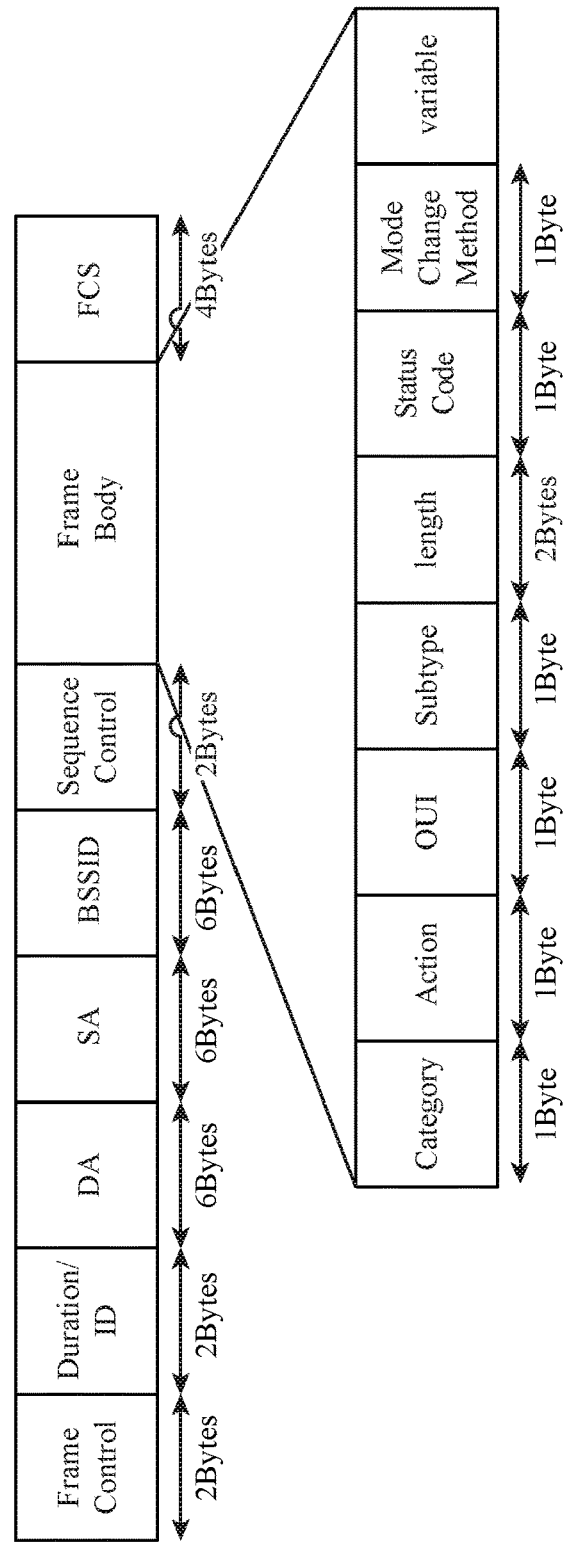
FIG. 16 is an explanatory drawing showing the format of an action (mode change response) frame.

Here, the action (mode change response) frame conforms to the protocol which makes it possible to perform wireless communications with the wireless communication device 1 regardless of the setting of a communication mode to the wireless communication device 1. FIG. 16 is an explanatory drawing showing the format of the action (mode change response) frame.

Information showing whether a change of the communication mode has succeeded or failed is set to a status code of the action (mode change response) frame. When a change of the communication mode has failed (when the wireless communication device 2A refuses the request to change the communication mode), a reason code field can be added to a variable field, and the reason why the wireless communication device has refused the request to change the communication mode can be set to the reason code field.

For example, 0x002692 is set to OUI of the action (mode change response) frame, and a value of "7" shown in FIG. 8 is set to subtype. Their values are not limited to these values.

When the connecting level is not "forcible connection" (when No in step ST63 of FIG. 14), but the connecting level is "automatic connection" (when Yes in step 66 of FIG. 14), the communication mode changing controller 20 of the wireless communication device 2A, which is the connection object, checks whether the wireless communication device has established a wireless connection with another wireless communication device (in step ST67 of FIG. 14).

When the wireless communication device 2A has not established any wireless connection with another wireless communication device (when No in step ST67 of FIG. 14), the communication mode changing controller 20 of the wireless communication device 2A, which is the connection object, activates the communication mode set to the request operating mode of the action (mode change request) frame (in step ST64 of FIG. 14).

After activating the communication mode which is requested by the wireless communication device 1, the communication mode changing controller 20 of the wireless communication device 2A, which is the connection object, sets "0", which shows that the communication mode changing controller has succeeded in changing the communication mode, to the status code as a response to the action (mode change request) frame, and then outputs an action (mode change response) frame including the status code to the transmitter 11, thereby transmitting the action (mode change response) frame to the wireless communication device 1 (F108 of FIG. 4, in step ST65 of FIG. 14), like in the case in which the connecting level is "forcible connection."

When the connecting level is not "automatic connection" (when No in step ST66 of FIG. 14), but the connecting level is "user notification" (when Yes in step ST68 of FIG. 14), or when the connecting level is "automatic connection", but a wireless connection of the wireless communication device has been established with another wireless communication device (when Yes in step ST67 of FIG. 14), the communication mode changing controller 20 of the wireless communication device 2A, which is the connection object, notifies the user that a request to establish a wireless connection with the wireless communication device has been made, and notifies a message to urge the user to decide whether or not to permit the wireless connection to the user (in step ST69 of FIG. 14). The communication mode changing controller can make these notifications by, for example, displaying the messages on the display or the like of the wireless communication device 2A which is the connection object, or producing sound outputs.

When the user performs an operation of permitting the wireless connection within a fixed period of time (when Yes in step ST70 of FIG. 14), the communication mode changing controller 20 of the wireless communication device 2A, which is the connection object, activates the communication mode set to the request operating mode of the action (mode change request) frame (in step ST64 of FIG. 14).

Further, after activating the communication mode which is requested by the wireless communication device 1, the communication mode changing controller 20 of the wireless communication device 2A, which is the connection object, sets "0", which shows that the communication mode changing controller has succeeded in changing the communication mode, to the status code as a response to the action (mode change request) frame, and then outputs an action (mode change response) frame including the status code to the transmitter 11, thereby transmitting the action (mode change response) frame to the wireless communication device 1 (F108 of FIG. 4, in step ST65 of FIG. 14), like in the case in which the connecting level is "forcible connection."

When transmitting the action (mode change response) frame including the status code of "0" to the wireless communication device 1, the communication mode changing controller 20 of the wireless communication device 2A, which is the connection object, sets "0" to a mode change method field of the action (mode change response) frame if the communication mode changing controller can automatically change the communication mode, or sets "1" to the mode change method field if the user needs to change the communication mode manually.

When the user does not perform an operation of permitting the wireless connection within the fixed period of time (when No in step ST70 of FIG. 14), or when the connecting level is "neglect" (when Yes in step ST71 of FIG. 14), the communication mode changing controller 20 of the wireless communication device 2A, which is the connection object, sets "1", which shows that the communication mode changing controller has failed in changing the communication mode, to the status code as a response to the action (mode change request) frame, and then outputs an action (mode change response) frame including the status code to the transmitter 11, thereby transmitting the action (mode change response) frame to the wireless communication device 1 (F108 of FIG. 4, in step ST72 of FIG. 14).

When the receiver 12 has not received the action (mode change response) frame from the wireless communication device 2A, which is the connection object, within a fixed period of time (when No in step ST42 of FIG. 13) after the wireless communication device 1 has transmitted the action (mode change request) frame for making a request to change the communication mode to the wireless communication device 2A which is the connection object, the communication mode changing controller 20 of the wireless communication device 1 notifies the user that no response has been received from the wireless communication device 2A which is the connection object (in step ST43 of FIG. 13), and ends the processing for changing the communication mode.

In contrast, when the receiver 12 receives the action (mode change response) frame from the wireless communication device 2A, which is the connection object, within the fixed period of time (when Yes in step ST42 of FIG. 13) after the wireless communication device 1 has transmitted the action (mode change request) frame for making a request to change the communication mode to the wireless communication device 2A which is the connection object, the communication mode changing controller 20 of the wireless communication device 1 checks whether or not the status code included in the action (mode change response) frame is "0" (a change of the communication mode has succeeded) (in step ST44 of FIG. 13).

When the status code included in the action (mode change response) frame is "1" (when No in step ST44 of FIG. 13), the communication mode changing controller 20 of the wireless communication device 1 notifies the user that a change of the communication mode has failed (in step ST45 of FIG. 13), and ends the processing for changing the communication mode.

When the status code included in the action (mode change response) frame is "0" (when Yes in step ST44 of FIG. 13), the communication mode changing controller 20 of the wireless communication device 1 recognizes the mode change method field included in the action (mode change response) frame, to determine whether the user needs to change the communication mode manually (in step ST46 of FIG. 13).

When the mode change method field included in the frame is "1" (when Yes in step ST46 of FIG. 13), the communication mode changing controller 20 of the wireless communication device 1 notifies the user that the user needs to change the communication mode manually (in step ST47 of FIG. 13), and ends the processing for changing the communication mode.

When the mode change method field included in the frame is "0" (when No in step ST46 of FIG. 13), the communication mode changing controller 20 of the wireless communication device 1 determines whether or not it is necessary to change the communication mode of the wireless communication device 1 (in step ST48 of FIG. 13).

For example, when being able to perform wireless communications with the wireless communication device 2A, which is the connection object, by simply changing the communication mode of the wireless communication device 2A which is the connection object, the communication mode changing controller determines that it is not necessary to change the communication mode of the wireless communication device 1. In contrast, when the communication mode changing controller cannot perform wireless communications with the wireless communication device 2A which is the connection object without changing the communication mode of the wireless communication device 1 even though changing the communication mode of the wireless communication device 2A which is the connection object, the communication mode changing controller determines that it is necessary to change the communication mode of the wireless communication device 1.

After determining that it is necessary to change the communication mode of the wireless communication device 1 (when Yes in step ST48 of FIG. 13), the communication mode changing controller 20 of the wireless communication device 1 changes the communication mode of the wireless communication device 1 to a communication mode in which the wireless communication device 1 can perform wireless communications with the wireless communication device 2A which is the connection object (in step ST49 of FIG. 13).

The communication mode changing controller 20 of the wireless communication device 1 outputs an action (mode change confirm) frame to the transmitter 11, thereby transmitting the action (mode change confirm) frame to the wireless communication device 2A which is the connection object (F109 of FIG. 4, in step ST50 of FIG. 13).

Figure 17:
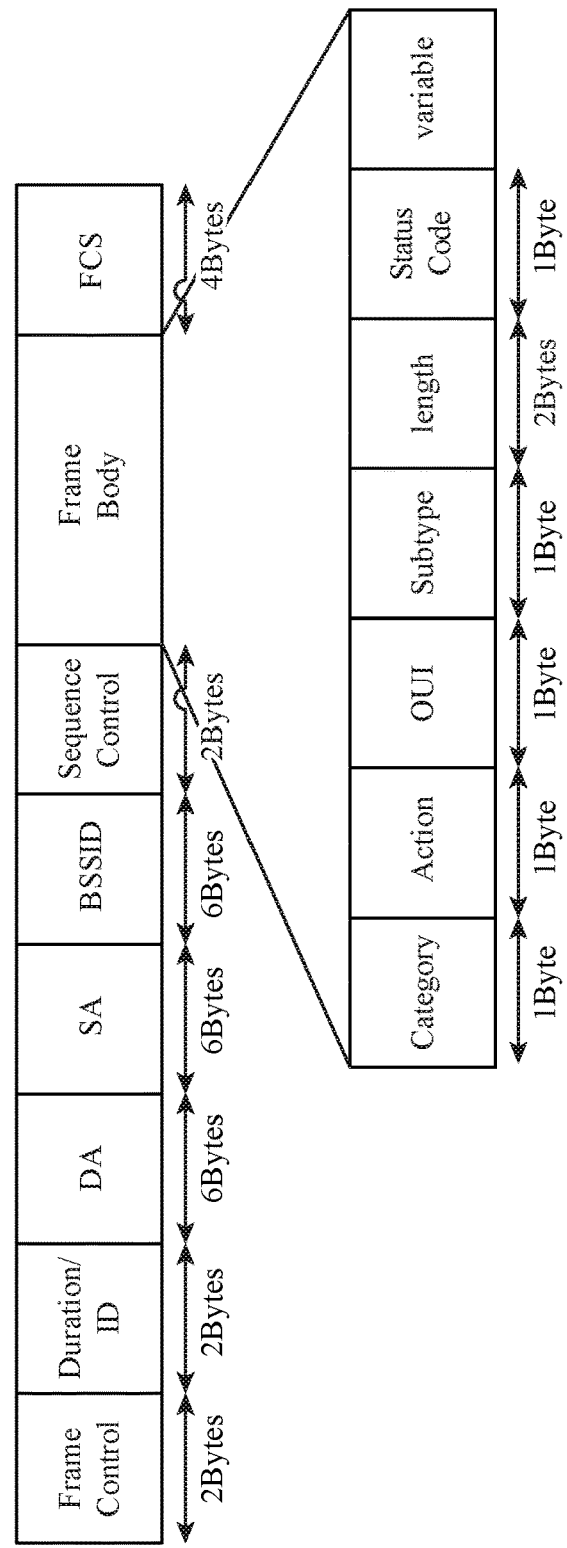
FIG. 17 is an explanatory drawing showing the format of an action (mode change confirm) frame.

Here, the action (mode change confirm) frame conforms to the protocol which makes it possible to perform wireless communications with the wireless communication device 2A, which is the connection object, regardless of the setting of a communication mode to the wireless communication device 2A. FIG. 17 is an explanatory drawing showing the format of the action (mode change confirm) frame.

"0" is set to a status code of the action (mode change confirm) frame when a change of the communication mode of the wireless communication device 1 has succeeded, whereas "1" is set to the status code when a change of the communication mode of the wireless communication device 1 has failed.

For example, 0x002692 is set to OUI of the action (mode change confirm) frame, and a value of "8" shown in FIG. 8 is set to subtype. Their values are not limited to these values.

After transmitting the action (mode change confirm) frame whose status code is "0" to the wireless communication device 2A which is the connection object, the communication mode changing controller 20 of the wireless communication device 1 notifies the user that a change of the communication mode has succeeded (in step ST51 of FIG. 13).

After transmitting the action (mode change response) frame whose status code is "0" to the wireless communication device 1, the communication mode changing controller 20 of the wireless communication device 2A which is the connection object is on standby until the receiver 12 receives the action (mode change confirm) frame from the wireless communication device 1 (in step ST73 of FIG. 14).

When a change of the communication mode in the wireless communication device 1 and a change of the communication mode in the wireless communication device 2A which is the connection object have succeeded, a known connection sequence is performed, after that, between the wireless communication device 1 and the wireless communication device 2A which is the connection object, to establish a wireless connection, and wireless communications are started (F110 of FIG. 4).

As can be seen from the above description, because each of the wireless communication devices 2A, 2B and 2C according to this Embodiment 1 is configured in such away as to transmit information about applications which can be provided thereby in accordance with a protocol which makes it possible to perform wireless communications with the wireless communication device 1 regardless of the setting of a communication mode to the wireless communication device 1, and the wireless communication device 1 is configured in such a way as to collect the information about applications transmitted from each of the wireless communication devices 2A, 2B and 2C, and there is an advantage in that the information about providable applications from each of the wireless communication devices 2A, 2B and 2C existing in the surroundings can be acquired, regardless of the setting of a communication mode.

Further, according to this Embodiment 1, the wireless communication device 1 has the function of collecting the communication mode information showing the communication modes supported by each of the wireless communication devices 2A, 2B and 2C in accordance with a protocol which makes it possible to perform wireless communications with the wireless communication device 2A, 2B and 2C regardless of the setting of a communication mode to each of the wireless communication devices 2A, 2B and 2C, and selecting a communication mode corresponding to the communication mode of the wireless communication device 1 from among those communication modes, and also determining the wireless communication device 2A which is the connection object and transmitting a request to change the communication mode to the selected communication mode to the wireless communication device 2A which is the connection object, and the wireless communication device 2A which is the connection object is configured in such a way as to change the communication mode in accordance with the change request transmitted from the wireless communication device 1, so that the wireless communication device 1 can start wireless communications between the wireless communication device 1 itself and the wireless communication device 2 without causing the user to perform an operation of selecting a communication mode and changing to this communication mode, an operation of determining the wireless communication device 2A which is the connection object, and so on, and there is an advantage in that the convenience of the user operation can be improved.

Although, in this Embodiment 1, the example, in which each wireless communication device transmits and receives an action (mode change request) frame, an action (mode change response) frame and an action (mode change confirm) frame, is shown, information after change of the communication mode (e.g., an operating frequency channel, a supported rate or a security method) can be superposed as an option for each of these frames.

Although, in this Embodiment 1, the example, in which the wireless communication device 2A which is the connection object transmits an action (mode change response) frame to the wireless communication device 1 after changing the communication mode, is shown, the wireless communication device 2A can alternatively transmit an action (mode change response) frame to the wireless communication device 1 before changing the communication mode.

In this case, the wireless communication device 1 can detect that the communication mode of the wireless communication device 2A which is the connection object has been changed from the behavior of the wireless communication device 2 after change of the communication mode. For example, when the communication mode of the wireless communication device 2 is the AP mode, the wireless communication device 1 can detect that the communication mode of the wireless communication device 2 has been changed to the AP mode, by receiving a beacon frame transmitted from the wireless communication device 2.

Further, when the communication mode of the wireless communication device 2 is the STA mode or the Wi-Fi direct mode, the wireless communication device 1 can detect that the communication mode of the wireless communication device 2 has been changed to the STA mode or the Wi-Fi direct mode, by receiving a probe request frame transmitted from the wireless communication device 2.

Although, in this Embodiment 1, the example, in which the wireless communication device 1 transmits an action (mode change confirm) frame to the wireless communication device 2A which is the connection object, is shown, after completing a change of the communication mode, the wireless communication device 1 can alternatively notify the completion of a change of the communication mode to the wireless communication device 2A which is the connection object, by superposing a flag (mode change confirm IE) showing that a change of the communication mode has been completed onto a frame which the wireless communication device 1 transmits, after changing the communication mode.

Figure 18:
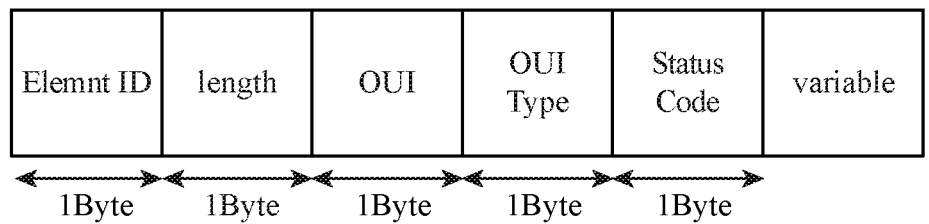
FIG. 18 is an explanatory drawing showing the format of a mode change confirm IE.

FIG. 18 is an explanatory drawing showing the format of the mode change confirm IE.

"0" is set to a status code of the mode change confirm IE when a change of the communication mode has succeeded, whereas "1" is set to the status code when a change of the communication mode has failed.

As the frame onto which the mode change confirm IE is superposed, for example, when the communication mode is changed to the STA mode or the Wi-Fi direct mode, a probe request frame with which to scan wireless communication devices, an authentication frame transmitted at the time of starting a connection, or the like can be provided. As an alternative, when the communication mode is changed to the AP mode, a beacon frame or the like can be provided. However, the frame onto which the mode change confirm IE can be superposed is not limited to either of the above-mentioned frames.

Although in this Embodiment 1 the example in which the service connection manager 22 records the service connection management table therein is shown, as elements recorded in the service connection management table, for example, the transmission standards of wireless LAN (IEEE802.11a/b/g/n/ac/ad etc.) supported by the corresponding wireless communication device, other communications systems (3G/GSM/LTE/LTE-ADVANCED/Wi-MAX etc.) with which the wireless communication device is connected, and the communication quality of each channel can be added.

By adding such elements to be recorded in the service connection management table, the connecting level of a wireless connection can be determined finely. Further, these elements can be handled as pieces of information about services or applications, and notified to other wireless communication devices.

Although in this Embodiment 1 an action (application service request) frame and an action (application service response) are used when collecting information about applications, a GAS protocol which defines a service acquisition method in an existing wireless LAN and which conforms to 802.11u, or a service discovery protocol in the Wi-Fi direct mode can be supported as a protocol which makes it possible to perform wireless communications regardless of the setting of a communication mode, so as to collect information about applications, or the like.

For example, a wireless communication device whose communication mode is the AP mode can be configured in such a way as to acquire information about applications by using the GAS protocol, and a wireless communication device whose communication mode is the Wi-Fi direct mode can be configured in such away as to acquire information about applications, or the like by using the service discovery protocol.

Embodiment 2

Although in above-mentioned Embodiment 1 the example in which when the user selects a desired application, the service searcher 21 of the wireless communication device 1 broadcasts an action (application service request) frame including the ID of the selected application to the wireless communication devices 2A, 2B and 2C, and receives, as a response to the frame, an action (application service response) frame from each of the wireless communication devices 2A, 2B and 2C is shown, the wireless communication device 1 can alternatively broadcast an action (service request) frame not including the ID of the application selected by the user to the wireless communication devices 2A, 2B and 2C, and receive, as a response to the frame, an action (service response) frame including information about services which can be provided by each of the wireless communication devices 2A, 2B and 2C from the wireless communication device.

The configuration of each of wireless communication devices 1, 2A, 2B and 2C according to this embodiment is the same as that shown in FIG. 3, like that shown in above-mentioned Embodiment 1.

Hereafter, the details of processing performed by the wireless communication device 1 and the details of processing performed by each of the wireless communication devices 2A, 2B and 2C will be explained concretely.

Figure 19:
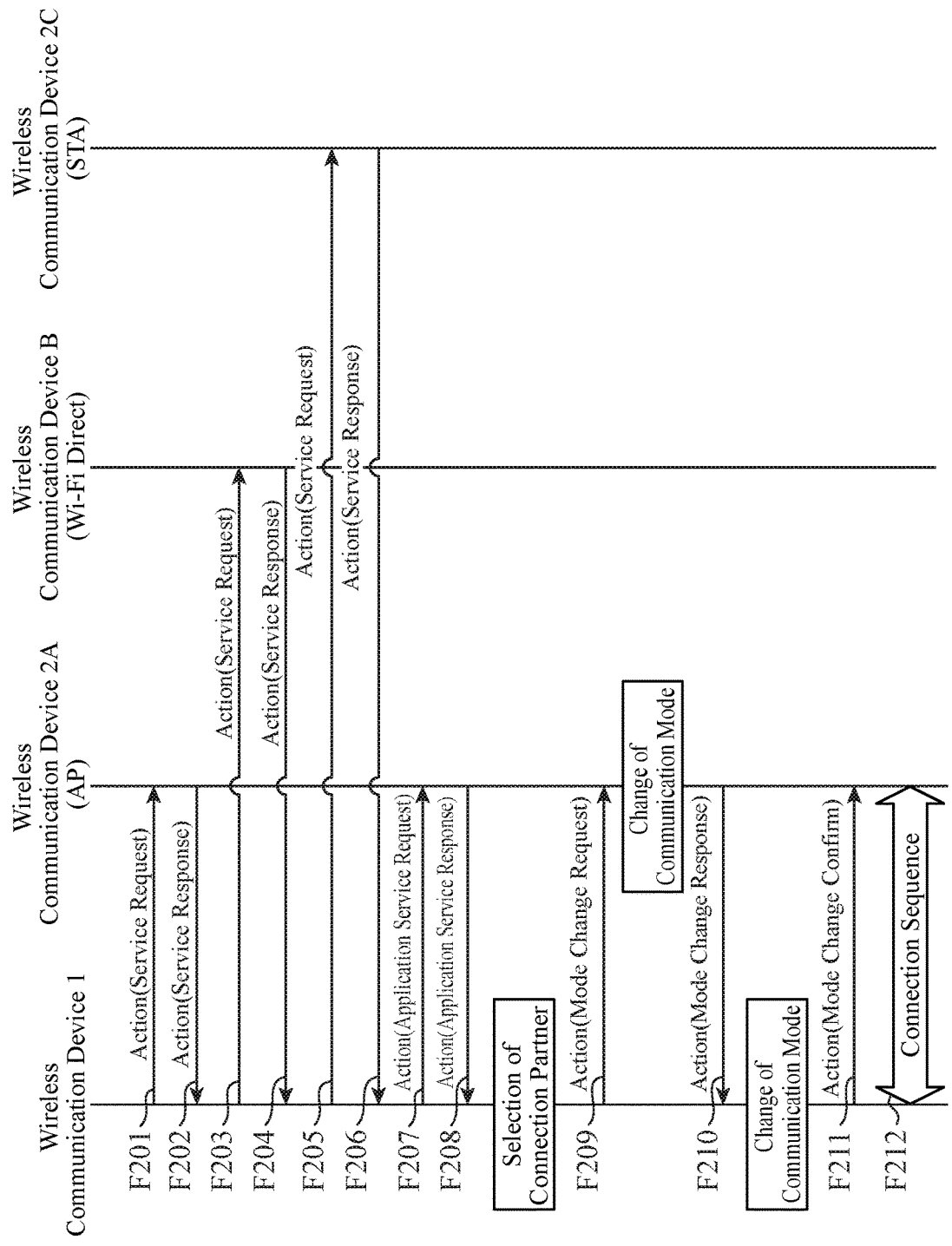
FIG. 19 is a sequence diagram showing a procedure for processing performed among wireless communication devices which construct a wireless communication system according to Embodiment 2 of the present invention.

FIG. 19 is a sequence diagram showing a procedure for processing performed among the wireless communication devices which construct a wireless communication system according to Embodiment 2 of the present invention.

Figure 20:
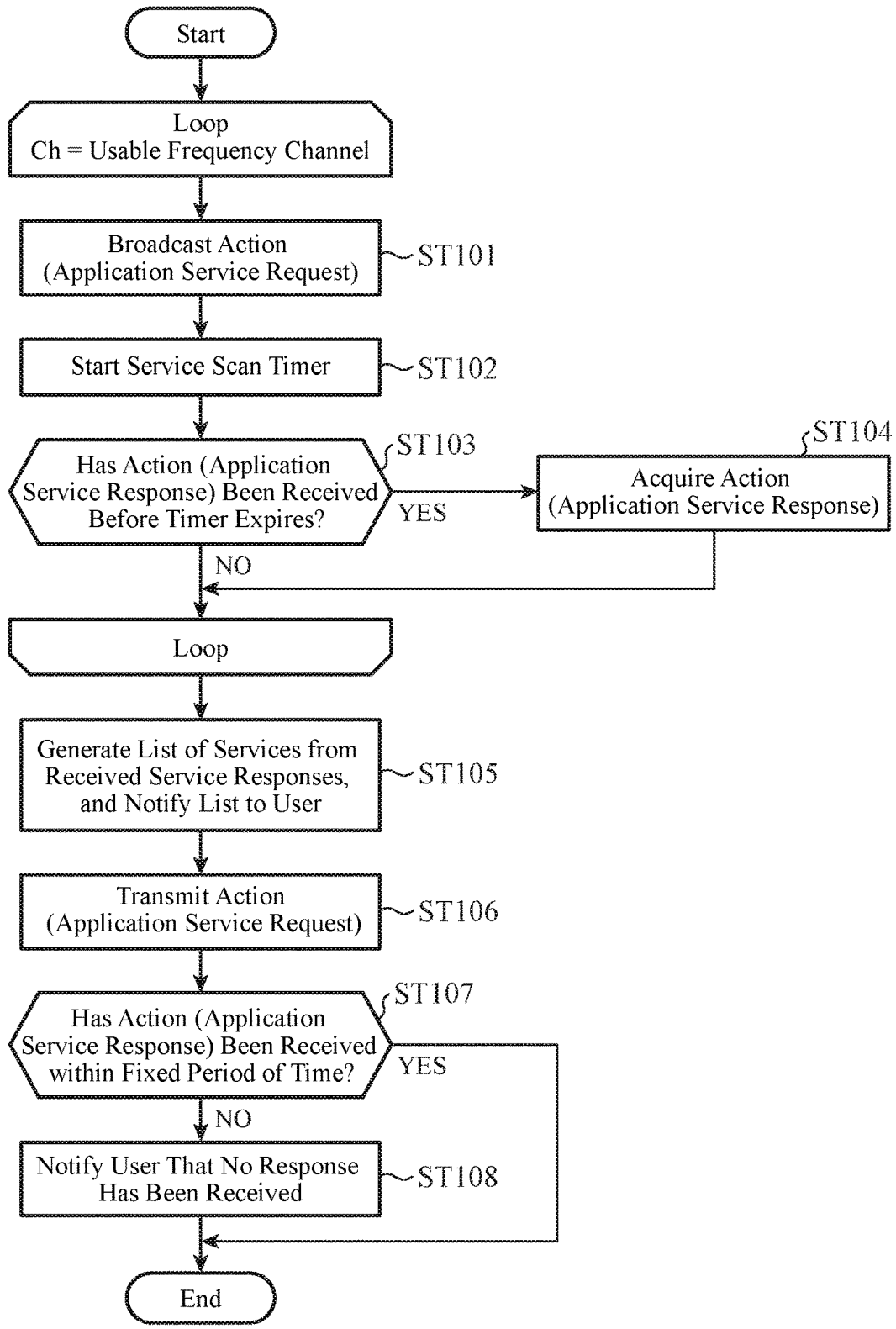
Figure 21:
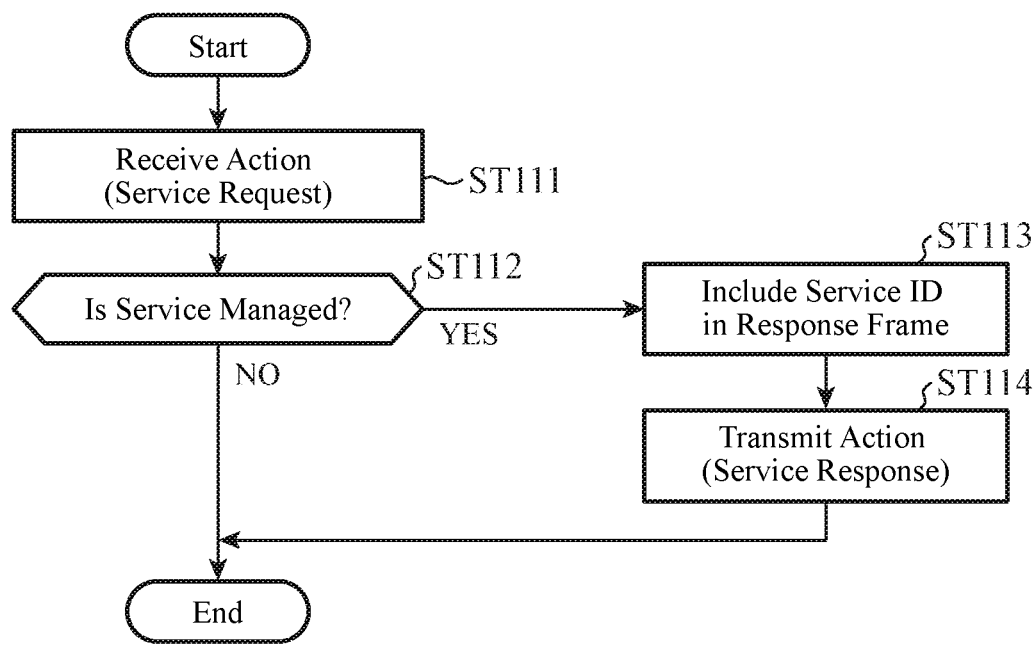

FIG. 20 is a flow chart showing the details of processing performed by the wireless communication device 1 at the time of collecting information about services, or the like, and FIG. 21 is a flow chart showing the details of processing performed by each of the wireless communication devices 2A, 2B and 2C at the time of transmitting information about services, or the like.

First, a service searcher 21 of the wireless communication device 1 searches for services (providable services) managed by a common service controller 23 and those managed by a specific service controller 24.

After finding services which can be provided by the wireless communication device 1, the service searcher 21 of the wireless communication device 1 outputs an action (service request) frame to a transmitter 11, thereby broadcasting the action (service request) frame to the wireless communication devices 2A, 2B and 2C (F201, F203 and F205 of FIG. 19).

More specifically, because the wireless communication device 1 does not know which frequency channel Ch is used by each of the wireless communication device 2A, 2B and 2C existing in the surroundings, the wireless communication device 1 broadcasts the action (service request) frame by using all frequency channels usable in a wireless LAN while changing a frequency channel Ch to be used. First of all, the wireless communication device 1 sets one frequency channel Ch as the frequency channel to be used from among the plurality of usable frequency channels, and broadcasts the action (service request) frame to the wireless communication devices 2A, 2B and 2C by using the frequency channel Ch (in step ST101 of FIG. 20).

Further, when broadcasting the action (service request) frame, the service searcher 21 of the wireless communication device 1 starts a timer (a service scan timer) (in step ST102 of FIG. 20).

Figure 22:
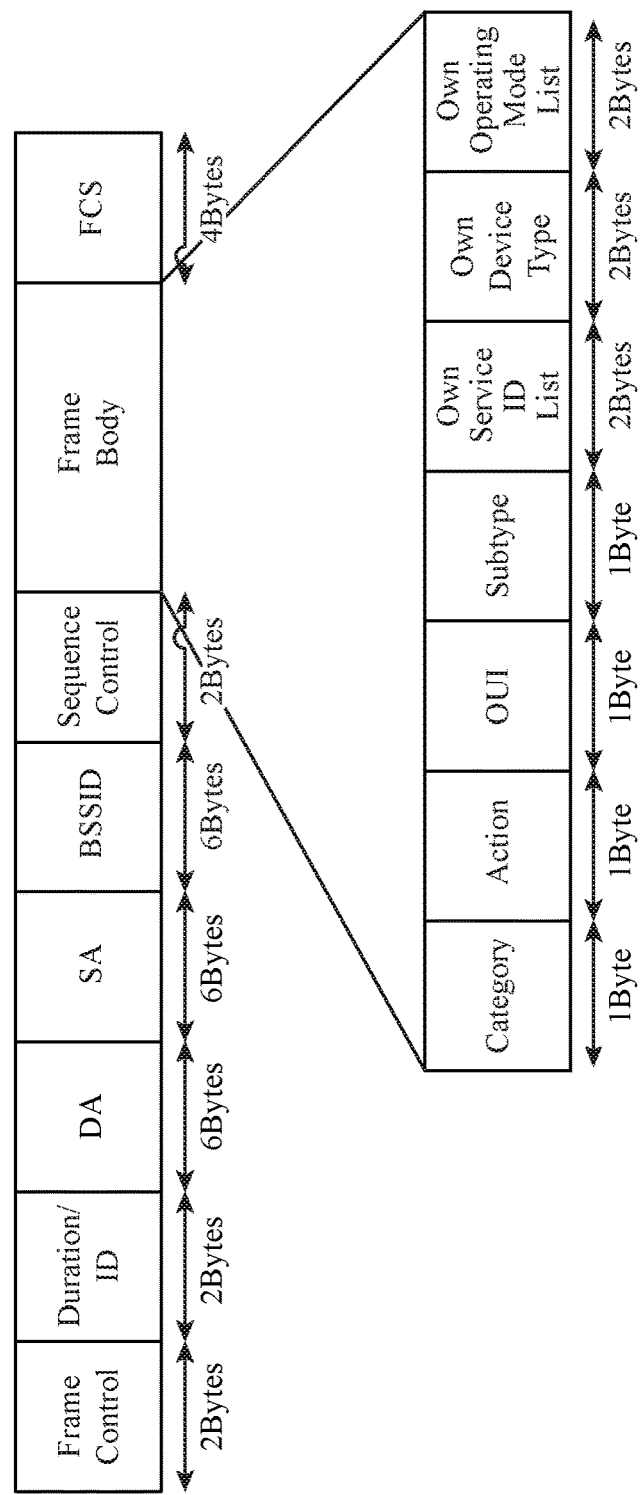
FIG. 22 is an explanatory drawing showing the format of an action (service request) frame.

Here, the action (service request) frame conforms to a protocol which makes it possible to perform wireless communications with the wireless communication device 2A, 2B and 2C regardless of the setting of a communication mode to each of the wireless communication devices 2A, 2B and 2C. FIG. 22 is an explanatory drawing showing the format of the action (service request) frame.

A list of the IDs (the pieces of identification information) of services which can be provided by the wireless communication device 1 is set to an own service ID list field of the action (service request) frame, the terminal type of the wireless communication device 1 (e.g., PC, printer or router) is set to an own device type field, and a list of the communication modes supported by the wireless communication device 1 is set to an own operating mode list field.

For example, 0x002692 is set to OUI of the action (service request) frame, and a value of "0" shown in FIG. 8 is set to subtype. Their values are not limited to these values.

When a receiver 12 receives the action (service request) frame from the wireless communication device 1 (in step ST111 of FIG. 21), a service searcher 21 of each of the wireless communication devices 2A, 2B and 2C acquires the action (service request) frame.

After acquiring the action (service request) frame, the service searcher 21 of each of the wireless communication devices 2A, 2B and 2C includes a list of services (providable services) managed by a corresponding common service controller 23 and those managed by a corresponding specific service controller 24 in an action (service response) frame which is a response frame to the action (service request) frame (in step ST113 of FIG. 21) when there is one or more services managed by either the common service controller 23 or the specific service controller 24 (when Yes in step ST112 of FIG. 21), and transmits the action (service response) frame to the wireless communication device 1 (F202, F204 and F206 of FIG. 19, in step ST114 of FIG. 21).

Figure 23:
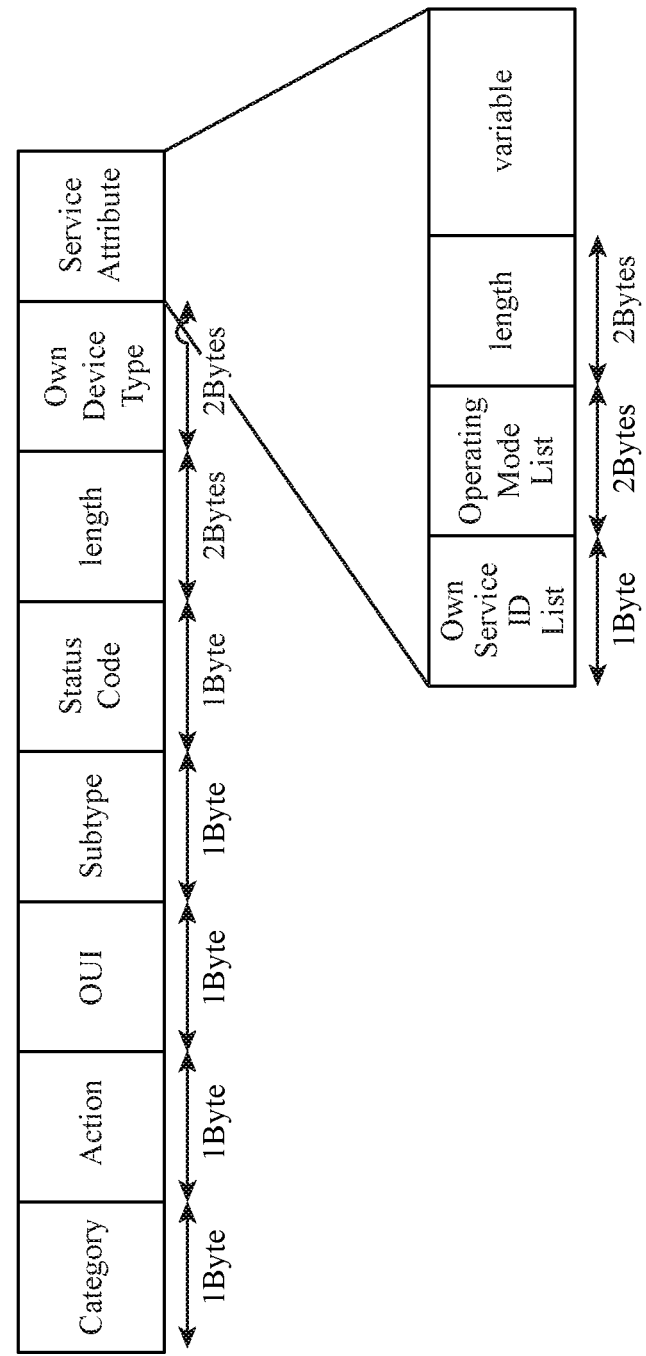
FIG. 23 is an explanatory drawing showing the format of an action (service response) frame.

Here, the action (service response) frame conforms to a protocol which makes it possible to perform wireless communications with the wireless communication device 1 regardless of the setting of a communication mode to the wireless communication device 1. FIG. 23 is an explanatory drawing showing the format of the action (service response) frame.

The list of the services which can be provided by the corresponding wireless communication device 2 is set to an own service ID list field in a service attribute field of the action (service response) frame, and a list of the communication modes supported by the corresponding wireless communication device 2 is set to an operating mode list field.

For example, 0x002692 is set to OUI of the action (service response) frame, and a value of "1" shown in FIG. 8 is set to subtype. Their values are not limited to these values.

The service searcher 21 of the wireless communication device 1 determines whether the receiver 12 has received an action (service response) frame before a fixed period of time elapses (before the started timer expires) (in step ST103 of FIG. 20) after having broadcasted the action (service request) frame, and, when the receiver 12 receives an action (service response) frame, acquires the action (service response) frame (in step ST104 of FIG. 20).

When acquiring an action (service response) frame or when the timer has expired before the receiver 12 receives an action (service response) frame, the service searcher 21 of the wireless communication device 1 changes the frequency channel Ch to be used and repeatedly carries out the processes of steps ST101 to ST104.

The service searcher 21 of the wireless communication device 1 refers to the list of the providable services set to the own service ID list field of each acquired action (service response) frame, to generate a list of the services in the wireless communication devices 2A, 2B and 2C, and notifies the list of the services to the user (in step ST105 of FIG. 20). For example, by displaying the list of the services in the wireless communication devices 2A, 2B and 2C on a display of the wireless communication device 1, the service searcher notifies the list to the user.

When the user operates the wireless communication device 1 to select a desired service from the plurality of services, the service searcher 21 of the wireless communication device 1 outputs an action (application service request) frame including the ID of the selected service to the transmitter 11, thereby transmitting the action (application service request) frame to the wireless communication device 2 which provides this service (F207 of FIG. 19, in step ST106 of FIG. 20).

In the example shown in FIG. 19, the transmitter transmits the action (application service request) frame to the wireless communication device 2A.

Although the action (application service request) frame has the same configuration as that shown in FIG. 7, like that shown in above-mentioned Embodiment 1, the ID of the service selected by the user is set to a service ID field in this Embodiment 2.

When the receiver 12 receives the action (application service request) frame from the wireless communication device 1, the service searcher 21 of the wireless communication device 2A outputs an action (application service response) frame which is a response frame to the action (application service request) frame to a transmitter 11, thereby transmitting the action (application service response) frame to the wireless communication device 1 (F208 of FIG. 19), like that according to above-mentioned Embodiment 1.

When the receiver 12 receives the action (application service response) frame from the wireless communication device 2A within a fixed period of time (when Yes in step ST107 of FIG. 20) after the service searcher 21 of the wireless communication device 1 has transmitted the action (application service request) frame to the wireless communication device 2A, a communication mode changing controller 20 starts processing for changing a communication mode which will be described later.

In contrast, when the receiver 12 does not receive the action (application service response) frame from the wireless communication device 2A within the fixed period of time (when No in step ST107 of FIG. 20), the communication mode changing controller notifies the user that no response has been received from the wireless communication device 2A, and does not start the processing for changing the communication mode.

When receiving the action (application service response) frame from the wireless communication device 2A within the fixed period of time, the communication mode changing controller 20 of the wireless communication device 1 determines the connecting level of a wireless connection with the wireless communication device 2A, like that according to above-mentioned Embodiment 1.

However, in this Embodiment 2, because the wireless communication device 2A has been determined as a wireless communication device which is a connection object, the connecting level of a wireless connection with each of the wireless communication devices 2B and 2C is not determined.

After determining the connecting level of a wireless connection with the wireless communication device 2A which is the connection object, the communication mode changing controller 20 of the wireless communication device 1 performs the processing for changing the communication mode between the wireless communication device 1 and the wireless communication device 2A, like that according to above-mentioned Embodiment 1 (F209 to F211 of FIG. 19).

When a change of the communication mode has succeeded between the wireless communication device 1 and the wireless communication device 2A which is the connection object, a wireless connection is established between the wireless communication device 1 and the wireless communication device 2A which is the connection object by performing a known connection sequence, and wireless communications are started (F212 of FIG. 19), like in the case of above-mentioned Embodiment 1.

According to this Embodiment 2, there is provided an advantage of being able to acquire information about providable services from each of the wireless communication devices 2A, 2B and 2C existing in the surroundings regardless of the setting of a communication mode.

Further, according to this Embodiment 2, the wireless communication device 1 can start wireless communications between the wireless communication device 1 itself and a wireless communication device 2 without causing the user to perform an operation of selecting a communication mode and changing to this communication mode, an operation of determining the wireless communication device 2A which is the connection object, and so on, and there is provided an advantage of being able to improve the convenience of the user operation, like in the case of above-mentioned Embodiment 1.

Embodiment 3

Although in above-mentioned Embodiments 1 and 2 the example in which the wireless communication device 1 transmits a request to transmit information about applications or services to the wireless communication devices 2A, 2B and 2C, and receives a frame including the information about applications or service from each of the wireless communication devices 2A, 2B and 2C is shown (an active scanning method), each of the wireless communication devices 2A, 2B and 2C can alternatively transmit a frame including information about applications or services to the wireless communication device 1, instead of the wireless communication device 1 transmitting a request to transmit information about applications or services to the wireless communication devices 2A, 2B and 2C.

More specifically, by using a method similar to a passive scanning method disclosed by the following nonpatent literature 2, the wireless communication device 1 can receive a frame including information about applications or services from each of the wireless communication devices 2A, 2B and 2C.

Nonpatent literature 2: IEEE Computer Society, 802.11-2012—IEEE Standard for Information technology—Telecommunications and information exchange between systems Local and metropolitan area networks—Specific requirements Part 11: Wireless LAN Medium Access Control (MAC) and Physical Layer (PHY) Specifications While the configuration of each of wireless communication devices 1, 2A, 2B and 2C according to this embodiment is the same as that shown in FIG. 3, like that shown in above-mentioned Embodiment 1, the configuration of a service searcher 21 of each of the wireless communication devices 1, 2A, 2B and 2C is different from that according to Embodiment 1.

More specifically, the service searcher 21 of each of the wireless communication devices 2A, 2B and 2C includes an information repetition transmitter that repeatedly transmits a frame (e.g., a probe request frame, a probe response frame or a beacon frame) conforming to a protocol which makes it possible to perform wireless communications with the wireless communication device 1 regardless of the setting of a communication mode to the wireless communication device 1. Information about applications which can be provided by the corresponding wireless communication device 2, or the like is included in this frame.

A service searcher 21 of the wireless communication device 1 includes an information receiver that receives a frame (e.g., a probe request frame, a probe response frame or a beacon frame) transmitted from each of the wireless communication devices 2A, 2B and 2C while changing a frequency channel to be used.

Hereafter, the details of processing performed by each of the wireless communication devices 1, 2A, 2B and 2C will be explained concretely.

Figure 24:
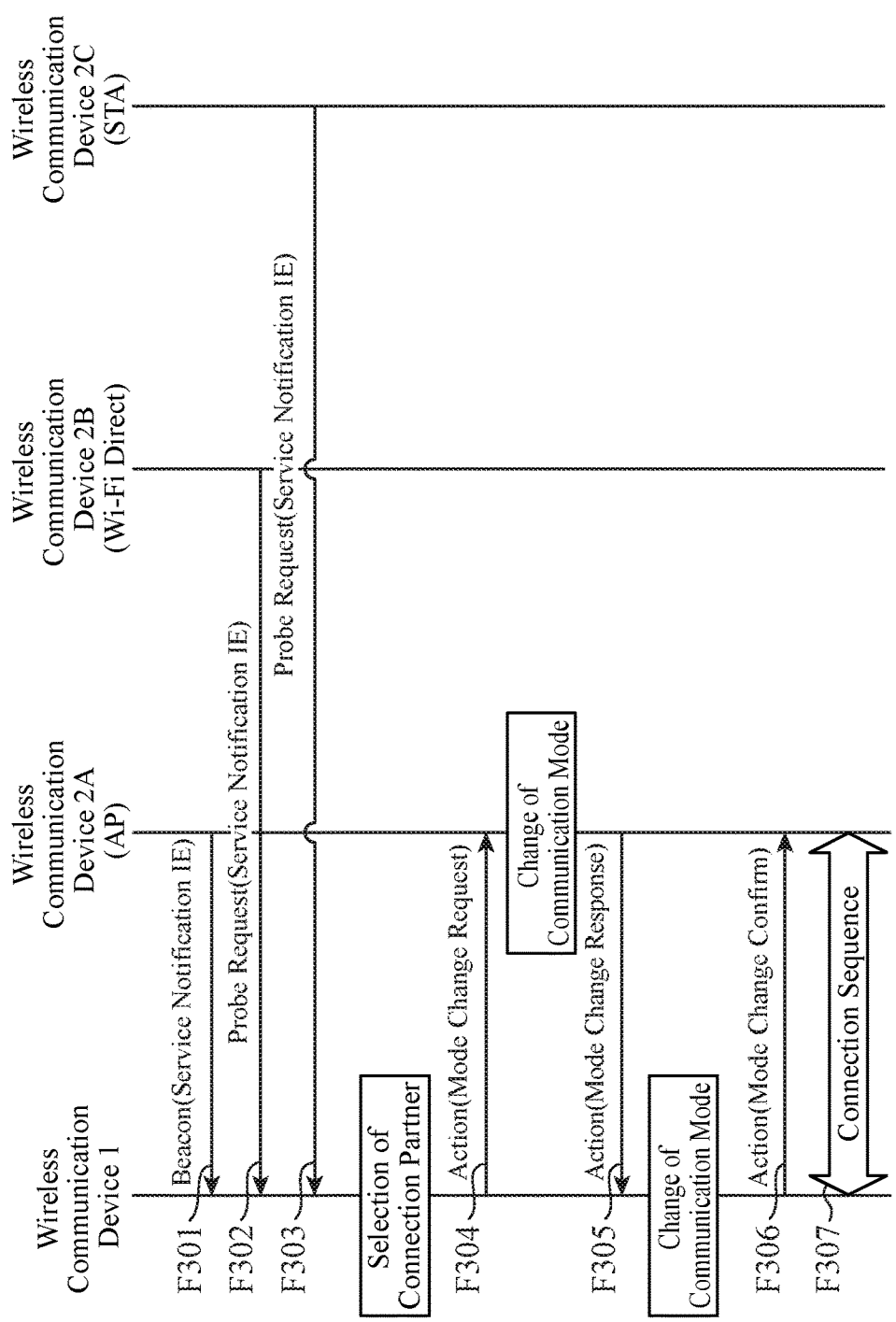
FIG. 24 is a sequence diagram showing a procedure for processing performed among wireless communication devices which construct a wireless communication system according to Embodiment 3 of the present invention.

FIG. 24 is a sequence diagram showing a procedure for processing performed among the wireless communication devices which construct a wireless communication system according to Embodiment 3 of the present invention.

Figure 25:
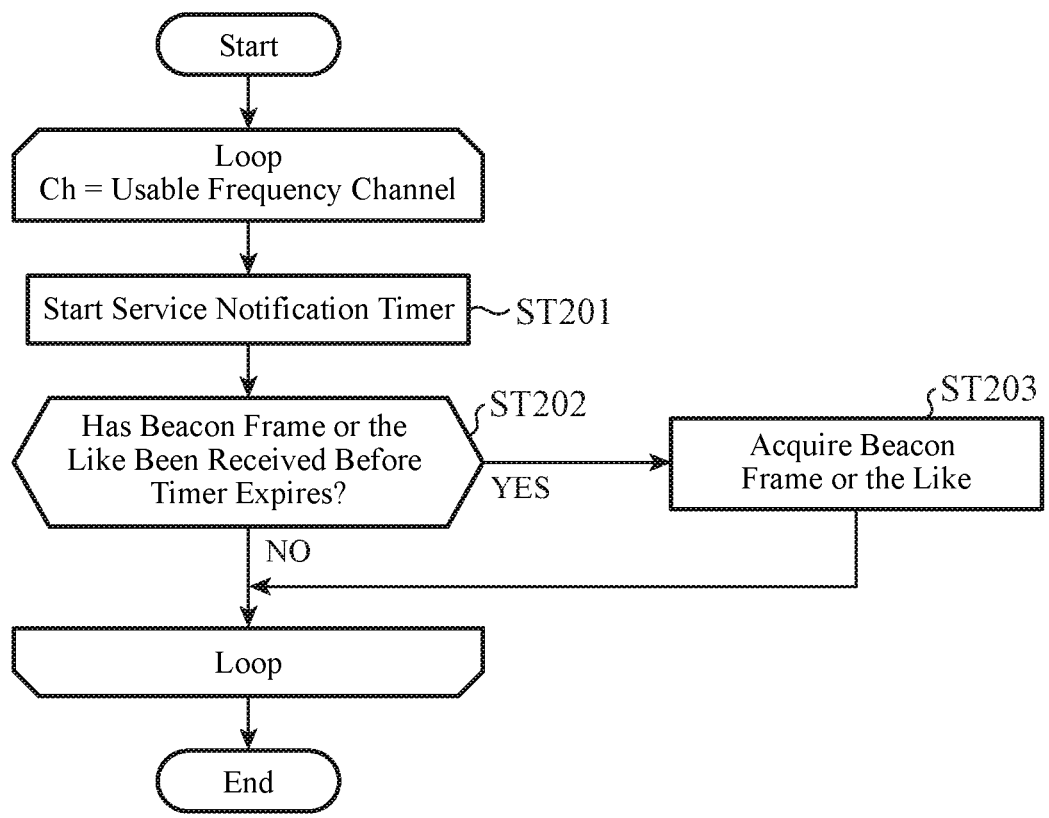
Figure 26:
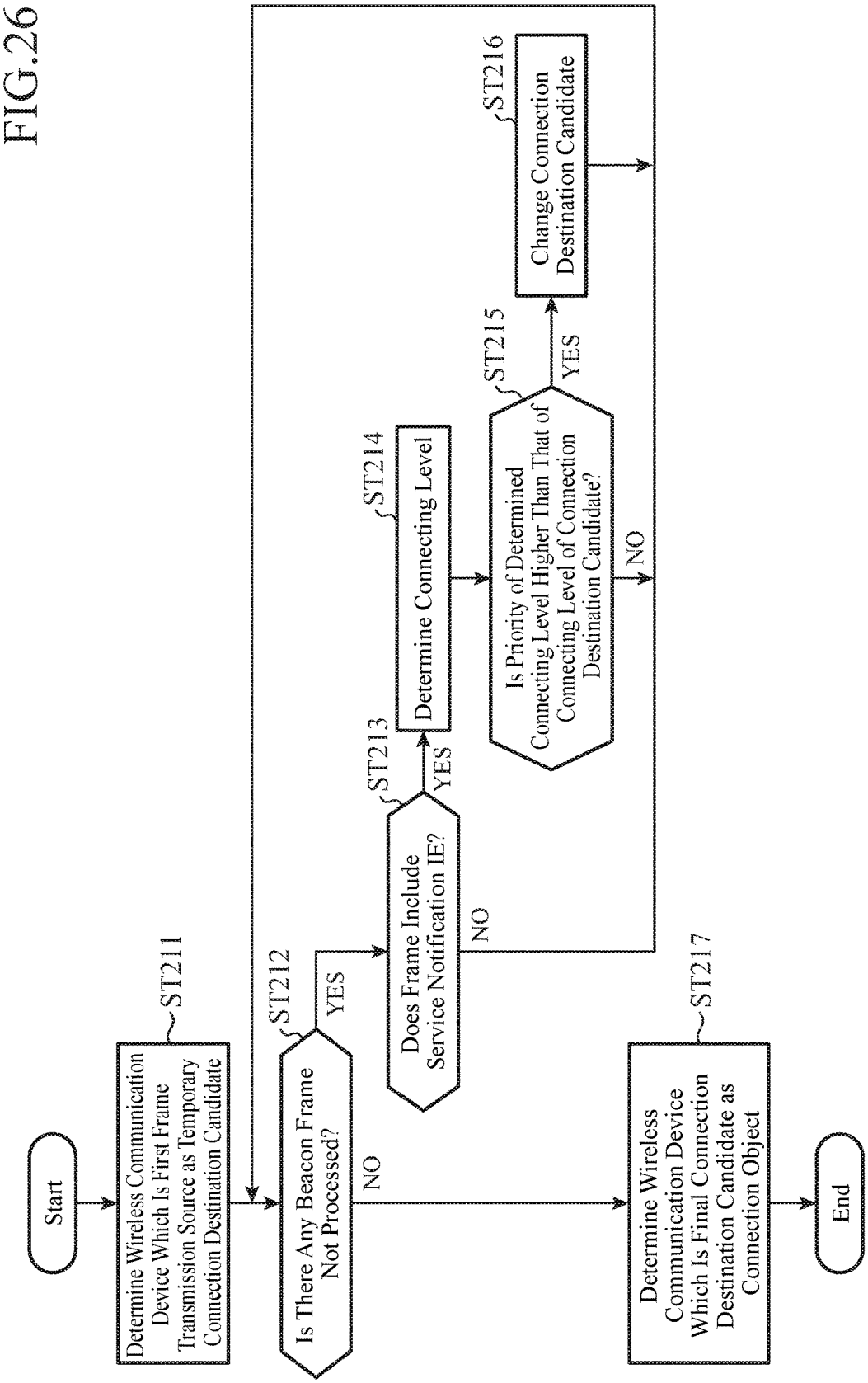
FIG. 26 is a flow chart showing the details of processing performed by the wireless communication device 1 at the time of determining a wireless communication device 2 which is a connection object.

FIG. 25 is a flowchart showing the details of processing performed by the wireless communication device 1 at the time of collecting information about services, or the like, and FIG. 26 is a flow chart showing the details of processing performed by the wireless communication device 1 at the time of determining a wireless communication device 2 which is a connection object.

First, the service searcher 21 of each of the wireless communication devices 2A, 2B and 2C searches for services (providable services) managed by a common service controller 23 and those managed by a specific service controller 24.

The service searcher 21 of each of the wireless communication devices 2A, 2B and 2C, after finding services which can be provided by the corresponding wireless communication device 2, repeatedly outputs a beacon frame (or a probe request frame or a probe response frame) including information about the providable services to a transmitter 11, thereby transmitting the beacon frame (or the probe request frame or the probe response frame) to the wireless communication device 1 at regular time intervals (F301 to F303 of FIG. 24).

In the example shown in FIG. 24, the wireless communication device 2A transmits a beacon frame, and each of the wireless communication devices 2B and 2C transmits a probe request frame.

Hereafter, for convenience of explanation, "beacon frame or the like", which will be described below, means beacon frame, probe request frame or probe response frame.

Figure 27:
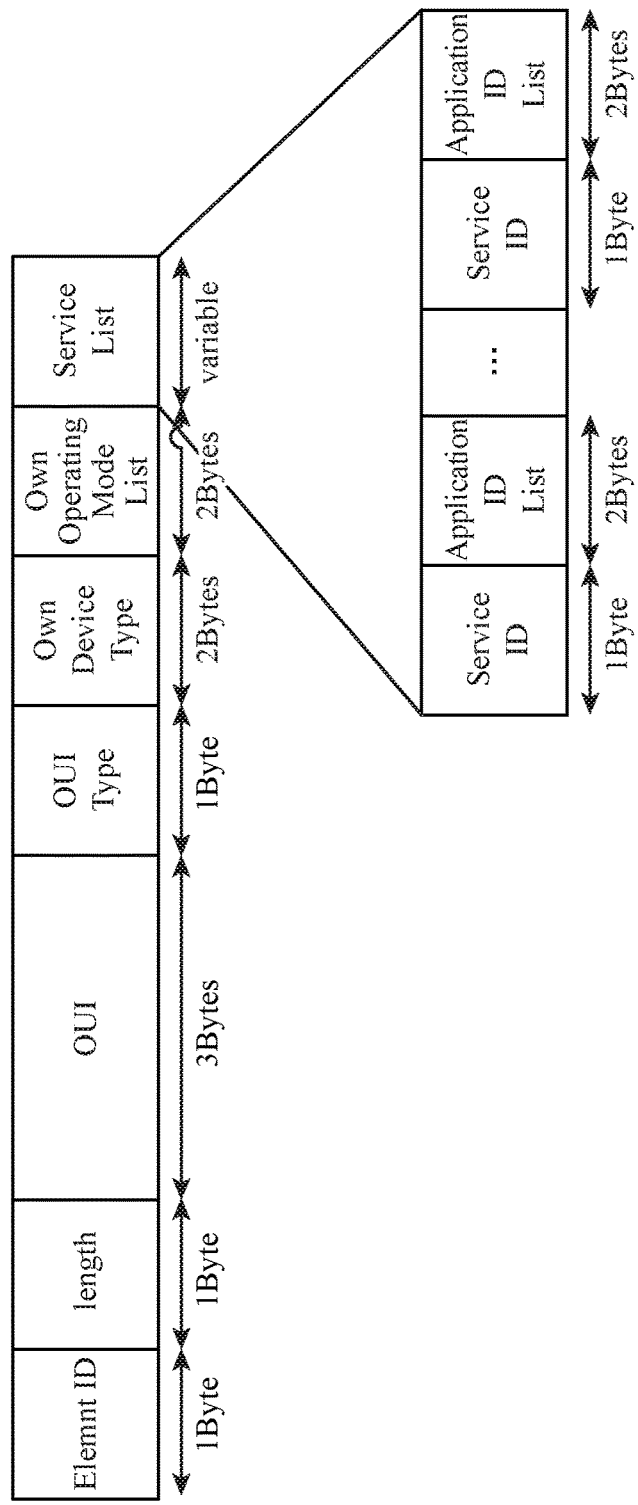

Here, a beacon frame or the like conforms to the protocol which makes it possible to perform wireless communications with the wireless communication device 1 regardless of the setting of a communication mode to the wireless communication device 1. FIG. 27 is an explanatory drawing showing the format of a service notification IE superposed onto a beacon frame or the like.

The terminal type of the wireless communication device 2 (e.g., PC, printer or router) is set to an own device type field of the service notification IE, and a list of the communication modes supported by the wireless communication device 2 is set to an own operating mode list field.

Further, the IDs of the services which can be provided by the wireless communication device 2 are set to a service ID field of a service list field, and a list of the IDs of the applications corresponding to the services is set to an application ID list field. A number of service ID fields and a number of application ID list fields are added, the number of service ID fields and the number of application ID list fields being equal to the number of services which can be provided by the wireless communication device 2.

For example, 0x002692 is set to OUI of the service notification IE. Its value is not limited to this value.

The service searcher 21 of the wireless communication device 1 receives a beacon frame or the like which is transmitted at regular time intervals from each of the wireless communication devices 2A, 2B and 2C.

More specifically, because the service searcher 21 of the wireless communication device 1 does not know which frequency channel Ch is used by each of the wireless communication device 2A, 2B and 2C existing in the surroundings, the service searcher 21 receives a beacon frame or the like which is transmitted from each of the wireless communication devices 2A, 2B and 2C by using all frequency channels usable in a wireless LAN while changing a frequency channel to be used. First of all, the service searcher sets one frequency channel Ch as the frequency channel to be used from among the plurality of usable frequency channels, and starts a timer (a service notification timer) (in step ST201 of FIG. 25).

When a receiver 12 has received a beacon frame or the like from one of the wireless communication devices 2A, 2B and 2C (when Yes in step ST202 of FIG. 25) before the timer (the service notification timer) expires, the service searcher 21 of the wireless communication device 1 acquires the beacon frame or the like (in step ST203 of FIG. 25).

In contrast, when the timer (the service notification timer) has expired before the receiver 12 receives a beacon frame or the like from one of the wireless communication devices 2A, 2B and 2C (when No in step ST202 of FIG. 25) or when acquiring a beacon frame or the like (in step ST203 of FIG. 25), the service searcher 21 of the wireless communication device 1 changes the frequency channel Ch to be used and then re-starts the timer (the service notification timer), and, after that, repeatedly carries out the same processing.

The service searcher 21 of the wireless communication device 1 outputs the beacon frame or the like acquired thereby to a communication mode changing controller 20.

Next, the details of processing at the time when the wireless communication device 1 determines the wireless communication device 2 which is the connection object from among the wireless communication devices 2A, 2B and 2C will be explained.

When receiving a beacon frame or the like which is transmitted from one or more wireless communication devices 2 of the wireless communication devices 2A, 2B and 2C, the communication mode changing controller 20 of the wireless communication device 1 determines, as a temporary connection destination candidate, the wireless communication device 2 which is the transmission source of the beacon frame or the like which the service searcher 21 has acquired for the first time (in step ST211 of FIG. 26).

The communication mode changing controller 20 of the wireless communication device 1 also recognizes the information (e.g., the MAC address, providable applications or services, and the terminal type) about the wireless communication device 2 which is the transmission source of the beacon frame or the like which the service searcher has acquired for the first time. The communication mode changing controller can recognize the information about the wireless communication device 2 by referring to the beacon frame or the like, or a service notification IE superposed onto the beacon frame or the like.

After recognizing the information about the wireless communication device 2 which is the first frame transmission source, the communication mode changing controller 20 of the wireless communication device 1 compares the information about the wireless communication device 2 which is the first frame transmission source with a service connection management table recorded in a service connection manager 22, thereby determining the connecting level of a wireless connection with the wireless communication device 2 which is the first frame transmission source, like in that according to above-mentioned Embodiment 1.

Next, when there is a beacon frame or the like which the service searcher has acquired for a second time (when Yes in step ST212 of FIG. 26), and a service notification IE is superposed onto the beacon frame or the like (when Yes in step ST213 of FIG. 26), the communication mode changing controller 20 of the wireless communication device 1 recognizes the information (e.g., the MAC address, providable applications or services, and the terminal type) about the wireless communication device 2 which is the transmission source of the beacon frame or the like.

In contrast, when a service notification IE is not superimposed onto the beacon frame or the like which the service searcher has acquired for the second time (when No in step ST213 of FIG. 26), the communication mode changing controller excludes the beacon frame or the like from the target for processing.

After recognizing the information about the wireless communication device 2 which is the second frame transmission source, the communication mode changing controller 20 of the wireless communication device 1 compares the information about the wireless communication device 2 which is the second frame transmission source with the service connection management table recorded in the service connection manager 22, thereby determining the connecting level of a wireless connection with the wireless communication device 2 which is the second frame transmission source (in step ST214 of FIG. 26), like in the case of the information about the wireless communication device 2 which is the first frame transmission source.

After determining the connecting level of a wireless connection with the wireless communication device 2 which is the second frame transmission source, the communication mode changing controller 20 of the wireless communication device 1 compares the priority of the connecting level of the wireless connection with that of the connecting level of the wireless connection with the wireless communication device 2 which has been determined as the connection destination candidate until this time (in step ST215 of FIG. 26), and, when the priority of the connecting level of the wireless connection with the wireless communication device 2 which is the second frame transmission source is higher than that of the connecting level of the wireless connection with the wireless communication device 2 which has been determined as the connection destination candidate until this time (when Yes in step ST215 of FIG. 26), changes the connection destination candidate to the wireless communication device 2 which is the second frame transmission source (in step ST216 of FIG. 26). In contrast, when the priority of the connecting level of the wireless connection with the wireless communication device 2 which has been determined as the connection destination candidate until this time is higher than that of the connecting level of the wireless connection with the wireless communication device 2 which is the second frame transmission source (when No in step ST215 of FIG. 26), the communication mode changing controller does not change the connection destination candidate.

Next, when there is a beacon frame or the like which the wireless communication device 1 has acquired for an n-th (n=3, 4, . . . ) time (when YES in step ST212 of FIG. 26), and a service notification IE is superposed onto the beacon frame or the like (when Yes in step ST213 of FIG. 26), the communication mode changing controller 20 of the wireless communication device 1 performs the same processes as those on the beacon frame or the like which the service searcher has acquired for the second time (in steps ST214 to ST216 of FIG. 26).

After performing the same processes on all the beacon frames which the service searcher 21 has acquired (when No in step ST212 of FIG. 26), the communication mode changing controller 20 of the wireless communication device 1 determines a wireless communication device 2 which is a final connection destination candidate as the connection object (in step ST217 of FIG. 26).

In the example shown in FIG. 24, the communication mode changing controller determines the wireless communication device 2A as the wireless communication device which is the connection object.

After determining the wireless communication device 2A as the wireless communication device which is the connection object, the communication mode changing controller 20 of the wireless communication device 1 performs processing for changing the communication mode between the wireless communication device 1 and the wireless communication device 2A (F304 to F306 of FIG. 24), like that according to above-mentioned Embodiment 1.

When a change of the communication mode has succeeded between the wireless communication device 1 and the wireless communication device 2A which is the connection object, a wireless connection is established between the wireless communication device 1 and the wireless communication device 2A which is the connection object by performing a known connection sequence, and wireless communications are started (F307 of FIG. 24), like in the case of above-mentioned Embodiment 1.

According to this Embodiment 3, there is provided an advantage of being able to acquire information about applications or services from the wireless communication devices 2A, 2B and 2C existing in the surroundings by using a passive scanning method, regardless of the setting of a communication mode.

Further, according to this Embodiment 3, the wireless communication device 1 can start wireless communications between the wireless communication device 1 itself and a wireless communication device 2 without causing the user to perform an operation of selecting a communication mode and changing to this communication mode, an operation of determining the wireless communication device 2A which is the connection object, and so on, and there is provided an advantage of being able to improve the convenience of the user operation, like in the case of above-mentioned Embodiment 1.

Although in this Embodiment 3 the example in which the wireless communication device 1 receives beacon frames or the likes transmitted from the wireless communication devices 2A, 2B and 2C by using all the frequency channels usable in the wireless LAN while changing the frequency channel to be used (passive scanning) is shown, the wireless communication device 1 can alternatively receive beacon frames or the likes onto each of which a service notification IE is superposed, instead of receiving beacon frames during the passive scanning.

Further, in a case in which communications are performed between wireless communication devices via a certain frequency channel, another frequency channel can be recognized at regular time intervals by using, for example, a notice of absence mechanism disclosed by above-mentioned nonpatent literature 1.

Embodiment 4

In above-mentioned Embodiments 1 and 2 the example in which the wireless communication device 1 transmits a request to transmit information about applications or services to the wireless communication devices 2A, 2B and 2C, and receives a frame including the information about applications or services from each of the wireless communication devices 2A, 2B and 2C is shown. As an alternative, each of the wireless communication devices 2A, 2B, and 2C can repeatedly transmit preparation judgment information showing whether or not a preparation for providing a service has been completed, and the wireless communication device 1 can transmit a request to transmit information about applications or services to a wireless communication device 2 which has completed a preparation for providing a service, and receive a frame including the information about applications or services from the wireless communication device 2 which has completed a preparation for providing a service.

FIG. 28 is a block diagram showing the inside of each of wireless communication devices 1, 2A, 2B and 2C which construct a wireless communication system according to Embodiment 4 of the present invention. In the figure, because the same reference numerals as those shown in FIG. 3 denote the same components or like components, the explanation of the components will be omitted hereafter.

A service notification management information storage 30 records a service notification level management table showing a correspondence between MAC addresses and service notification levels (information notification levels) therein.

FIG. 29 is an explanatory drawing showing an example of the service notification level management table recorded in the service notification management information storage 30.

A service searcher 21 of each of the wireless communication devices 2A, 2B and 2C includes a preparation judgment information transmitter that repeatedly transmits preparation judgment information showing whether or not a preparation for providing a service has been completed in accordance with a protocol which makes it possible to perform wireless communications with the wireless communication device 1 regardless of the setting of a communication mode to the wireless communication device 1.

A service searcher 21 of the wireless communication device 1 includes an information transmission request sender that receives the preparation judgment information transmitted from each of the wireless communication devices 2A, 2B and 2C while changing a frequency channel to be used, and, when the preparation judgment information shows that a preparation for providing a service has been completed, sends an information transmission request to transmit information about applications or services in accordance with a protocol which makes it possible to perform wireless communications with the wireless communication device 2A, 2B and 2C regardless of the setting of a communication mode to each of the wireless communication devices 2A, 2B and 2C.

Further, the service searcher 21 of each of the wireless communication devices 2A, 2B and 2C includes an information transmission request receiver that receives the information transmission request sent from the wireless communication device 1, and an information responder that transmits information about providable applications or services in accordance with the protocol which makes it possible to perform wireless communications with the wireless communication device 1.

This information responder refers to the service notification level management table recorded in the service notification management information storage 30, to determine a service notification level from the MAC address of the wireless communication device 1 (the information about the wireless communication device 1) which is the transmission source of the information transmission request received by the information transmission request receiver, and controls the mode of transmission of the information about applications in accordance with the service notification level.

Hereafter, the details of processing performed by each of the wireless communication devices 1, 2A, 2B and 2C will be explained concretely.

Figure 30:
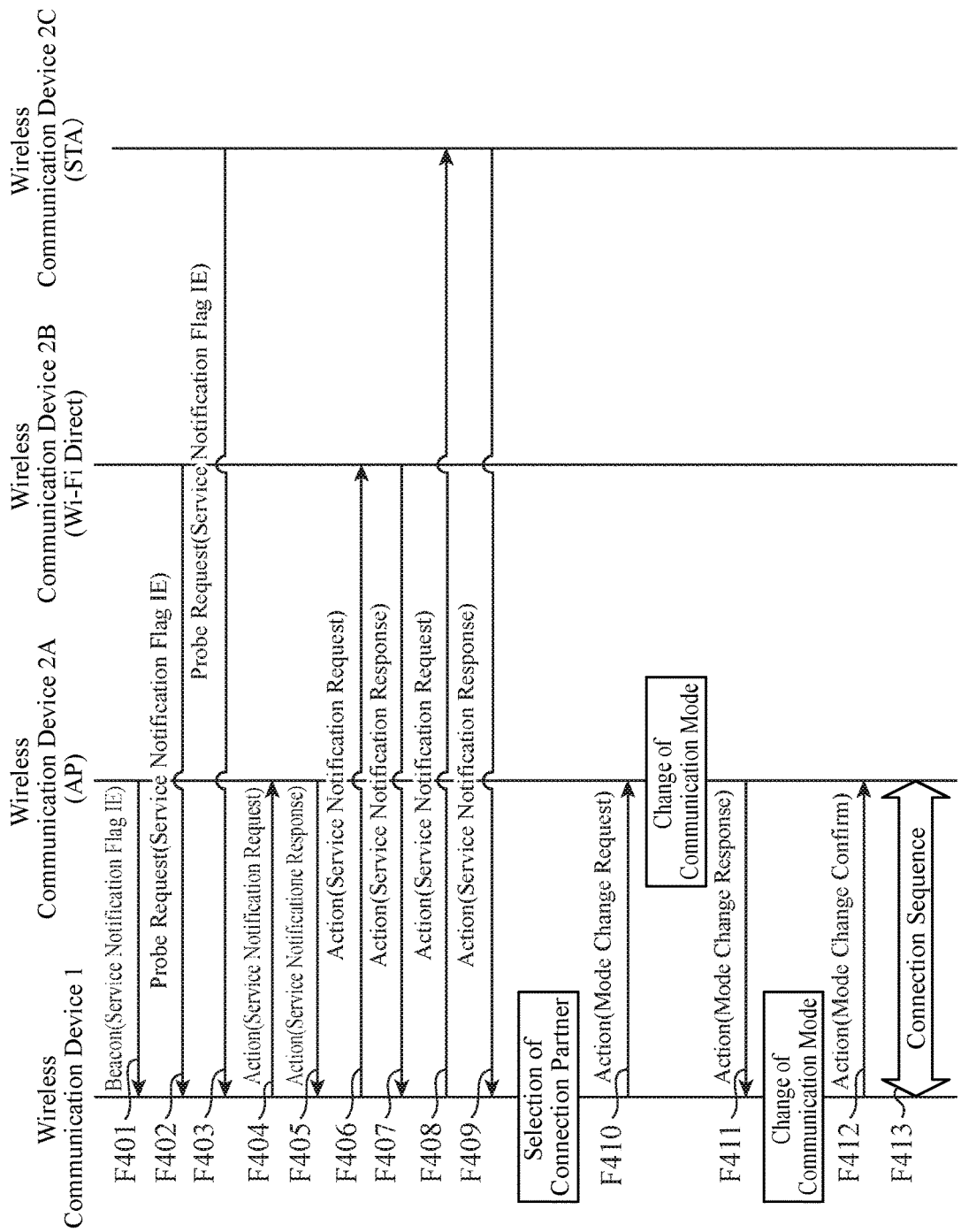
FIG. 30 is a sequence diagram showing a procedure for processing performed among the wireless communication devices which construct the wireless communication system according to Embodiment 4 of the present invention.

FIG. 30 is a sequence diagram showing a procedure for processing performed among the wireless communication devices which construct the wireless communication system according to Embodiment 4 of the present invention.

Figure 31:
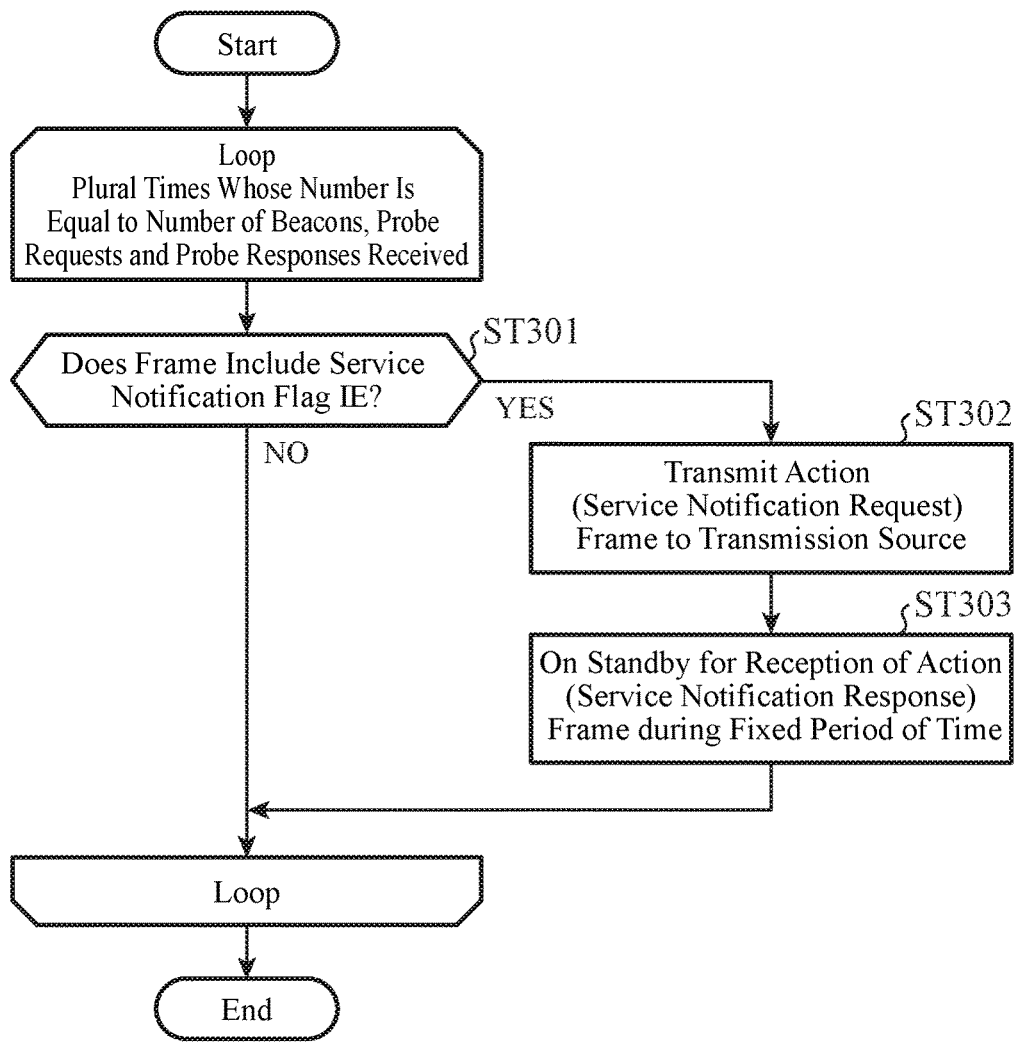

FIG. 31 is a flow chart showing the details of processing performed by the wireless communication device 1 at the time of collecting information about applications or services, or the like.

First, the service searcher 21 of each of the wireless communication devices 2A, 2B and 2C determines whether or not a preparation for providing a service managed by a common service controller 23 and a service managed by a specific service controller 24 has been completed. Although this determining method does not have to be specified, when, for example, a service of "moving image" is managed, the service searcher can determine whether or not a preparation for providing the service has been completed by checking whether or not moving image data which are a distribution object have been prepared.

After determining whether or not a preparation for providing a service has been completed, the service searcher 21 of each of the wireless communication devices 2A, 2B and 2C repeatedly outputs a beacon frame (or a probe request frame or a probe response frame) including preparation judgment information showing that a preparation for providing a service is enabled or disabled to a transmitter 11, thereby transmitting the beacon frame (or the probe request frame or the probe response frame) to the wireless communication device 1 at regular time intervals (F401 to F403 of FIG. 30).

In the example shown in FIG. 30, the wireless communication device 2A transmits a beacon frame, and each of the wireless communication devices 2B and 2C transmits a probe request frame.

Hereafter, for convenience of explanation, "beacon frame or the like", which will be described below, means beacon frame, probe request frame or probe response frame.

Figure 32:
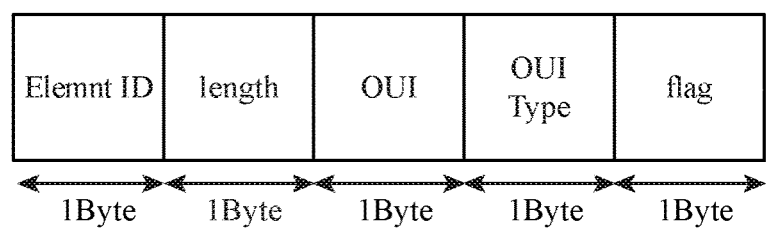

Here, a beacon frame or the like conforms to the protocol which makes it possible to perform wireless communications with the wireless communication device 1 regardless of the setting of a communication mode to the wireless communication device 1. FIG. 32 is an explanatory drawing showing the format of a service notification flag IE superposed onto a beacon frame or the like.

"0" is set to a flag field of the service notification flag IE when a preparation for providing a service has been completed, whereas "1" is set to the flag field when no preparation for providing a service has been completed.

The service searcher 21 of the wireless communication device 1 receives a beacon frame or the like which is transmitted at regular intervals from each of the wireless communication devices 2A, 2B and 2C.

More specifically, because the service searcher 21 of the wireless communication device 1 does not know which frequency channel Ch is used by each of the wireless communication device 2A, 2B and 2C existing in the surroundings, the service searcher 21 receives a beacon frame or the like which is transmitted from each of the wireless communication devices 2A, 2B and 2C by using all frequency channels usable in a wireless LAN while changing the frequency channel to be used.

When a receiver 12 receives a beacon frame or the like from one of the wireless communication devices 2A, 2B and 2C, the service searcher 21 of the wireless communication device 1 outputs an action (service notification request) frame to a transmitter 11 when a service notification flag IE is superposed onto the beacon frame or the like (when Yes in step ST301 of FIG. 31), and "0" is set to the flag field of the service notification flag IE, thereby transmitting the action (service notification request) frame to the wireless communication device 2 which is the transmission source of the beacon frame or the like (F404, F406 and F408 of FIG. 30, in step ST302 of FIG. 31).

Figure 33:
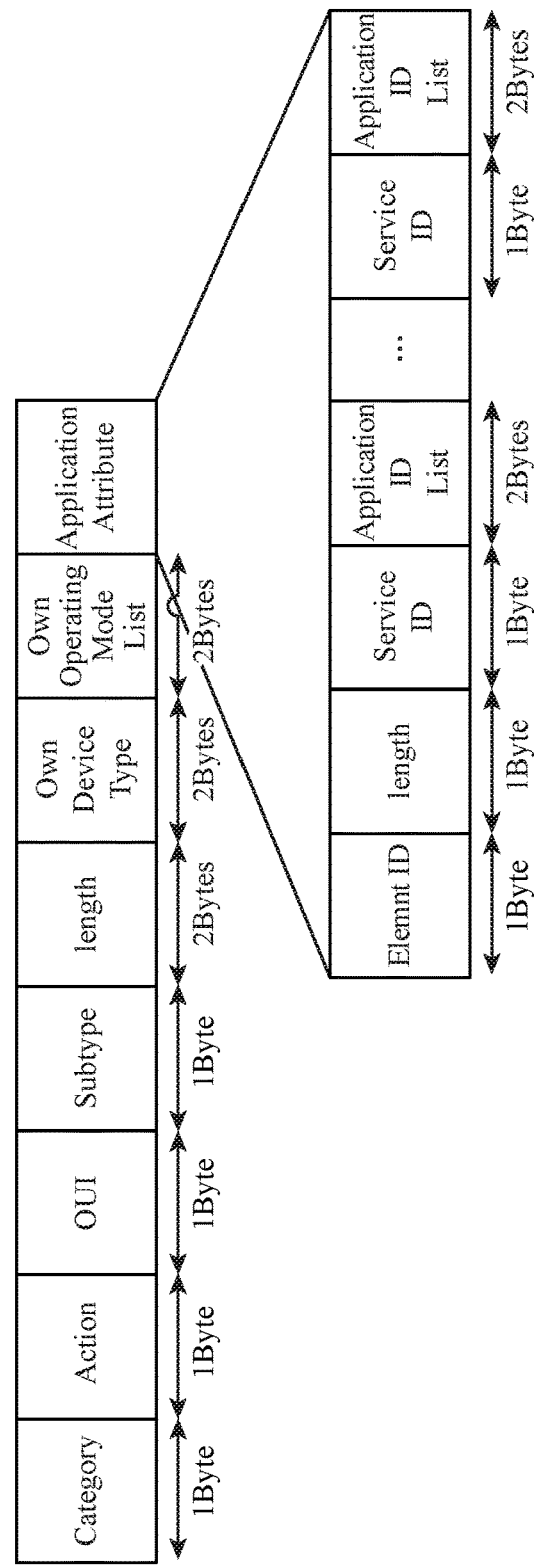
FIG. 33 is an explanatory drawing showing the format of an action (service notification request) frame.

Here, the action (service notification request) frame conforms to the protocol which makes it possible to perform wireless communications with the wireless communication devices 2A, 2B and 2C regardless of the setting of a communication mode to each of the wireless communication devices 2A, 2B and 2C. FIG. 33 is an explanatory drawing showing the format of the action (service notification request) frame.

The terminal type of the wireless communication device 1 (e.g., PC, printer or router) is set to an own device type field of the action (service notification request) frame, and a list of the communication modes supported by the wireless communication device 1 is set to an own operating mode list field.

Further, the IDs of the services which can be provided by the wireless communication device 1 are set to a service ID field of an application attribute field, and a list of the IDs of the applications corresponding to the services is set to an application ID list field. A number of service ID fields and a number of application ID list fields are added, the number of service ID fields and the number of application ID list fields being equal to the number of services which can be provided by the wireless communication device 1.

For example, 0x002692 is set to OUI of the action (service notification request) frame, and a value of "4" shown in FIG. 8 is set to subtype. Their values are not limited to these values.

When a receiver 12 receives the action (service notification request) frame from the wireless communication device 1, the service searcher 21 of each of the wireless communication devices 2A, 2B and 2C transmits, as a response frame to the action (service notification request) frame, an action (service notification response) frame including information about applications or services which can be provided by the corresponding wireless communication device 2, or the like to the wireless communication device 1 (F405, F407 and F409 of FIG. 30).

Figure 34:
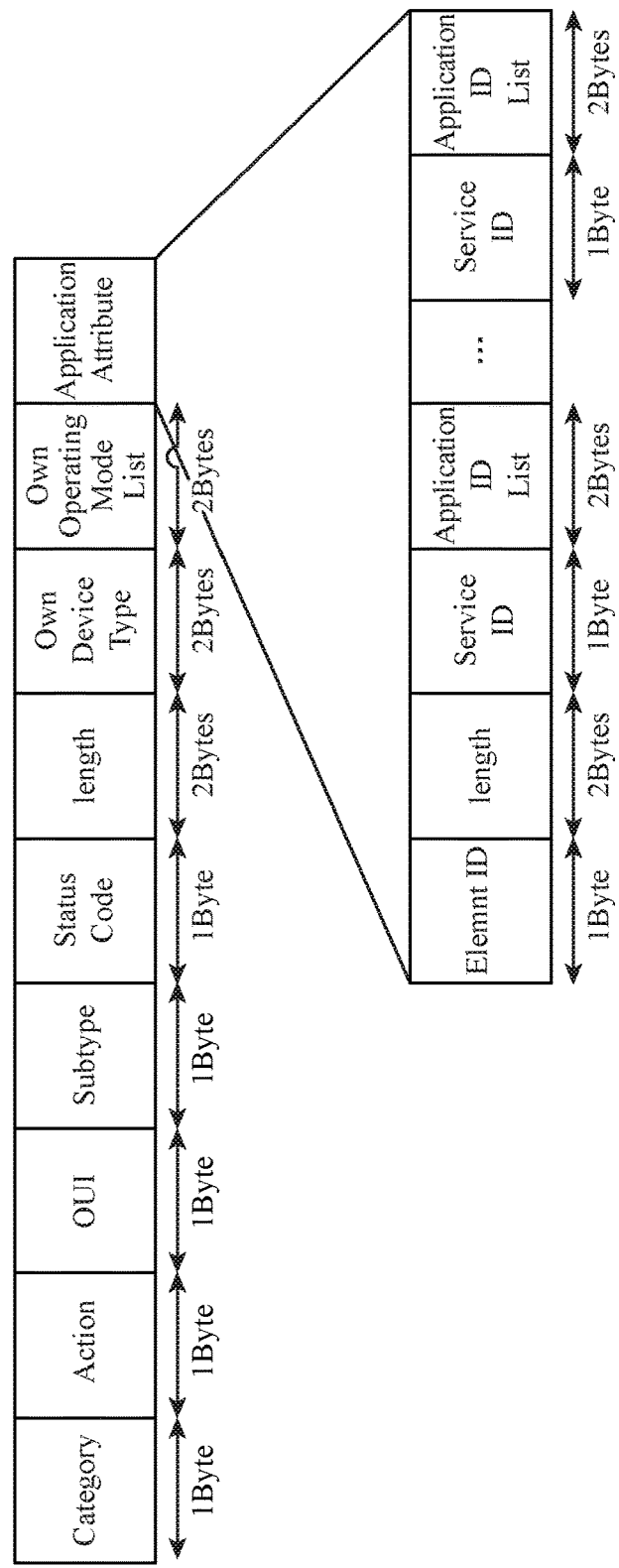
FIG. 34 is an explanatory drawing showing the format of an action (service notification response) frame.

Here, the action (service notification response) frame conforms to the protocol which makes it possible to perform wireless communications with the wireless communication device 1 regardless of the setting of a communication mode to the wireless communication device 1. FIG. 34 is an explanatory drawing showing the format of the action (service notification response) frame.

The terminal type of the wireless communication device 2 (e.g., PC, printer or router) is set to an own device type field of the action (service notification response) frame, and a list of the communication modes supported by the wireless communication device 2 is set to an own operating mode list field.

Further, the IDs of the services which can be provided by the wireless communication device 2 are set to a service ID field of an application attribute field, and a list of the IDs of the applications corresponding to the services is set to an application ID list field. A number of service ID fields and a number of application ID list fields are added, the number of service ID fields and the number of application ID list fields being equal to the number of services which can be provided by the wireless communication device 2.

For example, 0x002692 is set to OUI of the action (service notification response) frame, and a value of "5" shown in FIG. 8 is set to subtype. Their values are not limited to these values.

After transmitting the action (service notification request) frame, the service searcher 21 of the wireless communication device 1 is on standby during a fixed period of time until an action (service notification response) frame is transmitted from the wireless communication device 2 which is the transmission destination, and, when the receiver 12 receives an action (service notification response) frame from the wireless communication device 2 which is the transmission destination, acquires the action (service notification response) frame (in step ST303 of FIG. 31).

The service searcher 21 of the wireless communication device 1 outputs the acquired action (service notification response) frame to a communication mode changing controller 20.

When not having received an action (service notification response) frame within the fixed period of time from the wireless communication device 2 which is the transmission destination or when having received an action (service notification response) frame from the wireless communication device 2 which is the transmission destination, the service searcher performs a process of transmitting an action (service notification request) frame to another wireless communication device 2 which has completed a preparation for providing a service, and receiving an action (service notification response) frame from this wireless communication device.

Although in this Embodiment the example in which the wireless communication device 1 receives beacon frames or the likes transmitted from the wireless communication devices 2A, 2B and 2C by using all the frequency channels usable in the wireless LAN while changing the frequency channel to be used (passive scanning) is shown, the wireless communication device 1 can alternatively receive beacon frames or the likes onto each of which a service notification flag IE is superposed, instead of receiving beacon frames during the passive scanning.

Next, the details of processing at the time when each of the wireless communication devices 2A, 2B and 2C, which has received the action (service notification request) frame from the wireless communication device 1, transmits an action (service notification response) frame to the wireless communication device 1 will be explained.

Figure 35:
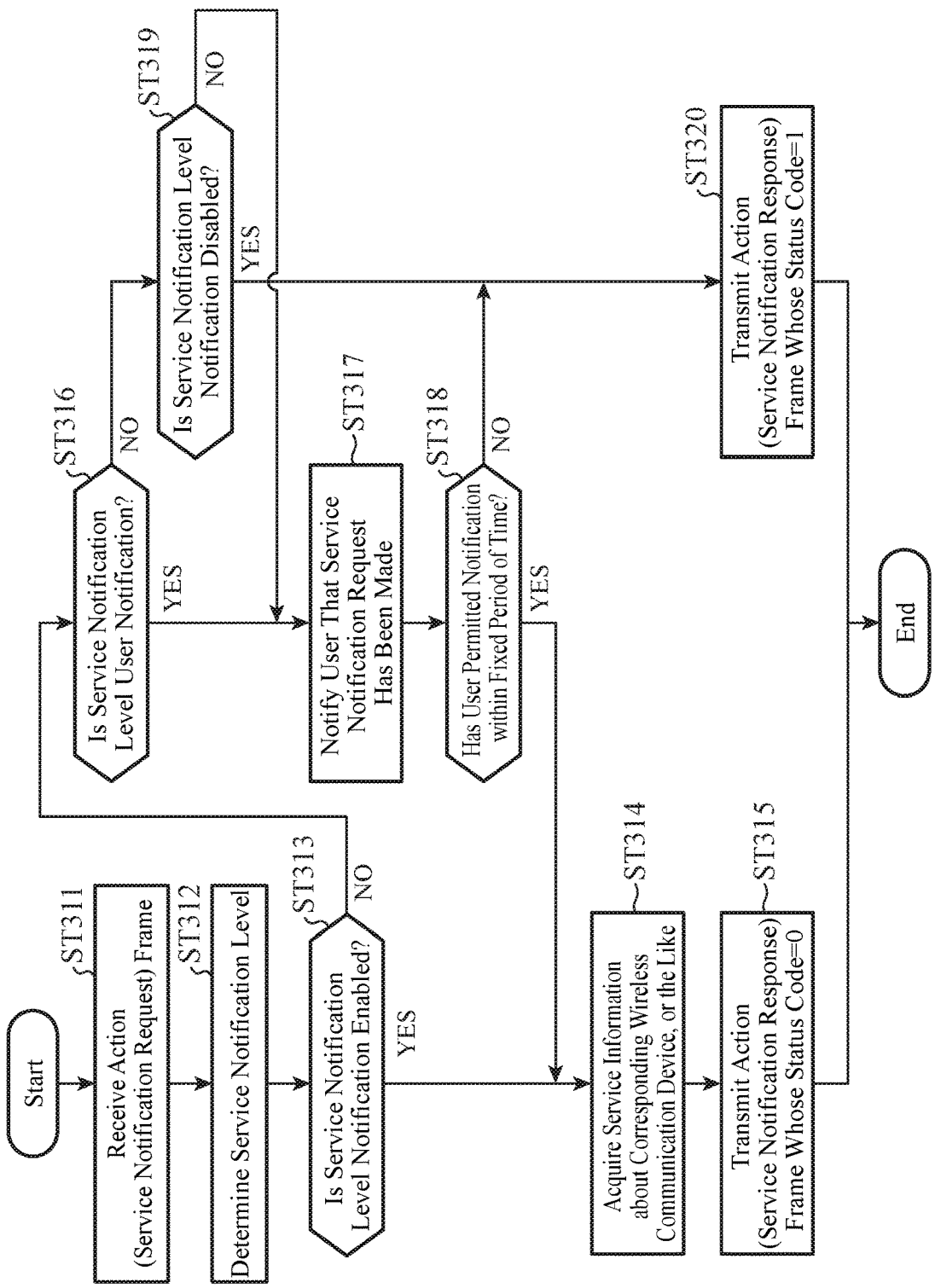

FIG. 35 is a flow chart showing the details of processing performed by each of the wireless communication devices 2A, 2B and 2C at the time of transmitting information about applications or services, or the like.

When the receiver 12 receives the action (service notification request) frame from the wireless communication device 1 (in step ST311 of FIG. 35), the service searcher 21 of each of the wireless communication devices 2A, 2B and 2C recognizes the MAC address of the wireless communication device 1.

After recognizing the MAC address of the wireless communication device 1, the service searcher 21 of each of the wireless communication devices 2A, 2B and 2C refers to the service notification level management table shown in FIG. 29 and recorded in the service notification management information storage 30, to specify the service notification level corresponding to the MAC address of the wireless communication device 1 (in step ST312 of FIG. 35).

In the example shown in FIG. 29, when the MAC address of the wireless communication device 1 is "11:22:33:44:55:66", the service searcher determines the service notification level as "notification enabled", whereas when the MAC address of the wireless communication device 1 is "22:33:44:55:66:77", the service searcher determine the service notification level as "user notification."

When the MAC address of the wireless communication device 1 is not registered in the service notification level management table, the service searcher determines the service notification level as "notification disabled."

In the example shown in FIG. 29, the priorities of the service notifications, from highest to lowest, are the priority of "notification enabled", that of "user notification", and that of "notification disabled." If they have the same priority, a higher priority is given to a service notification at a higher level of the table.

Although in this embodiment the example in which the service notification level is determined in accordance with the MAC address of the wireless communication device 1 is shown, this embodiment is not limited to this example. For example, the service notification level can be determined in accordance with the device type or the like of the wireless communication device 1.

The elements of the service notification level management table can be set by the user in advance, and the MAC address of a wireless communication device which has been registered once in response to a notification made by the user can be added automatically.

After determining the service notification level, the service searcher 21 of each of the wireless communication devices 2A, 2B and 2C acquires information about services from the common service controller 23 and information about services from the specific service controller 24 and also acquires information about applications from an application controller 25 (in step ST314 of FIG. 35) when the service notification level is "notification enabled" (when Yes in step ST313 of FIG. 35).

After acquiring information about services, or the like, the service searcher 21 of each of the wireless communication devices 2A, 2B, and 2C sets the information about services, or the like, the communication modes which can be supported, etc. to an action (service notification response) frame, and also sets "0" to a status code of the action (service notification response) frame, and, after that, outputs the action (service notification response) frame to the transmitter 11, thereby transmitting the action (service notification response) frame to the wireless communication device 1 (in step ST315 of FIG. 35).

When the service notification level is not "notification enabled" (when No in step ST313 of FIG. 35), but the service notification level is "user notification" (when Yes in step ST316 of FIG. 35), or when the service notification level is not "notification disabled" (when No in step ST319 of FIG. 35), the service searcher 21 of each of the wireless communication devices 2A, 2B and 2C notifies a message for urging the user to determine the presence or absence of a service notification to the user (in step ST317 of FIG. 35). The service searcher can make this notification by, for example, displaying the message on the display or the like of the wireless communication device 2, or producing a sound output.

When the user performs an operation of permitting a service notification within a fixed period of time (when Yes in step ST318 of FIG. 35), the service searcher 21 of each of the wireless communication devices 2A, 2B and 2C acquires information about services, or the like (in step ST314 of FIG. 35), like in the case in which the service notification level is "notification enabled." The service searcher then sets the information about services, or the like, the communication modes which can be supported, etc. to the action (service notification response) frame, and also sets "0" to the status code of the action (service notification response) frame, and, after that, outputs the action (service notification response) frame to the transmitter 11, thereby transmitting the action (service notification response) frame to the wireless communication device 1 (in step ST315 of FIG. 35).

When the service notification level is "notification disabled" (when Yes in step ST319 of FIG. 35), or when the user does not perform an operation of permitting a service notification within the fixed period of time (when No in step ST318 of FIG. 35), the service searcher 21 of each of the wireless communication devices 2A, 2B and 2C sets "1" to the status code of the action (service notification response) frame, and, after that, outputs the action (service notification response) frame to the transmitter 11, thereby transmitting the action (service notification response) frame to the wireless communication device 1 (in step ST320 of FIG. 35).

Next, the details of processing at the time when the wireless communication device 1 determines a wireless communication device 2 which is a connection object from among the wireless communication devices 2A, 2B and 2C will be explained.

Figure 36:
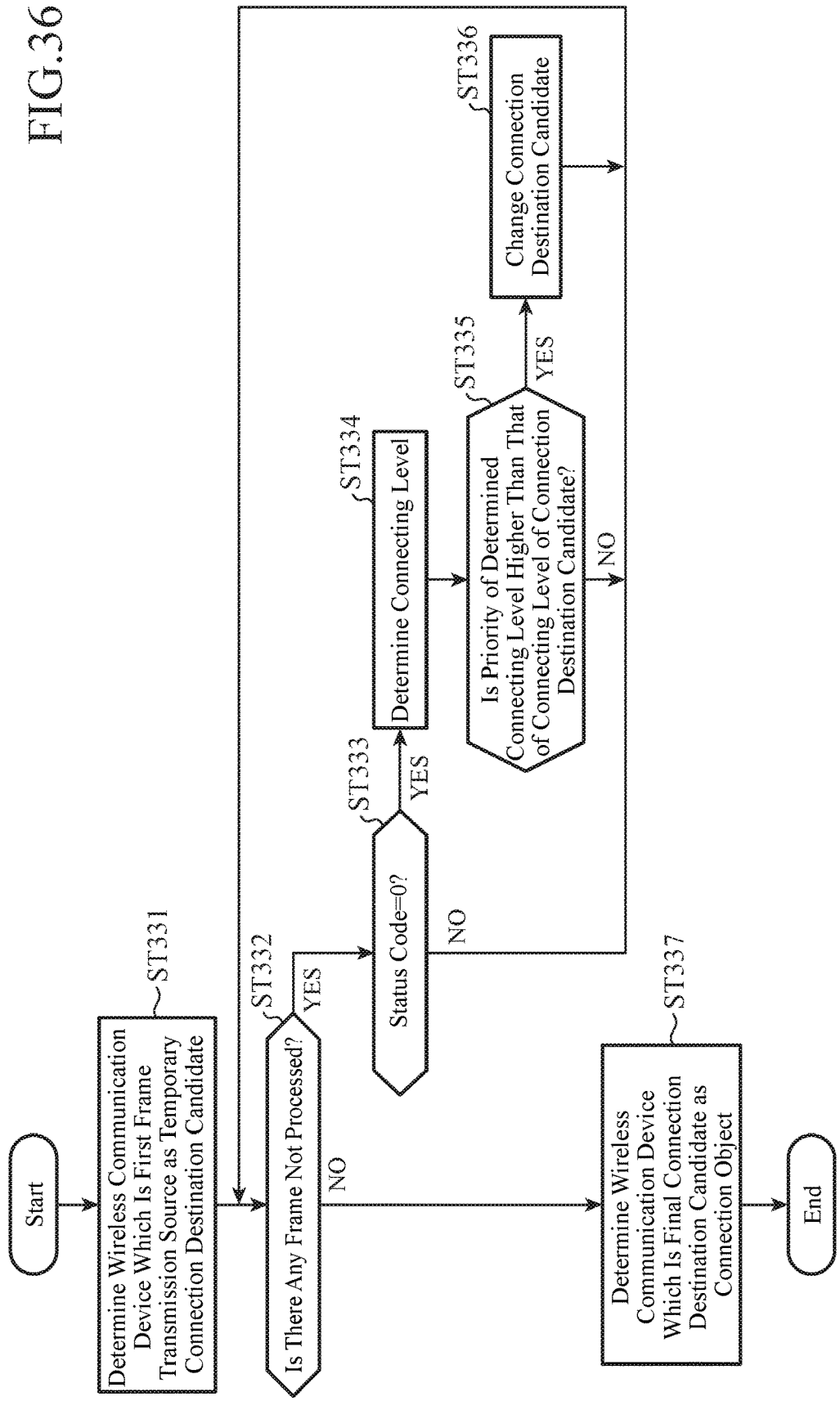
FIG. 36 is a flow chart showing the details of processing performed by the wireless communication device 1 at the time of determining a wireless communication device 2 which is a connection object.

FIG. 36 is a flow chart showing the details of processing performed by the wireless communication device 1 at the time of determining the wireless communication device 2 which is the connection object.

When receiving an action (service notification response) frame transmitted from one or more wireless communication devices 2 of the wireless communication devices 2A, 2B and 2C, the communication mode changing controller 20 of the wireless communication device 1 determines, as a temporary connection destination candidate, the wireless communication device 2 which is the transmission source of the action (service notification response) frame which the service searcher 21 has acquired for the first time (in step ST331 of FIG. 36).

The communication mode changing controller 20 of the wireless communication device 1 also recognizes the information (e.g., the MAC address, providable applications or services, and the terminal type) about the wireless communication device 2 which is the transmission source of the action (service notification response) frame which the service searcher has acquired for the first time. The communication mode changing controller can recognize the information about the wireless communication device 2 by referring to the action (service notification response) frame.

After recognizing the information about the wireless communication device 2 which is the first frame transmission source, the communication mode changing controller 20 of the wireless communication device 1 compares the information about the wireless communication device 2 which is the first frame transmission source with a service connection management table recorded in a service connection manager 22, thereby determining the connecting level of a wireless connection with the wireless communication device 2 which is the first frame transmission source, like in that according to above-mentioned Embodiment 1.

Next, when there is an action (application service response) frame which the wireless communication device 1 has acquired for a second time (when YES in step ST332 of FIG. 36) and the status code of the action (service notification response) frame is "0" (when Yes in step ST333 of FIG. 36), the communication mode changing controller 20 of the wireless communication device 1 recognizes the information (e.g., the MAC address, providable applications or services, and the terminal type) about the wireless communication device 2 which is the transmission source of the action (application service response) frame.

In contrast, when the status code of the action (service notification response) frame which the wireless communication device 1 has acquired for the second time is "1" (when No in step ST333 of FIG. 36), the communication mode changing controller excludes the action (service notification response) frame from the target for processing.

After recognizing the information about the wireless communication device 2 which is the second frame transmission source, the communication mode changing controller 20 of the wireless communication device 1 compares the information about the wireless communication device 2 which is the second frame transmission source with the service connection management table recorded in the service connection manager 22, thereby determining the connecting level of a wireless connection with the wireless communication device 2 which is the second frame transmission source (in step ST334 of FIG. 36), like in the case of the information about the wireless communication device 2 which is the first frame transmission source.

After determining the connecting level of a wireless connection with the wireless communication device 2 which is the second frame transmission source, the communication mode changing controller 20 of the wireless communication device 1 compares the priority of the connecting level of the wireless connection with that of the connecting level of the wireless connection with the wireless communication device 2 which has been determined as the connection destination candidate until this time (in step ST335 of FIG. 36), and, when the priority of the connecting level of the wireless connection with the wireless communication device 2 which is the second frame transmission source is higher than that of the connecting level of the wireless connection with the wireless communication device 2 which has been determined as the connection destination candidate until this time (when Yes in step ST335 of FIG. 36), changes the connection destination candidate to the wireless communication device 2 which is the second frame transmission source (in step ST336 of FIG. 36). In contrast, when the priority of the connecting level of the wireless connection with the wireless communication device 2 which has been determined as the connection destination candidate until this time is higher than that of the connecting level of the wireless connection with the wireless communication device 2 which is the second frame transmission source (when No in step ST335 of FIG. 36), the communication mode changing controller does not change the connection destination candidate.

Next, when there is an action (service notification response) frame which the wireless communication device 1 has acquired for an n-th (n=3, 4, . . . ) time (when YES in step ST332 of FIG. 36), and the status code of the action (service notification response) frame is "0" (when Yes in step ST333 of FIG. 36), the communication mode changing controller 20 of the wireless communication device 1 performs the same processes as those on the action (service notification response) frame which the service searcher has acquired for the second time (in steps ST334 to ST336 of FIG. 36).

After performing the same processes on all the action (service notification response) frames which the service searcher 21 has acquired (when No in step ST332 of FIG. 36), the communication mode changing controller 20 of the wireless communication device 1 determines a wireless communication device 2 which is a final connection destination candidate as the connection object (in step ST337 of FIG. 36).

In the example shown in FIG. 30, the communication mode changing controller determines the wireless communication device 2A as the wireless communication device which is the connection object.

After determining the wireless communication device 2A as the wireless communication device which is the connection object, the communication mode changing controller 20 of the wireless communication device 1 performs processing for changing the communication mode between the wireless communication device 1 and the wireless communication device 2A (F410 to F412 of FIG. 30), like that according to above-mentioned Embodiment 1.

When a change of the communication mode has succeeded between the wireless communication device 1 and the wireless communication device 2A which is the connection object, a wireless connection is established between the wireless communication device 1 and the wireless communication device 2A which is the connection object by performing a known connection sequence, and wireless communications are started (F413 of FIG. 30), like in the case of above-mentioned Embodiment 1.

According to this Embodiment 4, there is provided an advantage of being able to acquire information about applications or services from the wireless communication devices 2A, 2B and 2C which have completed a preparation for providing a service, regardless of the setting of a communication mode.

Further, according to this Embodiment 4, the wireless communication device 1 can start wireless communications between the wireless communication device 1 itself and a wireless communication device 2 without causing the user to perform an operation of selecting a communication mode and changing to this communication mode, an operation of determining the wireless communication device 2A which is the connection object, and so on, and there is provided an advantage of being able to improve the convenience of the user operation, like in the case of above-mentioned Embodiment 1.

Embodiment 5

Although in above-mentioned Embodiment 4 the example in which when receiving a beacon frame or the like from one of the wireless communication devices 2A, 2B and 2C, the wireless communication device 1 transmits an action (service notification request) frame to the wireless communication device 2 which is the transmission source of the beacon frame or the like is shown, the wireless communication device 1 can alternatively transmit a probe request frame including a service notification flag IE to the wireless communication device 2 which is the transmission source of the beacon frame or the like.

Hereafter, the details of processing performed by each of wireless communication devices 1, 2A, 2B and 2C will be explained concretely.

FIG. 30 is a sequence diagram showing a procedure for processing performed among the wireless communication devices which construct a wireless communication system according to Embodiment 5 of the present invention.

First, a service searcher 21 of each of the wireless communication devices 2A, 2B and 2C determines whether or not a preparation for providing a service managed by a common service controller 23 and a service managed by a specific service controller 24 has been completed, like that according to above-mentioned Embodiment 4.

Figure 37:
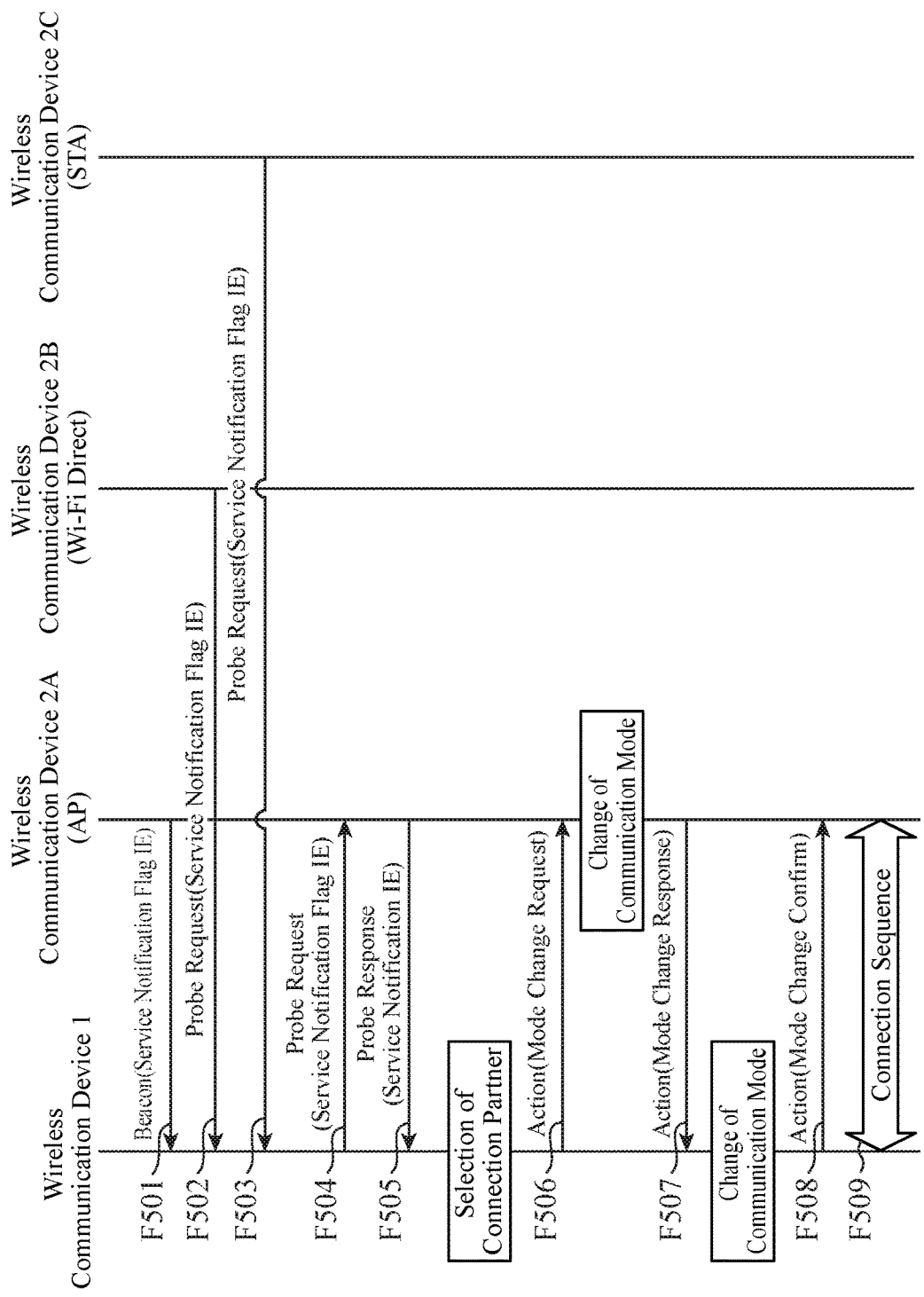
FIG. 37 is a sequence diagram showing a procedure for processing performed among wireless communication devices which construct a wireless communication system according to Embodiment 5 of the present invention.

After determining whether or not a preparation for providing a service has been completed, the service searcher 21 of each of the wireless communication devices 2A, 2B and 2C repeatedly outputs a beacon frame (or a probe request frame or a probe response frame) including a service notification flag IE to a transmitter 11, thereby transmitting the beacon frame (or the probe request frame or the probe response frame) to the wireless communication device 1 at regular time intervals (F501 to F503 of FIG. 37).

When a preparation for providing a service has been completed, "0" is set to a flag field of the service notification flag IE, whereas when no preparation for providing a service has been completed, "1" is set to the flag field.

In the example shown in FIG. 37, the wireless communication device 2A transmits a beacon frame, and each of the wireless communication devices 2B and 2C transmits a probe request frame.

Hereafter, for convenience of explanation, "beacon frame or the like", which will be described below, means beacon frame, probe request frame or probe response frame.

A service searcher 21 of the wireless communication device 1 receives a beacon frame or the like which is transmitted at regular intervals from each of the wireless communication devices 2A, 2B and 2C.

More specifically, because the service searcher 21 of the wireless communication device 1 does not know which frequency channel Ch is used by each of the wireless communication device 2A, 2B and 2C existing in the surroundings, the service searcher 21 receives a beacon frame or the like which is transmitted from each of the wireless communication devices 2A, 2B and 2C by using all frequency channels usable in a wireless LAN while changing a frequency channel to be used.

Next, the details of processing at the time when the wireless communication device 1 receives a beacon frame or the like from one of the wireless communication devices 2A, 2B and 2C, and transmits a probe request frame will be explained.

Figure 38:
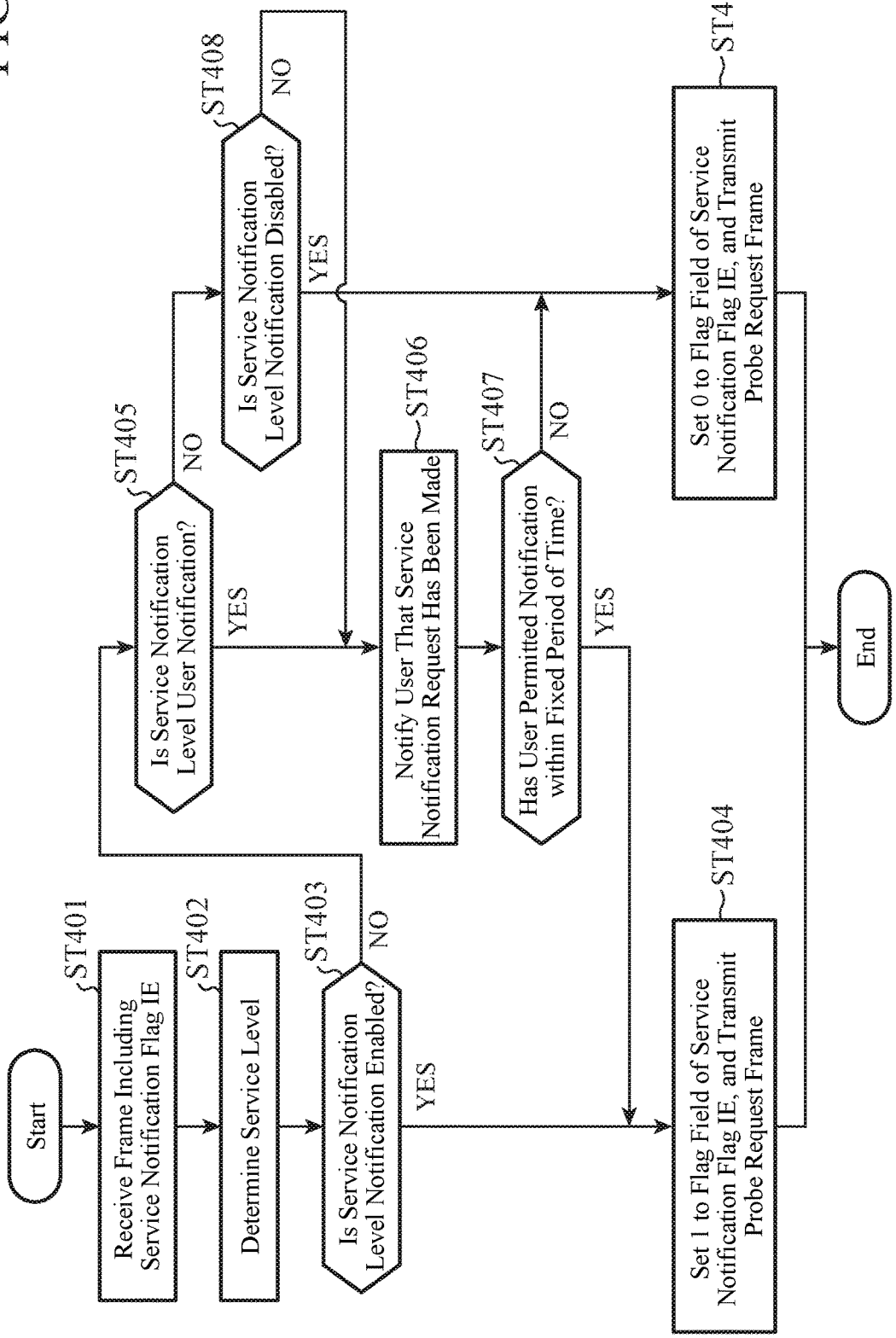
FIG. 38 is a flow chart showing the details of processing performed by a wireless communication device 1 at the time of transmitting a probe request frame.

FIG. 38 is a flow chart showing the details of processing performed by the wireless communication device 1 at the time of transmitting a probe request frame.

When a receiver 12 receives a beacon frame or the like including a service notification flag IE in which "0" is set to the flag field from one of the wireless communication devices 2A, 2B and 2C (in step ST401 of FIG. 38), the service searcher 21 of the wireless communication device 1 recognizes the MAC address of the one of the wireless communication devices 2A, 2B and 2C.

After recognizing the MAC address of the one of the wireless communication devices 2A, 2B and 2C, the service searcher 21 of the wireless communication device 1 refers to a service notification level management table shown in FIG. 29 and recorded in a service notification management information storage 30, to specify the service notification level corresponding to the MAC address of the one of the wireless communication devices 2A, 2B and 2C (in step ST402 of FIG. 38), like that according to above-mentioned Embodiment 4.

After determining the service notification level, the service searcher 21 of the wireless communication device 1 transmits, as a response to the beacon frame or the like, a probe request frame (a unicast frame) including a service notification flag IE in which "1" is set to a flag field to the wireless communication device 2 which is the frame transmission source (F504 of FIG. 37, in step ST404 of FIG. 38) when the service notification level is "notification enabled" (when Yes in step ST403 of FIG. 38).

In the example shown in FIG. 37, the service searcher transmits the probe request frame to the wireless communication device 2A.

The probe request frame conforms to a protocol which makes it possible to perform wireless communications with the wireless communication device 2A, 2B and 2C regardless of the setting of a communication mode to each of the wireless communication devices 2A, 2B and 2C. In a case in which the frame which the wireless communication device 1 receives from each of the wireless communication devices 2A, 2B and 2C is a beacon frame, the wireless communication device 1 responds to the frame by using a probe request frame, in a case in which the frame which the wireless communication device 1 receives from each of the wireless communication devices is a probe request frame, the wireless communication device 1 responds to the frame by using a probe response frame, and in a case in which the frame which the wireless communication device 1 receives from each of the wireless communication devices is a probe response frame, the wireless communication device 1 responds to the frame by using a probe request frame.

When the service notification level is not "notification enabled" (when No in step ST403 of FIG. 38), but the service notification level is "user notification" (when Yes in step ST405 of FIG. 38), or when the service notification level is not "notification disabled" (when No in step ST408 of FIG. 38), the service searcher 21 of the wireless communication device 1 notifies a message for urging the user to determine the presence or absence of a service notification to the user (in step ST406 of FIG. 38). The service searcher can make this notification by, for example, displaying the message on the display or the like of the wireless communication device 1, or producing a sound output.

When the user performs an operation of permitting a service notification within a fixed period of time (when Yes in step ST407 of FIG. 38), the service searcher 21 of the wireless communication device 1 transmits, as a response to the beacon frame or the like, a probe request frame (a unicast frame) including a service notification flag IE in which "1" is set to a flag field to the wireless communication device 2 which is the frame transmission source (F504 of FIG. 37, in step ST404 of FIG. 38), like in the case in which the service notification level is "notification enabled."

When the service notification level is "notification disabled" (when Yes in step ST408 of FIG. 38), or when the user does not perform an operation of permitting a service notification within the fixed period of time (when No in step ST407 of FIG. 38), the service searcher 21 of the wireless communication device 1 transmits, as a response to the beacon frame or the like, a probe request frame (a unicast frame) including a service notification flag IE in which "0" is set to a flag field to the wireless communication device 2 which is the frame transmission source (F504 of FIG. 37, in step ST409 of FIG. 38).

Next, the details of processing at the time when each of the wireless communication devices 2A, 2B and 2C receives the probe request frame from the wireless communication device 1, and transmits a probe response frame will be explained.

Figure 39:
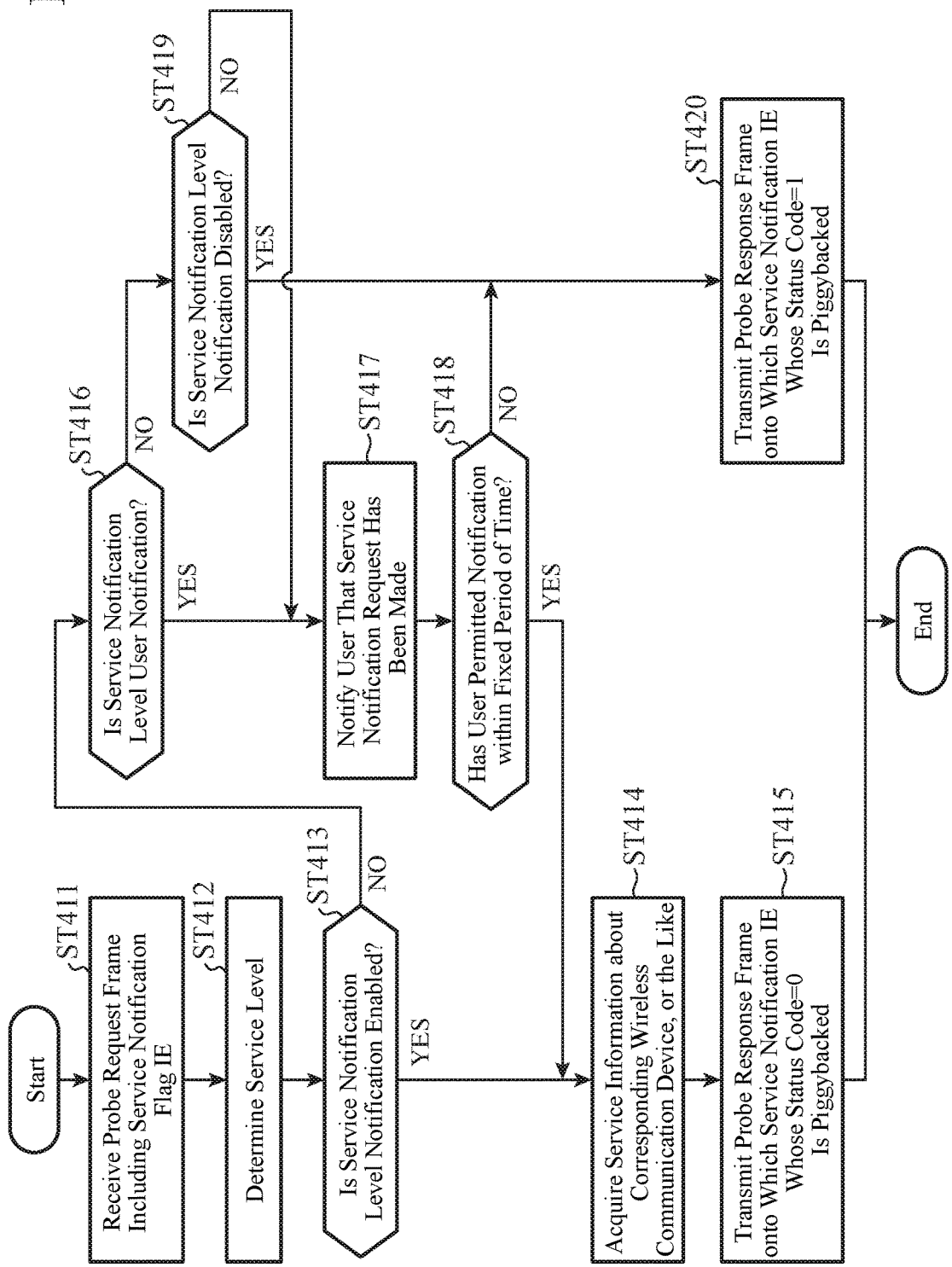
FIG. 39 is a flow chart showing the details of processing performed by each of wireless communication devices 2A, 2B and 2C at the time of transmitting a probe response frame.

FIG. 39 is a flow chart showing the details of processing performed by each of the wireless communication devices 2A, 2B and 2C at the time of transmitting a probe response frame.

When a receiver 12 receives the probe request frame (unicast frame) (in step ST411 of FIG. 39), and the probe request frame is a unicast frame destined therefore, the service searcher 21 of each of the wireless communication devices 2A, 2B and 2C determines that the frame is a response one such as a beacon frame.

After determining that the probe request frame (unicast frame) is a response one, and the flag field of the service notification flag IE included in the probe request frame (unicast frame) is "1", the service searcher 21 of each of the wireless communication devices 2A, 2B and 2C determines that a request to transmit information about services, or the like has been made, and performs the following process of transmitting a probe response frame. In contrast, when the flag field of the service notification flag IE is "0", the service searcher does not perform the process of transmitting a probe response frame.

The service searcher 21 of each of the wireless communication devices 2A, 2B and 2C recognizes the MAC address of the wireless communication device 1 which is the transmission source of the probe request frame (unicast frame).

After recognizing the MAC address of the wireless communication device 1, the service searcher 21 of each of the wireless communication devices 2A, 2B and 2C refers to a service notification level management table shown in FIG. 29 and recorded in a service notification management information storage 30, to specify the service notification level corresponding to the MAC address of the wireless communication device 1 (in step ST412 of FIG. 39), like that according to above-mentioned Embodiment 4.

After determining the service notification level, the service searcher 21 of each of the wireless communication devices 2A, 2B and 2C acquires information about services from the common service controller 23 and information about services from the specific service controller 24 and also acquires information about applications from an application controller 25 (in step ST414 of FIG. 39) when the service notification level is "notification enabled" (when Yes in step ST413 of FIG. 39).

After acquiring information about services, or the like, the service searcher 21 of each of the wireless communication devices 2A, 2B, and 2C sets the information about services, or the like, the communication modes which can be supported, etc. to a probe response frame, and also sets "0" to a status code of a service notification IE, and, after that, outputs the probe response frame to the transmitter 11, thereby transmitting the probe response frame to the wireless communication device 1 (in step ST415 of FIG. 39).

Figure 40:
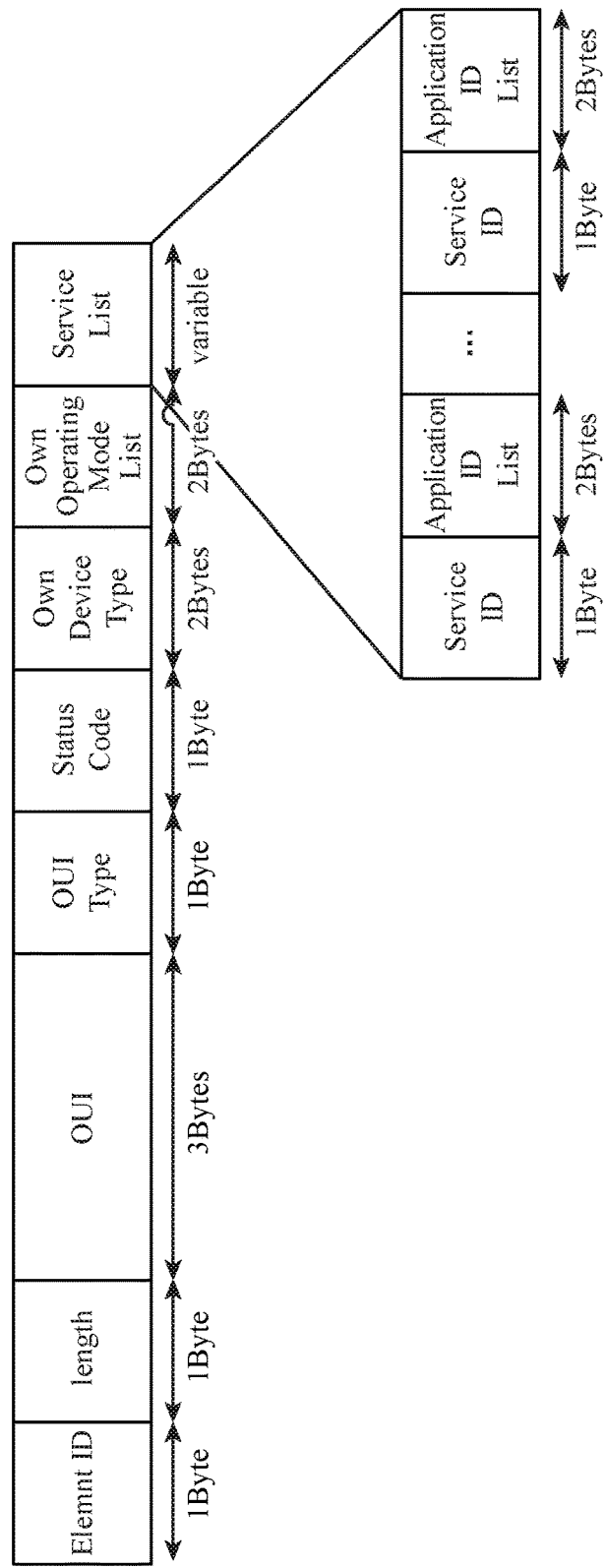
FIG. 40 is an explanatory drawing showing the format of a service notification IE of the probe response frame.

Here, the probe response frame conforms to a protocol which makes it possible to perform wireless communications with the wireless communication device 1 regardless of the setting of a communication mode to the wireless communication device 1. FIG. 40 is an explanatory drawing showing the format of the service notification IE of the probe response frame.

The terminal type of the wireless communication device 2 (e.g., PC, printer or router) is set to an own device type field of the service notification IE, and a list of the communication modes supported by the wireless communication device 2 is set to an own operating mode list field.

Further, the IDs of the services which can be provided by the wireless communication device 2 are set to a service ID field, and a list of the IDs of the applications corresponding to the services is set to an application ID list field. A number of service ID fields and a number of application ID list fields are added, the number of service ID fields and the number of application ID list fields being equal to the number of services which can be provided by the wireless communication device 2.

When the service notification level is not "notification enabled" (when No in step ST413 of FIG. 39), but the service notification level is "user notification" (when Yes in step ST416 of FIG. 39), or when the service notification level is not "notification disabled" (when No in step ST419 of FIG. 39), the service searcher 21 of each of the wireless communication devices 2A, 2B and 2C notifies a message for urging the user to determine the presence or absence of a service notification to the user (in step ST417 of FIG. 39). The service searcher can make this notification by, for example, displaying the message on the display or the like of the wireless communication device 2, or producing a sound output.

When the user performs an operation of permitting a service notification within a fixed period of time (when Yes in step ST418 of FIG. 39), the service searcher 21 of each of the wireless communication devices 2A, 2B and 2C acquires information about services, or the like (in step ST414 of FIG. 39), like in the case in which the service notification level is "notification enabled." The service searcher then sets the information about services, or the like, the communication modes which can be supported, etc. to a probe response frame, and also sets "0" to a status code of a service notification IE, and, after that, outputs the probe response frame to the transmitter 11, thereby transmitting the probe response frame to the wireless communication device 1 (in step ST415 of FIG. 39).

When the service notification level is "notification disabled" (when Yes in step ST419 of FIG. 39), or when the user does not perform an operation of permitting a service notification within the fixed period of time (when No in step ST418 of FIG. 39), the service searcher 21 of each of the wireless communication devices 2A, 2B and 2C sets "1" to the status code of the service notification IE, and, after that, outputs the probe response frame to the transmitter 11, thereby transmitting the probe response frame to the wireless communication device 1 (in step ST420 of FIG. 39).

When receiving the probe response frame from each of the wireless communication devices 2A, 2B and 2C, the wireless communication device 1 determines a wireless communication device 2 which is a connection object from among the wireless communication devices 2A, 2B and 2C, like that according to above-mentioned Embodiment 4.

After determining the wireless communication device 2A as the wireless communication device which is the connection object, the communication mode changing controller 20 of the wireless communication device 1 performs processing for changing the communication mode between the wireless communication device 1 and the wireless communication device 2A (F506 to F508 of FIG. 37), like that according to above-mentioned Embodiment 1.

When a change of the communication mode has succeeded between the wireless communication device 1 and the wireless communication device 2A which is the connection object, a wireless connection is established between the wireless communication device 1 and the wireless communication device 2A which is the connection object by performing a known connection sequence, and wireless communications are started (F509 of FIG. 37), like in the case of above-mentioned Embodiment 1.

According to this Embodiment 5, there is provided an advantage of being able to acquire information about applications or services from the wireless communication devices 2A, 2B and 2C which have completed a preparation for providing a service, regardless of the setting of communication mode.

Further, according to this Embodiment 5, the wireless communication device 1 can start wireless communications between the wireless communication device 1 itself and a wireless communication device 2 without causing the user to perform an operation of selecting a communication mode and changing to this communication mode, an operation of determining the wireless communication device 2A which is the connection object, and so on, and there is provided an advantage of being able to improve the convenience of the user operation, like in the case of above-mentioned Embodiment 1.

Further, unlike in the case of above-mentioned Embodiment 2, this embodiment can be implemented by adding an element to an existing frame, without adding a new action frame.

Although in above-mentioned Embodiments 1 to 5 the example in which the wireless communication device 1 and a wireless communication device 2 perform wireless communications with each other by using a wireless LAN is shown, the present invention is not limited to the wireless LAN. For example, by using Bluetooth (a registered trademark/a short-range radio communications standard for digital equipment), ZigBee (a short-range radio communications standard mainly aimed for sensor networks), or the like, the wireless communication device 1 and a wireless communication device 2 can perform wireless communications with each other.

While the invention has been described in its preferred embodiments, it is to be understood that an arbitrary combination of two or more of the above-mentioned embodiments can be made, various changes can be made in an arbitrary component according to any one of the above-mentioned embodiments, and an arbitrary component according to any one of the above-mentioned embodiments can be omitted within the scope of the invention.

INDUSTRIAL APPLICABILITY

The wireless communication system in accordance with the present invention is suitable for use as a system in which a wireless communication device 1 needs to acquire information about applications or services which is provided from each of wireless communication devices 2A, 2B and 2C, before establishing a wireless connection with one of the wireless communication devices 2A, 2B and 2C.

REFERENCE SIGNS LIST

1 wireless communication device (first wireless communication device), 2A, 2B, 2C wireless communication device (second wireless communication device), 3 wireless link, 4 car (vehicle), 11 transmitter (communication mode change requester, information collector, information transmitter), 12 receiver (communication mode information collector, communication mode changer, information collector, information transmitter), 13 WLAN controller, 14 STA mode controller, 15 AP mode controller, 16 Wi-Fi direct mode controller, 17 ad-hoc mode controller, 18 NAN mode controller, 19 WiGig mode controller, 20 communication mode changing controller (communication mode change requester, communication mode information collector, communication mode changer), 21 service searcher (information collector, information transmitter), 22 service connection manager (editor), 23 common service controller, 24 specific service controller, 25 application controller, 26 detailed application controller, and 30 service notification management information storage.

The invention claimed is:

1. A wireless communication system comprising:
   a first wireless communication device supporting a plurality of communication modes; and
   a second wireless communication device existing in surroundings of said first wireless communication device, wherein
   the first wireless communication device includes
   a communication mode information controller to collect, by using a first frame, information about either a service or an application of the second communication device, the information including communication modes supported by the second wireless communication device, and the first frame conforming to a protocol for performing a wireless communication between the first/second wireless communication devices,
   a communication mode change requester to select a communication mode corresponding to the first wireless communication device from the communication modes indicated by the collected information, and to transmit a request to the second wireless communication device to change to the selected communication mode by using a second frame conforming to the protocol,
   said second wireless communication device includes
   an information transmitter to transmit, to the first wireless communication device by using a third frame conforming to the protocol, the information indicated by the first frame from the first wireless communication device, and
   a communication mode changer to change a communication mode of the second wireless communication device in accordance with the change request indicated by the second frame from the first wireless communication device, wherein
   said communication mode change requester of said first wireless communication device determines a connecting level of a wireless connection with said second wireless communication device, and transmits said connecting level by including it in the second frame, and
   said communication mode changer of said second wireless communication device controls a mode of changing the communication mode in accordance with the connecting level included in the second frame.

2. The wireless communication system according to claim 1,
   wherein said information collector of said first wireless communication device includes:
   a selection receiver to receive a selection of an application to be used from among a plurality of applications; and
   an information transmission request sender to send by the first frame an information transmission request including identification information about the application; the selection of which is received by said selection receiver,
   wherein said information transmitter of said second wireless communication device includes:

an information transmission request receiver to receive the first frame including the information transmission request;

a determinator to determine whether or not the application shown by the identification information included in the information transmission request indicated by the received first frame can be provided by said second wireless communication device; and an information responder to, when said determinator determines that the application can be provided, transmit by the third frame, as information about said application, the identification information about said application which can be provided, and wherein said information collector of said first wireless communication device includes an information receiver to receive the identification information about the application which is transmitted by the third frame.

3. The wireless communication system according to claim 2, wherein said information transmission request sender sends said information transmission request by using all usable frequency channels while changing a frequency channel to be used, and said information receiver receives the identification information about the application, which is transmitted from said information responder, while changing a frequency channel to be used.

4. The wireless communication system according to claim 1, wherein said information collector of said first wireless communication device includes an information transmission request sender to send, by a fourth frame conforming to the protocol, an information transmission request to transmit information about a service which can be provided, wherein said information transmitter of said second wireless communication device includes:

an information transmission request receiver to receive the fourth frame including the information transmission request; and an information responder to transmit, by using a fifth frame conforming to the protocol, information about a service which said second wireless communication device can provide, and wherein said information collector of said first wireless communication device includes an information receiver to receive the information about the service which can be provided, the information being transmitted by the fifth frame.

5. The wireless communication system according to claim 4, wherein said transmission request sender sends the information transmission request to transmit the information about the service which can be provided, by using all usable frequency channels while changing a frequency channel to be used, and said information receiver receives the information about the service which can be provided, the information being transmitted from said information responder, while changing a frequency channel to be used.

6. The wireless communication system according to claim 1, wherein said communication mode change requester of said first wireless communication device changes the communication mode of said first wireless communication device.

7. The wireless communication system according to claim 1, wherein said communication mode changer of said second wireless communication device performs a process of changing said communication mode in a changing mode of forcedly changing a communication mode regardless of whether or not the communication mode is set currently, in a changing mode of changing a communication mode when no communication mode is set currently, or in a changing mode of changing a communication mode when an operation of commanding a change is received through a notification of a change of the communication mode.

8. The wireless communication system according to claim 1, wherein said communication mode change requester of said first wireless communication device refers to a table in which a correspondence between said service and the connecting level of said wireless connection is recorded, and determines the connecting level of said wireless connection from the service provided from said second wireless communication device, and wherein said first wireless communication device includes an editor to edit the correspondence recorded in said table.

9. The wireless communication system according to claim 1, wherein said information transmitter of said second wireless communication device includes an information repetition transmitter to repeatedly transmit, by a sixth frame conforming to the protocol, the information about either the service or the application which said second wireless communication device can provide, in accordance with the protocol which makes it possible to perform wireless communications with said first wireless communication device regardless of a setting of a communication mode to said first wireless communication device, and wherein said information collector of said first wireless communication device includes an information receiver to receive the sixth frame, while changing a frequency channel to be used.

10. The wireless communication system according to claim 1, wherein said information transmitter of said second wireless communication device includes a preparation judgment information transmitter to repeatedly transmit, by a seventh frame conforming to the protocol, preparation judgment information showing whether or not a preparation for providing a service has been completed, wherein said information collector in said first wireless communication device includes an information transmission request sender to receive the seventh frame including the preparation judgment information, and, when said preparation judgment information shows that a preparation for providing a service has been completed, send by the eighth frame conforming to the protocol an information transmission request to transmit information about either a service or an application, wherein said information transmitter of said second wireless communication device includes:

an information transmission request receiver to receive the eighth frame including the information transmission request; and an information responder to transmit by a ninth frame conforming to the protocol, when said information transmission request receiver receives the information transmission request, the information about either the service or the application which said second wireless communication device can provide, and wherein said information collector of said first wireless communication device includes an information receiver to receives the ninth frame.

11. The wireless communication system according to claim 10, wherein said information responder determines an information notification level for the information transmission request included in the eighth frame, and controls a mode of transmitting the information about either the service or the application which can be provided in accordance with said information notification level.

12. The wireless communication system according to claim 11, wherein said information responder determines the information notification level in accordance with information about the first wireless communication device which is a transmission source of the eighth frame including the information transmission request.

13. The wireless communication system according to claim 1, wherein each of said first and second wireless communication devices supports one of communication modes including an infrastructure mode, a Wi-Fi direct mode, an ad hoc mode, a wireless gigabit mode, and an NAN (Neighborhood Area Network) mode, which are wireless LAN communication modes.

14. The wireless communication system according to claim 1, wherein each of said first and second wireless communication devices uses one or more of a frequency channel in a 2.4 GHz band, a frequency channel in a 5 GHz band, a frequency channel in a 60 GHz band, and a frequency channel in a 900 MHz band, which are frequency channels usable in a wireless LAN.

15. The wireless communication system according to claim 1, wherein said first wireless communication device or said second wireless communication device is used as vehicle-mounted equipment mounted in a vehicle.

16. A wireless communication method for a system in which a first wireless communication device supporting a plurality of communication modes and a second wireless communication device existing in surroundings of said first wireless communication device perform wireless communications with each other, said wireless communication method comprising:
  requesting, from the first wireless communication device by using a first frame, information about either a service or an application of the second communication device, the information including communication modes supported by the second wireless communication device, and the first frame conforming to a protocol for performing a wireless communication between the first/second wireless communication devices;
  transmitting, from the second wireless communication device to the first wireless communication device by using a third frame conforming to the protocol, the information requested by the first frame from the first wireless communication device;
  selecting, by the first wireless communication device, a communication mode corresponding to the first wireless communication device from the communication modes indicated by the information transmitted by the third frame, and transmitting a request to the second wireless communication device to change to the selected communication mode by using a second frame conforming to the protocol; and
  changing a communication mode of the second wireless communication device in accordance with the change request indicated by the second frame from the first wireless communication device wherein
  said communication mode change requester of said first wireless communication device determines a connecting level of a wireless connection with said second wireless communication device, and transmits said connecting level by including it in the second frame, and
  said communication mode changer of said second wireless communication device controls a mode of changing the communication mode in accordance with the connecting level included in the second frame.

17. The wireless communication system according to claim 1, wherein
  the protocol is specified by IEEE802.11 standards, and
  the first/second/third frames are Action frames whose formats differ from each other, each conforming to the IEEE802.11 standards.

18. The wireless communication method according to claim 16, wherein
  the protocol is specified by IEEE802.11 standards, and
  the first/second/third frames are Action frames whose formats differ from each other, each conforming to the IEEE802.11 standards.

* * * * *